US011469857B2

United States Patent
Zhou et al.

(10) Patent No.: US 11,469,857 B2
(45) Date of Patent: Oct. 11, 2022

(54) METHOD AND APPARATUS FOR TRANSMITTING AND RECEIVING A FEEDBACK SIGNAL IN A WIRELESS COMMUNICATION SYSTEM

(71) Applicant: Samsung Electronics Co., Ltd., Suwon-si (KR)

(72) Inventors: Miao Zhou, Beijing (CN); Min Wu, Beijing (CN); Yi Wang, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 116 days.

(21) Appl. No.: 16/991,989

(22) Filed: Aug. 12, 2020

(65) Prior Publication Data

US 2021/0050950 A1     Feb. 18, 2021

(30) Foreign Application Priority Data

Aug. 13, 2019  (CN) .......................... 201910746222.0
Sep. 27, 2019  (CN) .......................... 201910927915.X
Oct. 30, 2019  (CN) .......................... 201911047421.9
Feb. 13, 2020  (CN) .......................... 202010091198.4

(Continued)

(51) Int. Cl.
| *H04L 1/18* | (2006.01) |
| *H04L 5/00* | (2006.01) |
| *H04W 76/27* | (2018.01) |
| *H04W 72/04* | (2009.01) |

(52) U.S. Cl.
CPC .......... *H04L 1/1812* (2013.01); *H04L 5/0055* (2013.01); *H04W 72/042* (2013.01); *H04W 72/0413* (2013.01); *H04W 76/27* (2018.02)

(58) Field of Classification Search
CPC .... H04L 1/1812; H04L 5/0055; H04W 76/27; H04W 72/042; H04W 72/0413
See application file for complete search history.

(56) References Cited

U.S. PATENT DOCUMENTS

| 2016/0014834 A1 | 1/2016 | Chang et al. |
| 2017/0215183 A1* | 7/2017 | Gulati ............... H04W 72/0426 |
| 2017/0331593 A1* | 11/2017 | Sorrentino ............ H04L 1/0031 |

(Continued)

FOREIGN PATENT DOCUMENTS

| EP | 3910841 A1 | 11/2021 |
| WO | 2019136708 A1 | 7/2019 |

OTHER PUBLICATIONS

D1: Samsung, On Resource Allocation for NR V2X Mode 1, R1-1906935, 3GPP TSG RAN WG1 #97, Reno USA, May 4, 2019. (Year: 2019).*

(Continued)

*Primary Examiner* — Brenda H Pham

(57) ABSTRACT

A method performed by a terminal in a wireless communication system is provided, the method includes receiving, from a base station, a sidelink configured grant for a sidelink transmission, transmitting, to another terminal, a sidelink signal based on the sidelink configured grant, generating a second hybrid automatic repeat request (HARQ) acknowledgement (HARQ-ACK) information based on whether first HARQ-ACK information corresponding to the sidelink signal is received from the another terminal, and reporting on an uplink channel, to a base station, the second HARQ-ACK information.

16 Claims, 12 Drawing Sheets

(30) Foreign Application Priority Data

Mar. 27, 2020 (CN) .......................... 202010232242.9
May 13, 2020 (CN) .......................... 202010403989.6

(56) References Cited

U.S. PATENT DOCUMENTS

2019/0103943 A1* 4/2019 Wang ..................... H04L 1/1854
2020/0029318 A1* 1/2020 Guo ....................... H04L 1/1819

OTHER PUBLICATIONS

International Search Report and Written Opinion of the International Searching Authority in connection with International Application No. PCT/KR2020/010688 dated Nov. 17, 2020, 10 pages.
NTT Docomo, Inc., "NR Sidelink Resource Allocation Mechanism Mode 1," R1-1906206, 3GPP TSG RAN WG1 #97, Reno, USA, May 13-17, 2019, 6 pages.
Panasonic, "Discussion on sidelink resource allocation in mode 1 for NR V2X," R1-1902204, 3GPP TSG RAN WG1 #96, Athens, Greece, Feb. 25-Mar. 1, 2019, 4 pages.
Samsung, "On Resource Allocation for NR V2X Mode 1," R1-1906935, 3GPP TSG RAN WG1 #97, Reno, USA, May 13-17, 2019, 8 pages.
Supplementary European Search Report dated Mar. 7, 2022, in connection with European Application No. 20853078.2, 11 pages.
Ericsson, "Mode-1 Implications for Supporting SL HARQ feedbacks," TDoc R2-1901651, 3GPP TSG-RAN WG2 #105, Athens, Greece, Feb. 26-Mar. 1, 2019, 5 pages.
Ericsson, "On the Support of HARQ feedbacks Over Sidelink," TDoc R2-1901658, 3GPP TSG-RAN WG2 #105, Athens, Greece, Feb. 28-Mar. 1, 2019, 6 pages.
Ericsson, "Scheduling of sidelink retransmission in mode-1," TDoc R2-1904713, 3GPP TSG-RAN WG2 #105bis, Xi'an, China, Apr. 8-12, 2019, 4 pages.
Vivo, "Physical layer procedure for NR sidelink," R1-1812307, 3GPP TSG RAN WG1 Meeting #95, Spokane, USA, Nov. 12-16, 2018, 7 pages.

* cited by examiner

METHOD AND APPARATUS FOR TRANSMITTING AND RECEIVING A FEEDBACK SIGNAL IN A WIRELESS COMMUNICATION SYSTEM

CROSS-REFERENCE TO RELATED APPLICATIONS

The application is based on claims priority under 35. U.S.C. 119 to Chinese Applications 201910746222.0 filed on Aug. 13, 2019, 201910927915.X filed on Sep. 27, 2019, 201911047421.9 filed on Oct. 30, 2019, 202010091198.4 filed on Feb. 13, 2020, 202010232242.9 filed on Mar. 27, 2020 and 202010403989.6 filed on May 13, 2020, the disclosures of which are herein incorporated by reference in its entirety.

1. FIELD

The disclosure relates to a field of wireless communication technologies, and more particularly, to method and apparatus for transmitting and receiving a feedback signal in a wireless communication system.

2. DESCRIPTION OF RELATED ART

To meet the soaring demand with respect to wireless data traffic due to the commercialization of a $4^{th}$ generation (4G) system and the increase of multimedia services, an improved 5G communication system or a pre-5G communication system is being developed. This is one reason why '5G communication systems' or 'pre-5G communication systems' are called 'beyond 4G network communication systems' or 'post Long-Term Evolution (LTE) systems.'

In order to increase a data transmission rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves, various technologies for 5G communication systems are being discussed and studied, for example: beamforming, massive multiple-input multiple-output (MIMO), Full Dimensional MIMO (FD-MIMO), array antennas, analog beam-forming, and large-scale antennas.

Also, in order to improve system network performance for 5G communication systems, various technologies have been developed, e.g., evolved small cells, advanced small cells, cloud radio access networks (Cloud-RAN), ultra-dense networks, Device-to-Device communication (D2D), wireless backhaul, moving networks, cooperative communication, Coordinated Multi-Points (CoMP), and interference cancellation. Also, for 5G communication systems, other technologies have been developed, e.g., hybrid frequency-shift keying (FSK) and quadrature amplitude modulation (QAM) (FQAM) and Sliding Window Superposition Coding (SWSC), which are Advanced Coding Modulation (ACM) schemes, and Filter Bank Multi Carrier (FBMC), non-orthogonal multiple access (NOMA), and sparse code multiple access (SCMA), which are advanced access schemes.

The Internet has evolved from a human-based connection network, where humans create and consume information, to the Internet of Things (IoT), where distributed configurations, such as objects, exchange information with each other to process the information. Internet of Everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, Machine to Machine (M2M) communication, Machine Type Communication (MTC), etc. have been studied. In the IoT environment, intelligent Internet Technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of Cloud-RAN as a big data processing technology described above may be an example of convergence of 5G communication technology and IoT technology.

Transmissions in a radio communication system include: a transmission (called a downlink transmission) from a base station (gNB) to a user equipment (UE), of which a corresponding slot is called a downlink slot; and a transmission (called an uplink transmission) from the UE to the base station, of which a corresponding slot is called an uplink slot.

SUMMARY

Provided are method and apparatus for transmitting and receiving a feedback signal in a wireless communication system.

Additional aspects will be set forth in part in the description which follows and, in part, will be apparent from the description, or may be learned by practice of the presented embodiments of the disclosure.

According to an embodiment of the disclosure, a codebook-based feedback method is provided, which is applied to a first user equipment (UE), the method includes: transmitting a sidelink transmission to a second UE; receiving first hybrid automatic repeat request acknowledgement (HARQ-ACK) feedback information transmitted by the second UE; generating second HARQ-ACK feedback information corresponding to the sidelink transmission according to the received first HARQ-ACK feedback information; generating a first HARQ-ACK codebook including the second HARQ-ACK feedback information; and reporting the first HARQ-ACK codebook to a base station.

In the embodiment, the first HARQ-ACK codebook includes a first HARQ-ACK dynamic codebook, and the generating the first HARQ-ACK codebook including the second HARQ-ACK feedback information includes: determining a physical uplink control channel (PUCCH) resource carrying the second HARQ-ACK feedback information; determining, according to the PUCCH resource, a counter downlink assignment index (C-DAI) and/or a total downlink assignment index (T-DAI) corresponding to the second HARQ-ACK feedback information; generating a HARQ-ACK information bit corresponding to the second HARQ- ACK feedback information; and generating the first HARQ-ACK dynamic codebook according to at least one of the C-DAI and the T-DAI, and the HARQ-ACK information bit.

In the embodiment, the determining the PUCCH resource carrying the second HARQ-ACK feedback information includes: when the sidelink transmission is scheduled by sidelink grant, and a physical downlink control channel (PDCCH) monitoring occasion (MO) of downlink control information (DCI) carrying the sidelink grant and/or a physical downlink shared channel (PDSCH) resource carrying the sidelink grant is determined in a slot n, determining that the second HARQ-ACK feedback information of sidelink data is transmitted on PUCCH in slot n+m; wherein, the m is determined by at least one of a sidelink HARQ-ACK timing indicator, a higher layer parameter, a configured offset, a preconfigured offset, and a predefined offset indicated in the sidelink grant, where the n and m are real numbers; and wherein, a sidelink HARQ-ACK timing indicator indicated in the sidelink grant includes at least one of: a PDSCH-to-HARQ-ACK feedback timing indicator, a PDCCH MO-to-HARQ-ACK feedback timing indicator, a PSSCH-to-HARQ-ACK feedback timing indicator, a PSCCH-to-HARQ-ACK feedback timing indicator, and a PSFCH-to-HARQ-ACK feedback timing indicator.

In the embodiment, the generating the first HARQ-ACK dynamic codebook including the second HARQ-ACK feedback information includes: multiplexing the second HARQ-ACK feedback information corresponding to the sidelink transmission and third HARQ-ACK feedback information corresponding to a downlink transmission in the same first HARQ-ACK dynamic codebook or a same sub-codebook in the first HARQ-ACK dynamic codebook; or generating separate HARQ-ACK dynamic codebooks for the second HARQ-ACK feedback information corresponding to the sidelink transmission and the third HARQ-ACK feedback information corresponding to the downlink transmission, respectively; or generating separate sub-codebooks in the first HARQ-ACK dynamic codebook for the second HARQ-ACK feedback information corresponding to the sidelink transmission and the third HARQ-ACK feedback information corresponding to the downlink transmission, respectively.

In the embodiment, the multiplexing the second HARQ-ACK feedback information corresponding to the sidelink transmission and the third HARQ-ACK feedback information corresponding to the downlink transmission in the same first HARQ-ACK dynamic codebook or the same sub-codebook in the first HARQ-ACK dynamic codebook further includes at least one of the following: the sidelink transmission being scheduled by the sidelink grant, wherein C-DAI in the sidelink grant and PDSCH reception associated with DCI format 1_0 are jointly counted; the sidelink transmission being scheduled by the sidelink grant, wherein the C-DAI in the sidelink grant and C-DAI of semi-persistent scheduling (SPS) PDSCH associated with DCI format 1_0 are jointly counted; the sidelink transmission being scheduled by the sidelink grant, wherein the C-DAI in the sidelink grant and PDSCH reception associated with DCI format 1_1 are jointly counted; the sidelink transmission being scheduled by the sidelink grant, wherein the C-DAI in the sidelink grant and C-DAI of SPS PDSCH release associated with DCI format 1_1 are jointly counted; and the sidelink transmission being scheduled by the sidelink grant, wherein T-DAI in the sidelink grant and T-DAI of the PDSCH reception associated with DCI format 1_1 are jointly counted.

In the embodiment, the generating the first HARQ-ACK dynamic codebook including the second HARQ-ACK feedback information further includes at least one of the following: determining whether at least one sidelink transmission enables CBG transmission according to at least one of configured information, preconfigured information, and predefined information; generating TB-based second HARQ-ACK feedback information or a HARQ-ACK information bit corresponding to the second HARQ-ACK feedback information for the at least one sidelink transmission if the CBG transmission is not enabled; and generating CBG-based second HARQ-ACK feedback information or a HARQ-ACK information bit corresponding to the second HARQ-ACK feedback information for the at least one sidelink transmission if the CBG transmission is enabled; wherein the sidelink transmission includes at least one of the following: a sidelink transmission within a serving cell, a sidelink transmission within a sidelink resource pool, a sidelink transmission in a sidelink transmission mode, a sidelink transmission of one service type, a sidelink transmission of one transmission type, a sidelink transmission corresponding to a type of grant and a given sidelink transmission.

In the embodiment, the generating the CBG-based second HARQ-ACK feedback information or the HARQ-ACK information bit corresponding to the second HARQ-ACK feedback information for the at least one sidelink transmission includes: obtaining maximum number of code block groups (CBG) included in one transport block (TB) of sidelink data included in the sidelink transmission; wherein, the maximum number of the CBGs included in one TB of sidelink data included in the sidelink transmission is obtained by at least one means of the following: CBG-related configuration of sidelink, CBG-related pre-configuration of sidelink, configuration of sidelink resource pool, and pre-configuration of sidelink resource pool.

In the embodiment, the generating the first HARQ-ACK dynamic codebook corresponding to the sidelink transmission includes: generating a first HARQ-ACK dynamic sub-codebook and a second HARQ-ACK dynamic sub-codebook, the first HARQ-ACK dynamic sub-codebook corresponding to third HARQ-ACK feedback information of TB-based downlink transmission and/or second HARQ-ACK feedback information of TB-based sidelink transmission, and the second HARQ-ACK dynamic sub-codebook corresponding to third HARQ-ACK feedback information of CBG-based downlink transmission and/or second HARQ-ACK feedback information of CBG-based sidelink transmission.

In the embodiment, the C-DAI and T-DAI corresponding to the first HARQ-ACK dynamic sub-codebook and the second HARQ-ACK dynamic sub-codebook respectively are separately counted, and in the first HARQ-ACK dynamic sub-codebook and the second HARQ-ACK dynamic sub-codebook, the C-DAI and/or T-DAI corresponding to the sidelink transmission and downlink transmission are jointly counted.

In the embodiment, the method further includes: when P configured sidelink grants are activated, and the sidelink transmission scheduled by the configured sidelink grant meets a preset condition, adding the second HARQ-ACK feedback information of the sidelink transmission scheduled by the activated P configured sidelink grants at the end of the first HARQ-ACK dynamic codebook and/or at the end of dynamic codebook of the sidelink HARQ-ACK feedback information corresponding to the dynamic sidelink grant, P being a positive integer.

In the embodiment, the generating the first HARQ-ACK dynamic codebook further includes at least one of the following: in the first HARQ-ACK dynamic codebook, firstly adding a HARQ-ACK information bit corresponding to SPS PDSCH, and then adding a HARQ-ACK information bit corresponding to the configured sidelink grant; sorting, based on a same criterion, the HARQ-ACK information bits corresponding to the SPS PDSCH and the configured sidelink grant, and sequentially adding them to the first HARQ-ACK dynamic codebook; adding the HARQ-ACK information bit corresponding to the configured sidelink grant at the end of the sub-codebook in the first HARQ-ACK dynamic codebook corresponding to the second HARQ-ACK feedback information of the sidelink transmission; and adding the HARQ-ACK information bit corresponding to the SPS PDSCH at the end of the sub-codebook in the first HARQ-ACK dynamic codebook corresponding to the third HARQ-ACK feedback information of the downlink transmission.

In the embodiment, the generating the separate HARQ-ACK dynamic codebooks or the separate sub-codebooks in the first HARQ-ACK dynamic codebook for the second HARQ-ACK feedback information corresponding to the sidelink transmission and the third HARQ-ACK feedback information corresponding to the downlink transmission, respectively, further includes: sorting downlink HARQ-ACK dynamic codebook corresponding to the third HARQ-ACK feedback information of the downlink transmission and sidelink HARQ-ACK dynamic codebook corresponding to the second HARQ-ACK feedback information of the sidelink transmission so as to generate the first HARQ-ACK dynamic codebook; and the C-DAI and/or T-DAI corresponding to the downlink HARQ-ACK dynamic codebook and the C-DAI and/or T-DAI corresponding to the sidelink HARQ-ACK dynamic codebook being separately counted; wherein the C-DAI represents cumulative number of information pairs including serving cell and PDCCH MO; in the information pairs, there is transmission and/or reception of a sidelink grant and/or transmission and/or reception of a sidelink physical shared channel (PSSCH) scheduled by the sidelink grant; and the T-DAI represents a total number of information pairs including the serving cell and the PDCCH MO; in the information pairs, there is transmission and/or reception of a sidelink grant and/or transmission and/or reception of the PSSCH scheduled by the sidelink grant.

In the embodiment, the first HARQ-ACK codebook includes a first HARQ-ACK semi-static codebook, and the generating the first HARQ-ACK codebook including the second HARQ-ACK feedback information includes: determining a PUCCH resource carrying the second HARQ-ACK feedback information; determining, according to the PUCCH resource, a candidate sidelink reception occasion set; generating a corresponding HARQ-ACK information bit for each candidate sidelink reception occasion in the candidate sidelink reception occasion set; and sorting the generated HARQ-ACK information bits to generate the first HARQ-ACK semi-static codebook including the second HARQ-ACK feedback information.

In the embodiment, the first HARQ-ACK codebook includes a first HARQ-ACK semi-static codebook, and the generating the first HARQ-ACK codebook including the second HARQ-ACK feedback information includes: determining the PUCCH resource carrying the second HARQ-ACK feedback information; determining, according to the PUCCH resource, a candidate sidelink reception occasion set and a candidate PDSCH reception occasion set; generating a corresponding HARQ-ACK information bit for each candidate sidelink reception occasion and each candidate PDSCH reception occasion in the candidate sidelink reception occasion set and the candidate PDSCH reception occasion set; and sorting the generated HARQ-ACK information bits in order to generate the first HARQ-ACK semi-static codebook including the second HARQ-ACK feedback information.

In the embodiment, the second HARQ-ACK feedback information corresponding to the sidelink transmission and the third HARQ-ACK feedback information corresponding to the downlink transmission are multiplexed in the same first HARQ-ACK semi-static codebook or a same sub-codebook in the first HARQ-ACK semi-static codebook; or separate HARQ-ACK semi-static codebooks are generated for the second HARQ-ACK feedback information corresponding to the sidelink transmission and the third HARQ-ACK feedback information corresponding to the downlink transmission, respectively; or separate sub-codebooks in the first HARQ-ACK semi-static codebook are generated for the second HARQ-ACK feedback information corresponding to the sidelink transmission and the third HARQ-ACK feedback information corresponding to the downlink transmission, respectively.

In the embodiment, the determining the candidate sidelink reception occasion set includes: determining the candidate sidelink reception occasion set for a partial bandwidth (BWP) and/or resource pool for sidelink activated in each serving cell corresponding to a given HARQ-ACK feedback time unit.

In the embodiment, the determining the candidate sidelink reception occasion in the candidate sidelink reception occasion set includes: determining at least one of a time domain resource range, a frequency domain resource range, and a code domain resource range including the candidate sidelink reception occasion for a BWP and/or a resource pool for sidelink activated in each serving cell corresponding to a given HARQ-ACK feedback time unit.

In the embodiment, the determining the time domain resource range including the candidate sidelink reception occasion, includes: obtaining a slot timing set q associated with the BWP and/or the resource pool, where q is used to indicate a time domain gap between the sidelink transmission and reporting of the second HARQ-ACK feedback information corresponding to the sidelink transmission; when a given HARQ-ACK feedback time unit is located in a slot n, for all possible values of q, it is sequentially determined whether there is a possible sidelink transmission on a slot n−q, the n−q representing the difference between n and q; and when there is a possible sidelink transmission, the sidelink resource corresponding to the slot n−q is counted into the candidate sidelink reception occasion set.

In the embodiment, determining the number of sidelink resources that may be used for sidelink transmission in one slot, according to at least one of a frequency domain resource range, a code domain resource range, and a configuration of resources used for sidelink transmission; and determining the number of the candidate sidelink reception occasions counted in the slot n−q.

In the embodiment, in the process of generating the first HARQ-ACK semi-static codebook corresponding to the sidelink transmission, the determining the number of sidelink resources that may be used for sidelink transmission in one slot includes: determining a total size of the sidelink resource existing in one slot, according to at least one of a frequency domain resource range and a code domain resource range of the candidate sidelink reception occasion; and determining the number of sidelink resources that may be used for sidelink transmission existing in one slot, according to at least one of time domain granularity, frequency domain granularity and code domain granularity of resource used for sidelink transmission indicated in the configuration of resource used for sidelink transmission, and the total size.

In the embodiment, the determining the candidate sidelink reception occasion set includes: sorting all candidate sidelink reception occasions in the candidate sidelink reception occasion set according to a predetermined criterion; wherein the predetermined criterion includes: sorting in ascending order by at least one of a BWP index, a resource pool index, a frequency domain index, a time domain index, and a code domain index, according to a predetermined order.

In the embodiment, the generating the first HARQ-ACK semi-static codebook corresponding to the sidelink transmission includes: generating a corresponding first type of HARQ-ACK information bit for each candidate PDSCH reception occasion in the candidate PDSCH reception occasion set, and generating a corresponding second type of HARQ-ACK information bit for each candidate sidelink reception occasion in the candidate sidelink reception occasion set; and combining the first type of HARQ-ACK information bit and the second type of HARQ-ACK information bit to generate the first HARQ-ACK semi-static codebook.

In the embodiment, the determining the candidate sidelink reception occasion set and the candidate PDSCH reception occasion set includes: sorting all the candidate reception occasions in the candidate sidelink reception occasion set and the candidate PDSCH reception occasion set according to a predetermined criterion; wherein the predetermined criterion includes at least one of the following: sorting in ascending order by at least one of a BWP index, a resource pool index, a frequency domain index, a time domain index, and a code domain index, according to a predetermined order; and sorting the sidelink reception occasion and the candidate PDSCH reception timing according to at least one of the BWP index, the resource pool index, the frequency domain index, the time domain index, and the code domain index, according to a predetermined order between the downlink and the sidelink.

In the embodiment, when the first UE determines not to transmit sidelink data on one PSSCH and/or PSCCH scheduled by the configured sidelink grant, the HARQ-ACK feedback information corresponding to the PSSCH and/or PSCCH generated by the first UE is ACK.

In the embodiment, the generating the first HARQ-ACK dynamic codebook, including generating a dynamic codebook including sidelink HARQ-ACK feedback information corresponding to a dynamic sidelink grant and/or sidelink HARQ-ACK feedback information corresponding to a configured sidelink grant, includes at least one of the following: generating the dynamic codebook including the sidelink HARQ-ACK feedback information corresponding to the dynamic sidelink grant according to at least one of the C-DAI and the T-DAI, and the HARQ-ACK information bit, wherein the at least one of the C-DAI and the T-DAI is a C-DAI and/or a T-DAI indicated in the dynamic sidelink grant, and the HARQ-ACK information bit is a HARQ-ACK information bit corresponding to a sidelink transmission scheduled by the dynamic sidelink grant; adding the sidelink HARQ-ACK feedback information corresponding to the configured sidelink grant at the end of the dynamic codebook including the sidelink HARQ-ACK feedback information corresponding to the dynamic sidelink grant; and adding the sidelink HARQ-ACK feedback information corresponding to the configured sidelink grant at the end of the first HARQ-ACK dynamic codebook.

In the embodiment, when a total of Q configured sidelink grants are obtained, the second HARQ-ACK feedback information of the sidelink transmission scheduled by all the Q configured sidelink grants are added at the end of the first HARQ-ACK dynamic codebook and/or at the end of the dynamic codebook of the sidelink HARQ-ACK feedback information corresponding to the dynamic sidelink grant, where Q is a positive integer.

In the embodiment, the adding the sidelink HARQ-ACK feedback information corresponding to the configured sidelink grant at the end of the dynamic codebook including the sidelink HARQ-ACK feedback information corresponding to the dynamic sidelink grant and/or the adding the sidelink HARQ-ACK feedback information corresponding to the configured sidelink grant at the end of the first HARQ-ACK dynamic codebook includes: adding a HARQ-ACK information bit corresponding to the configured sidelink grant in a predetermined order, wherein the predetermined order includes at least one of the following: when the configured sidelink grant is obtained, obtaining an index corresponding to the configured sidelink grant; after determining that HARQ-ACK information bits corresponding to K configured sidelink grants need to be added, according to the indexes corresponding to the K configured sidelink grants, sorting the HARQ-ACK information bits corresponding to the configured sidelink grants correspondingly in ascending order by the index or in descending order by the index; wherein K is a positive integer; after determining that the HARQ-ACK information bits corresponding to the K configured sidelink grants need to be added, according to the resource locations of the sidelink transmissions scheduled by the K configured sidelink grants, sorting the HARQ-ACK information bits corresponding to the configured sidelink grants correspondingly; and after determining that the HARQ-ACK information bits corresponding to the K configured sidelink grants, according to types of the K configured sidelink grants, sorting the HARQ-ACK information bits corresponding to the configured sidelink grants correspondingly.

In the embodiment, the obtaining a configuration of a PUCCH candidate resource set for reporting downlink and/or sidelink HARQ-ACK information, and the determining how to generate a HARQ-ACK codebook based on the configuration of the PUCCH candidate resource set, includes any one of the following: when the PUCCH candidate resource set corresponding to the downlink HARQ-ACK report and the PUCCH candidate resource set corresponding to the sidelink HARQ-ACK report are separately configured, generating separate HARQ-ACK codebooks or separate sub-codebooks of the HARQ-ACK codebook for the second HARQ-ACK feedback information corresponding to the sidelink transmission and the third HARQ-ACK feedback information corresponding to the downlink transmission, respectively; when the PUCCH candidate resource set corresponding to the downlink HARQ-ACK report and the PUCCH candidate resource set corresponding to the sidelink HARQ-ACK report are jointly configured, multiplexing the second HARQ-ACK feedback information corresponding to the sidelink transmission and the third HARQ-ACK feedback information corresponding to the downlink transmission in a same HARQ-ACK codebook or a same sub-codebook of the HARQ-ACK codebook; or when the PUCCH candidate resource set corresponding to the downlink HARQ-ACK report and the PUCCH candidate resource set corresponding to the sidelink HARQ-ACK report are separately configured or not separately configured and the same PUCCH candidate resources are included in the PUCCH candidate resource set, generating separate HARQ-ACK codebooks or separate sub-codebooks of the HARQ-ACK codebook for the second HARQ-ACK feedback information corresponding to the sidelink transmission and the third HARQ-ACK feedback information corresponding to the downlink transmission, respectively; or regardless of whether the PUCCH candidate resource set corresponding to the downlink HARQ-ACK report and the PUCCH candidate resource set corresponding to the sidelink HARQ-ACK report are separately configured or not, multiplexing the HARQ-ACK information corresponding to the sidelink transmission and the downlink transmission in a same codebook, or generating separate codebooks for the HARQ-ACK information corresponding to the sidelink transmission and the downlink transmission, respectively.

According to another embodiment of the disclosure, a codebook-based feedback method is provided, which is applied to a third UE, the method includes: receiving a sidelink transmission transmitted by a fourth UE; generating a second HARQ-ACK codebook including HARQ-ACK feedback information corresponding to the sidelink transmission, the second HARQ-ACK codebook including at least one of a second HARQ-ACK dynamic codebook and a second HARQ-ACK semi-static codebook; and transmitting the second HARQ-ACK codebook to the fourth UE.

In the embodiment, the generating the second HARQ-ACK semi-static codebook includes: determining a physical sidelink feedback channel (PSFCH) resource carrying sidelink HARQ-ACK feedback information; determining a candidate sidelink reception occasion set according to the PSFCH resource; generating a corresponding HARQ-ACK information bit for each candidate sidelink reception occasion in the candidate sidelink reception occasion set; and sorting the generated HARQ-ACK information bits to generate the second HARQ-ACK semi-static codebook.

In the embodiment, the determining the candidate sidelink reception occasion set according to the PSFCH resource includes: determining, according to a BWP and/or a resource pool where the PSFCH resource is located, at least one of a time domain resource range, a frequency domain resource range, and a code domain resource range including the candidate sidelink reception occasion; and determining candidate sidelink reception occasion in each slot within the time domain resource range, wherein, the candidate sidelink reception occasion set is composed of candidate sidelink reception occasions in all slots in the time domain resource range.

In the embodiment, in the process of generating the second HARQ-ACK semi-static codebook, a slot timing set f associated with the BWP and/or the resource pool that represents the time domain resource range is configured by a higher layer, wherein the higher layer configuration includes direct configuration and indirect configuration, and the indirect configuration includes determining f according to a PSFCH resource, f being a real number.

In the embodiment, the determining the candidate sidelink reception occasion in each slot includes: determining, according to at least one of a frequency domain resource range and a code domain resource range of the candidate sidelink reception occasion, the total size of a sidelink resource existing in one slot; and determining the number of sidelink resources that may be used for the sidelink transmission and the number of the candidate sidelink reception occasions in one slot, according to at least one of time domain granularity, frequency domain granularity and code domain granularity of resource used for sidelink transmission indicated in the configuration of resource used for the sidelink transmission, and the total size.

In the embodiment, the generating the second HARQ-ACK dynamic codebook including the HARQ-ACK feedback information corresponding to the sidelink transmission includes: determining a PSFCH resource carrying the sidelink HARQ-ACK feedback information; determining, according to the PSFCH resource, a counter downlink assignment index (C-DAI) and/or a total downlink assignment index (T-DAI) corresponding to the sidelink HARQ-ACK feedback information; generating a HARQ-ACK information bit corresponding to the sidelink HARQ-ACK feedback information; and generating the second HARQ-ACK dynamic codebook according to at least one of the C-DAI and T-DAI, and the HARQ-ACK information bit.

In the embodiment, a different second HARQ-ACK dynamic codebook is generated according to at least one of the following information: identification of the UE indicating C-DAI and/or T-DAI, TB/CBG-level HARQ-ACK feedback, CBG configuration, unicast, groupcast, broadcast, and parameters characterizing service priority, wherein the identification of the UE includes at least one of UE ID, UE source ID, group ID of the group in which the UE is located, ID of the UE within the group, and ID index of the UE within the group, where the C-DAI and/or T-DAI are indicated by the second UE in the SCI.

In the embodiment, dynamically determining to enable or disable the second HARQ-ACK dynamic codebook for feedback on the sidelink channel and/or the uplink channel for sidelink groupcast service includes at least one of the following: when frequency domain size of the channel carrying the feedback of the sidelink groupcast service is greater than a predetermined threshold, determining to enable the second HARQ-ACK dynamic codebook for the feedback; when the frequency domain size of the channel carrying the feedback of the sidelink groupcast service is not greater than the predetermined threshold, determining to disable the second HARQ-ACK dynamic codebook for the feedback.

According to another embodiment of the disclosure, a first UE is provided, includes: a first processing module to transmit a sidelink transmission to a second UE; a second processing module to receive first hybrid automatic repeat request acknowledgement (HARQ-ACK) feedback information transmitted by the second UE; a third processing module to generate, according to the received first HARQ-ACK feedback information, second HARQ-ACK feedback information corresponding to the sidelink transmission; a fourth processing module to generate a first HARQ-ACK codebook including the second HARQ-ACK feedback information; and a fifth processing module to report the first HARQ-ACK codebook to a base station.

According to another embodiment of the disclosure, a third UE is provided, includes: a sixth processing module to receive a sidelink transmission transmitted by a fourth UE; a seventh processing module to generate a second HARQ-ACK codebook including HARQ-ACK feedback information corresponding to the sidelink transmission, where the second HARQ-ACK codebook includes at least one of a second HARQ-ACK dynamic codebook and a second HARQ-ACK semi-static codebook; and an eighth processing module to transmit the second HARQ-ACK codebook to the fourth UE.

According to an embodiment of the disclosure, a method performed by a terminal in a wireless communication system is provided, the method includes: receiving, from a base station, a sidelink configured grant for a sidelink transmission; transmitting, to another terminal, a sidelink signal based on the sidelink configured grant; generating a second hybrid automatic repeat request (HARQ) acknowledgement (HARQ-ACK) information based on whether first HARQ-ACK information corresponding to the sidelink signal is received from the another terminal; and reporting on an uplink channel, to a base station, the second HARQ-ACK information.

According to the embodiment of the disclosure, the terminal may include: a transceiver, and at least one processor configured to: receive via the transceiver, from a base station, a sidelink configured grant for a sidelink transmission, transmit via the transceiver, to another terminal, a sidelink signal based on the sidelink configured grant, generate a second hybrid automatic repeat request (HARQ) acknowledgement (HARQ-ACK) information based on whether first HARQ-ACK information corresponding to the sidelink signal is received from the another terminal, and report via the transceiver on an uplink channel, to a base station, the second HARQ-ACK information.

According to another embodiment of the disclosure, a method performed by a terminal in a wireless communication system is provided, the method includes: receiving, from a base station, a downlink signal; transmitting, to another terminal, a sidelink signal; receiving, from the another terminal, a first hybrid automatic repeat request (HARQ)-ACK information associated with the sidelink signal; determining a priority between the first HARQ-ACK information and second HARQ-ACK information associated with the downlink signal based on whether the downlink signal is associated with ultra-reliable and low latency communications (URLLC); and transmitting, to the base station, information with higher priority among the first HARQ-ACK information and the second HARQ-ACK information based on the determined priority.

According to another embodiment of the disclosure, the terminal may include a transceiver; and at least one processor configured to: receive via the transceiver, from a base station, a downlink signal, transmit via the transceiver, to another terminal, a sidelink signal, receive via the transceiver, from the another terminal, a first hybrid automatic repeat request (HARQ)-ACK information associated with the sidelink signal, determine a priority between the first HARQ-ACK information and second HARQ-ACK information associated with the downlink signal based on whether the downlink signal is associated with ultra-reliable and low latency communications (URLLC), and transmit via the transceiver, to the base station, information with higher priority among the first HARQ-ACK information and the second HARQ-ACK information based on the determined priority.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

The above and other objects, features and advantages of the disclosure will become more apparent from the following description of embodiments of the disclosure, taken in conjunction with the accompanying drawings, in which.

DETAILED DESCRIPTION

Figure 1:
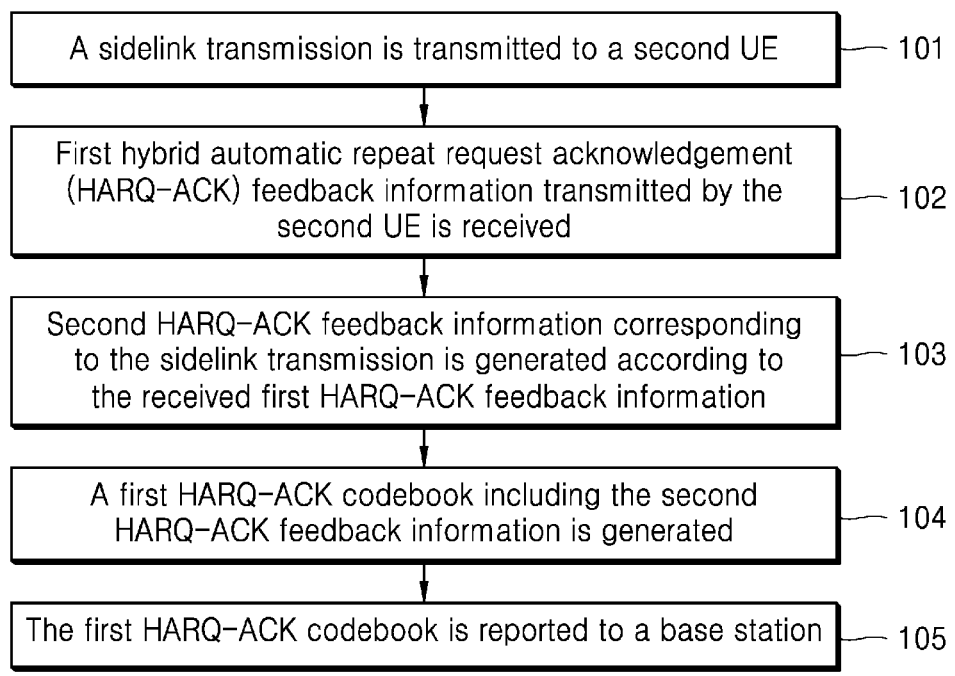
FIG. 1 illustrates a schematic flowchart diagram of a codebook-based feedback method according to an embodiment of the disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described with reference to the accompany drawings. It should be understood, however, that the description is only illustrative, and is not intended to limit the scope of the disclosure. In addition, the description of well-known structures and techniques are omitted in the following specification in order to avoid unnecessarily obscuring the concept of the disclosure.

It is to be understood by those skilled in the art that singular forms "a", "an", "the" and "said" used herein may also include plural forms unless otherwise indicated. It is to be further understood that the phrase "include/comprise" used in the specification indicates the presence of the said feature, integer, step, operation, element, and/or component, but does not exclude the presence or addition of one or more other features, integers, steps, operations, elements, and/or components. It is to be understood that when an element is referred to as being "connected" or "coupled" to other element, it may be directly connected or coupled to the other element or there may be an intermediate element therebetween. Further, the phrase "connection" or "coupling" as used herein may include a wireless connection or a wireless coupling. The phrase "and/or" as used herein may include all or any of the one or more associated terms listed and all combinations thereof.

Those skilled in the art will appreciate that all the terms (including technical and scientific terms) used herein have the same meaning as that is commonly understood by those skilled in the art to which the invention belongs, unless otherwise defined. It should also be understood that terms such as those defined in a general dictionary should be understood to have the meaning being in consistent with the meaning in the context of the prior art, and will not be explained as idealized or excessively formal meaning, unless specifically defined as herein.

Those skilled in the art may understand that the phrases "terminal" and "terminal device" as used herein include not only a radio signal receiver device, which is a device only having a radio signal receiver without a transmitting capability, but also a device with receiving and transmitting hardware, which is a device having receiving and transmitting hardware capable of performing a bidirectional communication over a bidirectional communication link. Such a device may include: a cellular or other communication device having a single line display or a multi-line display or a cellular or other communication device without a multi-line display; a Personal Communication Service (PCS), which may combine voice, data processing, fax and/or data communication capabilities; a Personal Digital Assistant (PDA), which may include a Radio Frequency (RF) receiver, a pager, Internet/Intranet access, a web browser, a notepad, a calendar, and/or a Global Positioning System (GPS) receiver; a conventional laptop and/or palmtop computer or other device, which may be a conventional laptop and/or palmtop computer or other device having and/or including an RF receiver. The "terminal" and "terminal device" as used herein may be portable, transportable, installed in a vehicle (of aviation, maritime, and/or land), or may be adapted and/or configured to operate locally, and/or may operate in a distributed form on the earth and/or at any other locations in space. The "terminal" and "terminal device" used herein may also be a communication terminal, an Internet terminal, a music/video playing terminal, such as a PDA, a Mobile Internet Device (MID), and/or a mobile phone having a music/video playback function, or a smart TV, a set-top box and other devices.

In this application, the sequence number of the message is only used to indicate different messages (for example, a first message, a second message, etc. are used to represent different messages), and does not represent the order in which the messages are executed; the sequence number of the node is only used to indicate different nodes (for example, a first node, a second node, etc. are used to represent different nodes), and does not represent the order in which nodes appear in the information interaction process.

In this application, the message name is only an example and other names may also be used.

In order to better understand and explain the solutions of the embodiments of the disclosure, some techniques involved in the embodiments of the disclosure are briefly described below.

The Physical Sidelink Control Channel (PSCCH) in the embodiments of the disclosure may also be a Physical Downlink Control Channel (PDCCH), an Enhanced Physical Downlink Control Channel (EPDCCH), a Machine Type Communication-Physical Downlink Control Channel (MPDCCH), a Narrowband Physical Downlink Control Channel (NPDCCH), and a New Radio Physical Downlink Control Channel (NR-PDCCH). The Physical Sidelink Shared Channel (PSSCH) may be a Physical Downlink Shared Channel (PDSCH), an Enhanced Physical Downlink Shared Channel (EPDSCH), an MTC Physical Downlink Shared Channel (MPDSCH), an Narrowband Physical Downlink Shared Channel (NPDSCH), and a New Radio Physical Downlink Shared Channel (NR-PDSCH). The Physical Uplink Control Channel (PUCCH) may be other channel dedicated used for carrying a specific uplink control message or a specific uplink sidelink control information.

Optionally, a slot in the following embodiments may be a subframe or a slot in a physical sense, or a subframe or a slot in a logical sense. Specifically, a subframe or a slot in a logical sense is a subframe or a slot corresponding to a resource pool of the sidelink communication. For example, in a V2X system, a resource pool is defined by a repeated bit map that maps to a specific set of slots, which may be all slots or all other slots exclusive of some specific slots (for example, slots for transmitting the MIB/SIB). The slot indicated as "1" in the bitmap may be used for V2X transmission, and belongs to the slots corresponding to the V2X resource pool, whereas the slot indicated as "0" is not available for V2X transmission, and does not belong to the slots corresponding to the V2X resource pool.

Differences between subframes or slots in the physical or logical sense are described through a typical application scenario below. When calculating a time domain gap between two specific channels/messages (for example, a PSSCH carrying sidelink data and a PSFCH carrying corresponding feedback information), and the gap is assumed to have N slots, if a subframe or a slot in the physical sense is calculated, the N slots correspond to an absolute time length of N×x milliseconds in the time domain, in which x is the time length of a physical slot (subframe) under the numerology of the scenario; otherwise, if a subframe or a slot in the logical sense is calculated, taking the sidelink resource pool defined by the bitmap as an example, the gap of the N slots corresponds to the N slots indicated as "1" in the bitmap, and the absolute time length of the gap is changed depending on the specific configuration of the sidelink communication resource pool, that is, it does not have a fixed value.

Optionally, the slot in the following embodiments may be a complete slot, or may be a number of symbols corresponding to the sidelink communication in a slot. For example, when the sidelink communication is configured to be performed on the X1~X2th symbols of each slot, the slots in the following embodiments indicate the X1~X2th symbols in the slot in this scenario; or when the sidelink communication is configured to be performed on a mini slot (mini-slot), the slots in the following embodiments indicate mini-slots defined or configured in the sidelink system, rather than slots in the NR system.

Optionally, in the following embodiments, the information that is configured by a base station, indicated by a signaling, configured by a higher layer, and preconfigured includes a set of configuration information, and further includes multiple sets of configuration information, among which one is selected by the UE according to the predefined conditions, and further includes a set of configuration information including a plurality of subsets, among which a subset is selected by the UE according to the predefined conditions.

Some of the technical solutions provided in the following embodiments are specifically described based on the V2X system, but the application scenario should not be limited to the V2X system in the sidelink communication, but may also be applied to other sidelink transmission systems. For example, designs based on the V2X sub-channel in the following embodiments may also be used for D2D sub-channels or sub-channels of other sidelink transmission. The V2X resource pool in the following embodiments may also be replaced with a D2D resource pool in other sidelink transmission systems, such as D2D. The data channel PSSCH within the V2X system in the following embodiments may also be replaced with a D2D data channel in other sidelink transmission systems, such as D2D.

In Long Term Evolution (LTE) technology, sidelink communication includes two types of main mechanisms, that is, direct communication of Device to Device (D2D) and Vehicle to Vehicle/Infrastructure/Pedestrian/Network (hereinafter referred to as V2X for short). The V2X is designed based on the D2D technology, which is superior to the D2D in terms of data rate, delay, reliability, link capacity, or the like, and is the most representative sidelink communication technology in the LTE technology.

In the LTE V2X system, the sidelink communication also defines different physical channels, including a Physical Sidelink Control Channel (PSCCH) and a Physical Sidelink Shared Channel (PSSCH). The PSSCH is used to carry data, and the PSCCH is used to carry Sidelink Control Information (SCI), in which information on time-frequency domain resource location of the associated PSSCH transmission, modulation and coding scheme, destination ID receiving for the PSSCH or the like is indicated. Sub-channel is defined as a minimum unit of resource allocation in the sidelink communication, where division of the sub-channel is mainly for data channel, and the concept may be similarly applied to control channel.

From a perspective of resource allocation, the LTE V2X system includes two modes: a resource allocation mode based on base station scheduling (Mode 3) and a resource allocation mode selected by a UE autonomously (Mode 4). The modes both are based on sub-channels defined in the sidelink system, and the base station schedules or the UE autonomously selects several control and/or data sub-channels for the sidelink transmission.

Fifth-Generation New Radio (5G NR) system, which is an evolution technology of the LTE, correspondingly includes a further evolution of the sidelink communication, and the concepts of PSCCH and PSSCH are similarly introduced into the NR V2X. The resource allocation mode based on base station scheduling (Mode 1) and the resource allocation mode selected by the UE autonomously (Mode 2) are also supported in the 5G NR system.

The sidelink communication system in the LTE does not support a HARQ-ACK feedback. However, the HARQ-ACK feedback mechanism is introduced into the NR V2X, which is applicable to unicast and groupcast services. After transmitting data and corresponding SCI by a transmitter UE, the corresponding HARQ-ACK feedback information may be transmitted to the transmitter UE by a receiver UE, which enables the transmitter to determine whether a data retransmission is needed. The HARQ-ACK feedback information is transmitted on the sidelink channel. In the NR V2X, a channel for carrying the HARQ-ACK feedback information on the sidelink channel is defined as a Physical Sidelink Feedback Channel (PSFCH).

In addition, in the NR V2X Mode 1, resources used for the sidelink transmission are resources scheduled by a base station (gNB) to the transmitter UE. If the sidelink transmission enables a HARQ-ACK feedback, the transmitter UE may report the HARQ-ACK feedback to the base station after transmitting the sidelink transmission according to the scheduling of the base station and obtaining the HARQ-ACK feedback of the receiver UE. The HARQ-ACK feedback may be used by the transmitter UE to request retransmission resources from the base station. The HARQ-ACK feedback information is transmitted on the uplink channel.

The above two types of feedback information, the HARQ-ACK feedback reported from the sidelink receiver UE to the sidelink transmitter UE and the HARQ-ACK feedback reported from the sidelink transmitter UE to the base station, may be fed back using a HARQ-ACK codebook, so that a larger amount of information may be carried on one HARQ feedback resource or one HARQ feedback channel, and hence overhead introduced by the feedback information transmission may be reduced.

Since the HARQ-ACK feedback is a newly introduced feature in the NR V2X system, compared with the LTE, the transmission of the HARQ-ACK feedback information corresponding to the sidelink transmission on the sidelink lacks a specific mechanism in the existing technique. For a process in which the transmitter UE reports the HARQ-ACK feedback to the base station, the HARQ-ACK codebook used in the NR system can only be used for the HARQ-ACK feedback corresponding to the downlink transmission, and lacks ability to report the HARQ-ACK feedback information corresponding to the sidelink transmission independently or along with others.

The disclosure relates to a codebook-based feedback method and device.

The technical solutions provided by embodiments of the disclosure have the following beneficial effects at least: transmitting a sidelink transmission to a second UE; receiving first HARQ-ACK feedback information transmitted by the second UE; generating, according to the received first HARQ-ACK feedback information, second HARQ-ACK feedback information corresponding to the sidelink transmission; generating a first HARQ-ACK codebook including the second HARQ-ACK feedback information; and reporting the first HARQ-ACK codebook to a base station. In this way, the second HARQ-ACK feedback information corresponding to the sidelink transmission is reported independently or reported with others.

The aspects and advantages of the disclosure will be set forth in the following portion, which will become more apparent from the following description, or will be understood from implementations of the disclosure.

A codebook-based feedback method is provided in the embodiment of the disclosure, the method includes: transmitting a sidelink transmission to a second UE; receiving first hybrid automatic repeat request acknowledgement (HARQ-ACK) feedback information transmitted by the second UE; generating second HARQ-ACK feedback information corresponding to the sidelink transmission according to the received first HARQ-ACK feedback information; generating a first HARQ-ACK codebook including the second HARQ-ACK feedback information; and reporting the first HARQ-ACK codebook to a base station. The method provided in the embodiment of the disclosure realizes reporting of the second HARQ-ACK feedback information corresponding to the sidelink transmission independently or with others.

In the following embodiments, when the sidelink communication system is a V2X system, the terminal or the UE may be a plurality of types of terminals or UEs, such as a vehicle, an infrastructure, a pedestrian.

The sidelink transmission in the following embodiments includes at least one of: transmission of a sidelink data channel carrying the sidelink data, transmission of a sidelink control channel carrying the sidelink control information (SCI) associated with sidelink data, and transmission of a sidelink feedback channel carrying the feedback information corresponding to the sidelink data.

Sidelink communication in NR V2X includes both a blind retransmission-based sidelink communication and an HARQ-based sidelink communication. In the blind retransmission-based sidelink communication, a receiver UE does not provide HARQ-ACK feedback information, and a transmitter UE repeatedly transmits sidelink transmission block N times, wherein N is a predefined or configured value, so the number of transmissions for each transmission block is fixed and will not change according to the feedback information provided by the receiver. In the HARQ-based sidelink communication, the receiver UE needs to transmit HARQ-ACK feedback information, and after transmitting sidelink transmission block, the transmitter determines whether the sidelink transmission block needs to be retransmitted based on whether ACK feedback is received or whether NACK feedback is received.

Further, in NR V2X Mode 1, resources used for the sidelink transmission are that scheduled to a transmitter UE of sidelink data by a base station (gNB). Signaling indicating scheduling information for sidelink transmission send to the UE by the base station is referred to as a sidelink grant. In the existing technique, the sidelink grant includes a dynamic sidelink grant, and a configured sidelink grant, which dynamically and semi-statically indicates sidelink scheduling information, respectively. The configured sidelink grant further includes Type-1 and Type-2 of sidelink grant, which are respectively carried by the PDCCH and the PDSCH. For the Mode 1 sidelink transmission based on the HARQ-ACK feedback mechanism, if resources for the first transmission and retransmission of the sidelink data are all scheduled by the base station, the UE needs to trigger the base station to schedule retransmission resources. This is because whether the sidelink data needs to be retransmitted is determined based on the HARQ-ACK feedback information of the sidelink transmission acquired by the transmitter UE, instead of being predetermined by the base station. In the existing technique, the UE may report the HARQ-ACK feedback information corresponding to the sidelink data to the base station, and the information may be used to trigger the base station to schedule the retransmission resource.

The above two types of feedback information, that is, the HARQ-ACK information fed back by the sidelink receiver UE to the sidelink transmitter UE and the HARQ-ACK information reported by the sidelink transmitter UE to the base station, are used to indicate whether the transmission of the sidelink data is successful (but contents thereof are not necessarily identical), and are transmitted on the sidelink channel and on the uplink channel, respectively.

In the NR system, codebook for HARQ-ACK includes two types of codebook: a semi-static codebook and a dynamic codebook. The semi-static codebook is also referred to as a Type-1 codebook in the existing technique, and refers to a HARQ-ACK codebook generation means, in which the HARQ-ACK codebook size does not dynamically change according to actual data scheduling situations, but is determined according to predefined or RRC configured parameters. The dynamic codebook refers to a codebook generation means in which the HARQ-ACK codebook size is dynamically changed according to the actual data scheduling situations, and the codebook is generated based on DAI domain in the DCI. Both types of codebooks may be used for transmission of HARQ-ACK feedback corresponding to the sidelink data, and the UE determines to use which type of codebook according to higher layer signaling configuration and/or physical layer signaling configuration.

In the NR system, the UE determines, for downlink BWP and uplink BWP activated in each serving cell corresponding to specified HARQ-based feedback time unit, a set of downlink data transmissions that require HARQ-based feedback; the set includes PDSCH transmission scheduled by DCI or of SPS and PSCCH transmission for releasing SPS PDSCH, which are collectively referred to as candidate PDSCH reception occasions. The UE generates HARQ-based information bits for each candidate PDSCH reception occasion in each cell according to the set of candidate PDSCH reception occasions of each cell, the number of RRC-configured cells and other parameters related to HARQ, and combines all HARQ-ACK information bits to determine the HARQ-ACK semi-static codebook.

In the NR system, the UE generates a dynamic codebook according to a Downlink Assignment Index (DAI) domain indicated by the base station in Downlink Control Information (DCI). The DAI indicated in the DCI includes a Count DAI (C-DAI) and a Total DAI (T-DAI), which respectively represent cumulative number of the PDSCH reception or SPS release scheduled by the DCI to current serving cell until current PDCCH Monitoring Occasion, and a total number of PDSCH reception or SPS release scheduled by the DCI until the current PDCCH Monitoring Occasion. If the serving cell enables a Code Block Group (CBG) feedback, the UE generates two HARQ-ACK sub-codebooks for feedback of Transport Block (TB) level and feedback of CBG level, respectively. The two sub-codebooks are placed in order to generate the final HARQ-ACK dynamic codebook. The C-DAI value and the T-DAI value in each sub-codebook are separately counted.

In order to make the objects, technical solutions and advantages of the disclosure more clear, the embodiments of the disclosure will be further described in detail below with reference to the accompanying drawings.

Embodiment 1

In the embodiment of the disclosure, a codebook-based feedback method applied to a first user equipment (UE) is provided. The schematic flowchart of the method is as shown in FIG. 1, and the method includes the following steps.

Step 101, a sidelink transmission is transmitted to a second UE.

Step 102: first hybrid automatic repeat request acknowledgement (HARQ-ACK) feedback information transmitted by the second UE is received.

Step 103: second HARQ-ACK feedback information corresponding to the sidelink transmission is generated according to the received first HARQ-ACK feedback information.

Step 104, a first HARQ-ACK codebook including the second HARQ-ACK feedback information is generated.

Step 105: the first HARQ-ACK codebook is reported to a base station.

In the embodiment of the disclosure, the sidelink transmission is transmitted to the second UE; the first hybrid automatic repeat request acknowledgement (HARQ-ACK) feedback information transmitted by the second UE is received; the second HARQ-ACK feedback information corresponding to the sidelink transmission is generated according to the received first HARQ-ACK feedback information; the first HARQ-ACK codebook including the second HARQ-ACK feedback information is generated; and the first HARQ-ACK codebook is reported to the base station. Thus, the second HARQ-ACK feedback information corresponding to the sidelink transmission being reported independently or reported with others is achieved.

Optionally, a sidelink transmission request is transmitted to the base station.

A sidelink grant transmitted by the base station is received.

The sidelink transmission is transmitted to the second UE according to scheduling information carried in the sidelink grant.

The first hybrid automatic repeat request acknowledgement (HARQ-ACK) feedback information transmitted by the second UE is received.

The second HARQ-ACK feedback information corresponding to the sidelink transmission is generated according to the received first HARQ-ACK feedback information.

The first HARQ-ACK codebook including the second HARQ-ACK feedback information is generated. The first HARQ-ACK codebook includes at least one of a first HARQ-ACK dynamic codebook and a first HARQ-ACK semi-static codebook.

The first HARQ-ACK codebook is reported to the base station.

Optionally, the first HARQ-ACK codebook includes the first HARQ-ACK dynamic codebook, and the generating the first HARQ-ACK codebook including the second HARQ-ACK feedback information includes the following:

determining a physical uplink control channel (PUCCH) resource carrying the second HARQ-ACK feedback information;

determining, according to the PUCCH resource, a counter downlink assignment index (C-DAI) and/or a total downlink assignment index (T-DAI) corresponding to the second HARQ-ACK feedback information;

generating a HARQ-ACK information bit corresponding to the second HARQ-ACK feedback information; and generating a first HARQ-ACK dynamic codebook according to the HARQ-ACK information bit and at least one of the C-DAI and T-DAI.

Optionally, the determining a physical uplink control channel (PUCCH) resource carrying the second HARQ-ACK feedback information includes the following:

when the sidelink transmission is scheduled by the sidelink grant, and the physical downlink control channel (PDCCH) monitoring occasion (MO) of downlink control information (DCI) carrying the sidelink grant and/or the physical downlink shared channel (PDSCH) resource carrying the sidelink grant is determined in slot n, determining to transmit the second HARQ-ACK feedback information of the sidelink data on the PUCCH in slot n+m.

Wherein, the m is determined by at least one of a sidelink HARQ-ACK timing indicator, a higher layer parameter, a configured offset, a preconfigured offset, and a predefined offset indicated in the sidelink grant, where the n and m are real numbers.

The sidelink HARQ-ACK timing indicator indicated in the sidelink grant includes at least one of a PDSCH-to-HARQ-ACK feedback timing indicator, a PDCCH MO-to-HARQ-ACK feedback timing indicator, a PSSCH-to-HARQ-ACK feedback timing indicator, a PSCCH-to-HARQ-ACK feedback timing indicator, and a PSFCH-to-HARQ-ACK feedback timing indicator.

Optionally, the generating the first HARQ-ACK dynamic codebook including the second HARQ-ACK feedback information includes the following:

multiplexing the second HARQ-ACK feedback information corresponding to the sidelink transmission and a third HARQ-ACK feedback information corresponding to the downlink transmission in a same first HARQ-ACK dynamic codebook or a same sub-codebook in the first HARQ-ACK dynamic codebook; or generating separate HARQ-ACK dynamic codebooks for the second HARQ-ACK feedback information corresponding to the sidelink transmission and the third HARQ-ACK feedback information corresponding to the downlink transmission, respectively; or generating separate sub-codebooks in the first HARQ-ACK dynamic codebook for the second HARQ-ACK feedback information corresponding to the sidelink transmission and the third HARQ-ACK feedback information corresponding to the downlink transmission, respectively.

Optionally, the multiplexing the second HARQ-ACK feedback information corresponding to the sidelink transmission and the third HARQ-ACK feedback information corresponding to the downlink transmission in a same first HARQ-ACK dynamic codebook or a same sub-codebook in the first HARQ-ACK dynamic codebook further includes at least one of the following:

the sidelink transmission being scheduled by the sidelink grant, wherein the C-DAI(s) in the sidelink grant and the PDSCH reception associated with the DCI format 1_0 are jointly counted;

the sidelink transmission being scheduled by the sidelink grant, wherein the C-DAI(s) in the sidelink grant and the C-DAI of the semi-persistent scheduling (SPS) PDSCH release associated with the DCI format 1_0 are jointly counted;

the sidelink transmission being scheduled by the sidelink grant, wherein the C-DAI(s) in the sidelink grant and the PDSCH reception associated with the DCI format 1_1 are jointly counted;

the sidelink transmission being scheduled by the sidelink grant, wherein the C-DAI(s) in the sidelink grant and the C-DAI of the SPS PDSCH release associated with the DCI format 1_1 are jointly counted;

the sidelink transmission being scheduled by the sidelink grant, wherein the T-DAI(s) in the sidelink grant and the T-DAI of the PDSCH reception associated with the DCI format 1_1 are jointly counted.

Optionally, the generating the first HARQ-ACK dynamic codebook including the second HARQ-ACK feedback information further includes at least one of the following:

determining whether at least one sidelink transmission enables code block group (CBG) transmission according to at least one of configured information, preconfigured information, and predefined information;

generating a TB-based second HARQ-ACK feedback information or a HARQ-ACK information bit corresponding to the second HARQ-ACK feedback information for the at least one sidelink transmission if the CBG transmission is not enabled;

generating a CBG-based second HARQ-ACK feedback information or a HARQ-ACK information bit corresponding to the second HARQ-ACK feedback information for the at least one sidelink transmission if the CBG transmission is enabled.

The sidelink transmission includes at least one of the following:

a sidelink transmission within a serving cell, a sidelink transmission within a sidelink resource pool, a sidelink transmission in a sidelink transmission mode, a sidelink transmission of one service type, a sidelink transmission of one transmission type, a sidelink transmission corresponding to one type of grant, and a given sidelink transmission.

Optionally, the generating the CBG-based second HARQ-ACK feedback information or the HARQ-ACK information bit corresponding to the second HARQ-ACK feedback information for the at least one sidelink transmission includes:

obtaining maximum number of the CBGs included in one TB of the sidelink data included in the sidelink transmission.

The obtaining a maximum number of the CBGs included in one TB of the sidelink data included in the sidelink transmission includes at least one manner of the following:

obtained by the CBG-related configuration of the sidelink, obtained by the CBG-related pre-configuration of the sidelink, obtained by the configuration of the sidelink resource pool, and obtained by the pre-configuration of the sidelink resource pool.

Optionally, the generating the first HARQ-ACK dynamic codebook corresponding to the sidelink transmission includes:

generating a first HARQ-ACK dynamic sub-codebook and a second HARQ-ACK dynamic sub-codebook, the first HARQ-ACK dynamic sub-codebook corresponding to the third HARQ-ACK feedback information of TB-based downlink transmission and/or the second HARQ-ACK feedback information of TB-based sidelink transmission, the second HARQ-ACK dynamic sub-codebook corresponding to the third HARQ-ACK feedback information of CBG-based downlink transmission and/or the second HARQ-ACK feedback information of CBG-based sidelink transmission.

Further, if it is determined that at least one or one sidelink transmission enables CBG transmission, the generating a first HARQ-ACK dynamic codebook corresponding to the sidelink transmission includes the above generating the first HARQ-ACK dynamic sub-codebook and the second HARQ-ACK dynamic sub-codebook. Otherwise, if it is determined that any type of or any of the sidelink transmissions does not enable the CBG transmission, the generating the first HARQ-ACK dynamic codebook corresponding to the sidelink transmission includes the above generating the first HARQ-ACK dynamic sub-codebook and does not include the above generating the second HARQ-ACK dynamic sub-codebook, or includes the above generating the first HARQ-ACK dynamic sub-codebook and the above generating the second HARQ-ACK dynamic sub-codebook, wherein content of the second HARQ-ACK dynamic sub-codebook is empty, and/or length thereof is 0 bit.

Optionally, the C-DAI and the T-DAI corresponding to the first HARQ-ACK dynamic sub-codebook and the second HARQ-ACK dynamic sub-codebook are separately counted, and in the first HARQ-ACK dynamic sub-codebook and the second HARQ-ACK dynamic sub-codebook, the C-DAI and/or T-DAI corresponding to the sidelink transmission and the downlink transmission are jointly counted. The joint count means that the sidelink transmission and the downlink transmission are multiplexed in a same HARQ-ACK dynamic codebook.

Sidelink grants in the sidelink communication system include dynamic grant and configured grant, and the configured grant includes Type 1 and Type 2 configured grant. The dynamic grant is indicated by the DCI; the Type 1 configured grant is only indicated by the RRC signaling; the Type 2 configured grant is indicated by the RRC signaling and the DCI, and the DCI signaling is only acquired once from the base station when the Type 2 configured grant is activated. Therefore, the transmission of the sidelink HARQ feedback information corresponding to the configured grant is not suitable for being dynamically scheduled.

Optionally, the dynamic codebook including the sidelink HARQ feedback information corresponding to the dynamic grant and the sidelink HARQ feedback information corresponding to the configured grant is generated by using at least one of the following methods:

the C-DAI and/or T-DAI corresponding to the first HARQ-ACK dynamic codebook and/or the first HARQ-ACK dynamic sub-codebook and/or the second HARQ-ACK dynamic sub-codebook are C-DAI and/or T-DAI indicated in the dynamic grant signaling in the sidelink grant; accordingly, the codebook generated according to the C-DAI and/or T-DAI includes HARQ-ACK information bit corresponding to the sidelink transmission scheduled by the dynamic sidelink grant, that is to say, the codebook generated according to the C-DAI and/or T-DAI includes second HARQ-ACK feedback information of the sidelink transmission scheduled by the dynamic grant;

the generating the first HARQ-ACK dynamic codebook includes: adding the second HARQ-ACK feedback information of the sidelink transmission scheduled by the configured grant at the end of the codebook generated according to the C-DAI and/or T-DAI; or after generating the first HARQ-ACK dynamic codebook according to other steps, additionally adding the second HARQ-ACK feedback information of the sidelink transmission scheduled by the configured grant at the end of the first HARQ-ACK dynamic codebook.

Optionally, when a total of Q configured sidelink grants are obtained, the second HARQ-ACK feedback information of the sidelink transmission scheduled by all the Q configured sidelink grants are added at the end of the first HARQ-ACK dynamic codebook, where Q is a positive integer. Optionally, the configured sidelink grant specifically includes Type 1 configured grant and/or Type 2 configured grant. If the configured sidelink grant only includes Type 1 configured grant, the Type 2 configured grant is not counted when calculating the value of Q; and vice versa.

Optionally, if there is an inactivated sidelink grant in the Q configured sidelink grants, the second HARQ-ACK feedback information corresponding to the inactive sidelink grant is set to be a predetermined state, for example, set to be a NACK (or set to be an ACK).

In this method, the first HARQ-ACK dynamic codebook includes information bits of feedback information of all activated and inactivated configured grants. The advantage of this method is that the size is fixed rather than varied based on the active state of the configurated grant, and complexity is low.

Optionally, when P configured sidelink grants are activated, and the sidelink transmission scheduled by the configured sidelink grant meets a preset condition, second HARQ-ACK feedback information of the sidelink transmission scheduled by the activated P configured sidelink grants is added at the end of the first HARQ-ACK dynamic codebook and/or at the end of dynamic codebook of the sidelink HARQ-ACK feedback information corresponding to the dynamic sidelink grant, where P is a positive integer. Optionally, the configured sidelink grant specifically includes Type 2 configured grant, that is, when calculating the value of P, the Type 1 configured grant is not counted; and vice versa.

In this method, the first HARQ-ACK dynamic codebook includes only the information bits of the feedback information of activated configured grant. The advantage of this method is that removing of the information bits corresponding to the inactivated configured grant may reduce overhead, and the disadvantage thereof is that the complexity is relatively high.

Optionally, the generating the first HARQ-ACK dynamic codebook further includes at least one of the following:

in the first HARQ-ACK dynamic codebook, first adding a HARQ-ACK information bit corresponding to the SPS PDSCH, and then adding a HARQ-ACK information bit corresponding to the configured sidelink grant;

the HARQ-ACK information bits corresponding to the SPS PDSCH and the configured sidelink grant being sorted according to the same criterion and added to the first HARQ-ACK dynamic codebook in sequence;

adding the HARQ-ACK information bit corresponding to the configured sidelink grant at the end of a sub-codebook in the first HARQ-ACK dynamic codebook corresponding to the second HARQ-ACK feedback information of the sidelink transmission;

adding the HARQ-ACK information bit corresponding to the SPS PDSCH at the end of the sub-codebook in the first HARQ-ACK dynamic codebook corresponding to the third HARQ-ACK feedback information of the downlink transmission.

Optionally, the adding the HARQ-ACK information bit corresponding to the configured sidelink grant includes adding the HARQ-ACK information bit corresponding to the configured sidelink grant in a predetermined order. The predetermined order includes at least one of the following:

when the configured sidelink grant is obtained, obtaining an index corresponding to each or at least one of the configured sidelink grant; after determining that HARQ-ACK information bits corresponding to K configured sidelink grants need to be added in the first HARQ-ACK dynamic codebook (or in the sub-codebook contained in the first HARQ-ACK dynamic codebook), according to the indexes corresponding to the K configured sidelink grants, sorting the HARQ-ACK information bits corresponding to the configured sidelink grants correspondingly in ascending order by the index (or in descending order by the index); wherein the index may be part of the content of the configuration information of the configured sidelink grant, or may be determined by deriving according to the configuration information of the configured sidelink grant; where K is a positive integer.

after determining that the HARQ-ACK information bits corresponding to the K configured sidelink grants need to be added in the first HARQ-ACK dynamic codebook (or the sub-codebook contained in the first HARQ-ACK dynamic codebook), according to resource locations of the sidelink transmissions scheduled by the K configured sidelink grants, sorting the HARQ-ACK information bits corresponding to the configured sidelink grants correspondingly; wherein the sorting according to the resource locations further includes sorting according to the time domain resource location from early to late first, and then the frequency domain resource location from low to high; wherein the resource location of the sidelink transmission is a resource location meeting a preset condition among the sidelink resources scheduled by the configured sidelink grant; and if a plurality of resource locations are included, the resource location of the sidelink transmission is the first or last one or a specific one or more of the plurality of resource locations;

after determining that the HARQ-ACK information bits corresponding to the K configured sidelink grants need to be added in the first HARQ-ACK dynamic codebook (or in the sub-codebook contained in the first HARQ-ACK dynamic codebook), according to types of the K configured sidelink grants being Type 1 or Type 2 configured sidelink grant, sorting the HARQ-ACK information bits; for example, the HARQ-ACK information bits corresponding to the Type 1 configured grant are added first, and then the HARQ-ACK information bits corresponding to the Type 2 configured grant are added.

In a specific example, the UE obtains a total of Q=Q1+Q2 configured grants, including Q1 Type 1 configured grants and Q2 Type 2 configured grants, wherein the indexes of the Type 1 configured grant are respectively $\{1, 2, \ldots, Q1\}$, P of the Type 2 configured grants are activated, and the corresponding indexes thereof are respectively $\{Q2\_1, Q2\_2, \ldots, Q2\_P\}$. The UE determines that the HARQ-ACK information bits corresponding to the Q1 Type 1 configured grants and the HARQ-ACK information bits corresponding to the P Type 2 configured grants need to be added in the first HARQ-ACK dynamic codebook. The UE sorts the HARQ-ACK information bits corresponding to the Q1 Type 1 configured grants according to the indexes of the Q1 Type 1 configured grants, and sorts the HARQ-ACK information bits corresponding to the P Type 2 configured grants according to the indexes of the P Type 2 configured grants, and then places the sorted HARQ-ACK information bits corresponding to the Type 1 configured grant first and then the sorted HARQ-ACK information bits corresponding to the Type 2 configured grant. For example, assuming that each configured grant corresponds to one HARQ-ACK information bit, the UE generates a total of Q1+P HARQ-ACK information bits, wherein the first Q1 HARQ-ACK information bits sequentially correspond to the Type 1 configured grants indexed as 1, 2, . . . , Q1, and the last P HARQ-ACK information bits sequentially correspond to the Type 2 configured grant indexed as Q2_1, Q2_2, . . . , Q2_P, where Q2_1<Q2_2< . . . <Q2_P.

In another specific example, the UE obtains a total of four configured grants {CG1, CG2, CG3, CG4}, resource locations of sidelink transmission scheduled by which are respectively {slot t1, sub-channel s1}, {slot t2, sub-channel s2}, {slot t3, sub-channel s3}, and {slot t4, sub-channel s4}. The UE firstly sorts the slots t1~t4 according to the time domain resource location from early to late, and if there are more than one resource location in a same slot, then sorts the corresponding sub-channels according to the frequency domain resource location from low to high. For example, assuming that t1<t2=t3<t4, and s2>s3, the sorting result is {CG1, CG3, CG2, CG4}. The UE adds the HARQ-ACK information bits of {CG1, CG3, CG2, CG4} in order according to the sorting result.

In the above example, the HARQ-ACK information bit corresponding to the SPS PDSCH or the configured sidelink grant is added at the end of the codebook/sub-codebook; similarly, the method may also be changed to add the information bit at the starting of the codebook/sub-codebook. The base station may calculate several HARQ-ACK information bits corresponding to the corresponding SPS PDSCH and/or the configured sidelink grant from the end, and assume that other parts are dynamic codebooks generated based on DAI; similarly, the base station may calculate several HARQ-ACK information bits corresponding to the corresponding SPS PDSCH and/or the configured sidelink grant from the starting, and assume that other parts are dynamic codebooks generated based on DAI. The specific location to which the HARQ-ACK information bit corresponding to the SPS PDSCH or the configured sidelink grant is added does not affect the effectiveness and feasibility of the above method.

Optionally, when P configured sidelink grants are activated, and the sidelink transmissions scheduled by the configured sidelink grants meet a preset condition, K bits of the second HARQ-ACK feedback information corresponding to the configured sidelink grant are added at the end of the first HARQ-ACK dynamic codebook and/or at the end of the dynamic codebook including the sidelink HARQ-ACK feedback information corresponding to the dynamic sidelink grant, where each of P and K is a positive integer.

Optionally, meeting of the preset condition includes: time domain location and/or frequency domain location of the sidelink resource scheduled by a certain configured sidelink grant being within a specific time window and/or frequency domain range, the specific time window and/or frequency domain range being determined according to the uplink resource used to report the sidelink HARQ-ACK information. For example, the specific time window and/or frequency domain range is determined according to the uplink resource carrying the first HARQ-ACK dynamic codebook.

Optionally, the method for determining the K bits includes at least one of the following:

if P is less than or equal to K, and/or if the number of bits of the second HARQ-ACK feedback information corresponding to the P configured sidelink grants is less than or equal to K, the K bits include the second HARQ-ACK feedback information corresponding to the P configured sidelink grants; optionally, the second HARQ-ACK feedback information corresponding to the P configured sidelink grants is mapped to the K bit locations in a predetermined order, and if the K bit locations include a bit location that does not have the second HARQ-ACK feedback information corresponding to the configured sidelink grant, the value at the bit location is set to a predetermined value; wherein, the predetermined order may be determined according to index of the configured sidelink grant;

if P is greater than K, and/or if the number of bits of the second HARQ-ACK feedback information corresponding to the P configured sidelink grants is greater than K, the K bits include the second HARQ-ACK feedback information corresponding to P' configured sidelink grants, the P' configured sidelink grants among the activated P configured sidelink grants are determined according to at least one of the following:

priority of service; for example, selecting the P' configured sidelink grants with the highest service priority among the P configured sidelink grants; or selecting the P' configured sidelink grants with the highest service priority and the sum of number of bits of the second HARQ-ACK feedback information corresponding thereto being not greater than K among the P configured sidelink grants;

location of sidelink resource scheduled in the configured sidelink grants; for example, selecting the P' configured sidelink grants, which schedule the latest sidelink resources before location of uplink resource for reporting the sidelink HARQ-ACK information, among the P configured sidelink grants; for example, the UE reporting the sidelink HARQ-ACK information to the base station on the PUCCH resource in slot n, and the reported information including the HARQ-ACK information corresponding to the configured sidelink grants, which schedule the sidelink transmissions in slot [n−a, n−b], where the configured sidelink grants total P=3, and the scheduled sidelink transmissions are respectively in slots n−P1, n−P2, and n−P3, and P1>P2>P3; if the UE reports the HARQ-ACK information corresponding to P'=2 configured sidelink grants, selecting 2 configured sidelink grants, which schedule the latest two sidelink resources before slot n, among the P=3 configured sidelink grants, that is, the 2 configured sidelink grants scheduling the sidelink transmissions in slots n−P2 and n−P3, respectively;

index of the configured sidelink grant; for example, selecting the P' configured sidelink grants with the lowest index among the P configured sidelink grants; and P'=P, that is, selecting all of the P configured sidelink grants.

For the above method, optionally, each sidelink grant corresponds to 1-bit HARQ-ACK feedback information, and P'=K. This situation further includes that each sidelink grant corresponds to one HARQ process, or that each sidelink grant corresponds to more than one HARQ processes. If each sidelink grant corresponds to multiple HARQ processes, each sidelink grant generates a corresponding 1-bit HARQ-ACK feedback information using a manner of HARQ bundling.

For the above method, optionally, multiple sidelink grants share the same HARQ-ACK bit. For example, the P' configured sidelink grants generate 1-bit HARQ-ACK feedback information (P'>1). For example, the P' configured sidelink grants generate K-bits HARQ-ACK feedback information, where P1 configured sidelink grants correspond to the first bit in the HARQ-ACK feedback information, and P2 configured sidelink grants correspond to the second bit in the HARQ-ACK feedback information, and so on. The value of P' and/or mapping relationship that each configured sidelink grant in the P' configured sidelink grants should be mapped to which bit in the K bits may be (pre)configured, or (pre)defined or determined according to a predetermined criterion.

When the sidelink HARQ-ACK information is reported to the base station, or when the sidelink HARQ-ACK information is fed back to the transmitter UE of the sidelink transmission, according to the mapping relationship between the configured sidelink grant and the HARQ-ACK bit, there is the following possible situations: one configured sidelink grant corresponds to 1-bit HARQ-ACK information; more than one configured sidelink grants correspond to 1-bit HARQ-ACK information; and one configured sidelink grant corresponds to more than one bit of HARQ-ACK information. For the mapping relationship between the configured sidelink grant and the HARQ-ACK bit when reporting the sidelink HARQ-ACK information to the base station, a specific example is to report the sidelink HARQ-ACK information in the form of a dynamic HARQ-ACK codebook to the base station, and the HARQ-ACK information of a total of P' configured sidelink grants is indicated in the dynamic HARQ-ACK codebook, where the HARQ-ACK information of the total of P' configured sidelink grants uses K bits at the end of the dynamic HARQ-ACK codebook.

Optionally, when more than one configured sidelink grants correspond to 1-bit HARQ-ACK information, at least one of the following methods is used to transmit the sidelink transmission and/or generate the 1-bit HARQ-ACK information:

when the more than one configured sidelink grants correspond to the same HARQ process, the HARQ-ACK information is generated according to the legacy method of generating HARQ-ACK information bits for a HARQ process, and the generated 1-bit HARQ-ACK information is the HARQ-ACK state corresponding to the latest transmission scheduled by the more than one configured sidelink grants;

when the more than one configured sidelink grants correspond to more than one HARQ processes, in the more than one HARQ processes, independent TBs are transmitted, and 1-bit HARQ-ACK information is generated by the manner of HARQ bundling; specifically, if any one of the configured sidelink grants corresponds to NACK information, 1-bit NACK information is generated; otherwise, if all of the configured sidelink grants correspond to ACK information, 1-bit ACK information is generated;

when the more than one configured sidelink grants correspond to more than one HARQ processes, the same TB is transmitted in the more than one HARQ processes; if any one of the configured sidelink grants corresponds to ACK information, which means that the TB is successfully transmitted on the sidelink resource scheduled by the at least one configured sidelink grant, 1-bit ACK information is generated; otherwise, if all of the configured sidelink grants correspond to NACK information, 1-bit NACK information is generated;

when the more than one configured sidelink grants correspond to more than one HARQ processes, but since there is only one reporting occasion, the more than one HARQ processes is treated as one HARQ process, that is, the same TB is transmitted in the more than one HARQ processes until the TB is successfully transmitted, the next same TB is then transmitted in the more than one HARQ processes until the next TB is successfully transmitted; and the HARQ-ACK information is generated according to the legacy method of generating HARQ-ACK information bits for a HARQ process, and the generated 1-bit HARQ-ACK information is the HARQ-ACK state corresponding to the latest transmission scheduled by the more than one configured sidelink grants.

For the above-mentioned the more than one configured sidelink grants corresponding to 1-bit HARQ-ACK information, a specific example is that the transmitter UE of the sidelink service reports the sidelink HARQ-ACK information to the base station through the PUCCH in slot n. The sidelink HARQ-ACK information is reported in the form of a dynamic codebook, and the dynamic codebook includes K=1 bit of HARQ-ACK information for indicating a specific configured sidelink grant. The specific configured sidelink grants are activated and schedule the sidelink resources within the time window [n−a, n−b], and specific configured sidelink grants total P', where P' is a real number greater than 1 (in other example there may also be P'=1 or P'=0). Each of a and b is a (pre)defined or (pre)configured real number.

In a specific example, the transmitter UE of the sidelink service reports the sidelink HARQ-ACK information to the base station through the PUCCH in slot n, and the sidelink HARQ-ACK information is reported in the form of a dynamic codebook. The dynamic codebook includes 1-bit HARQ-ACK information for indicating a specific configured sidelink grant. The specific configured sidelink grant includes the configured sidelink grant which schedules sidelink transmission within the time window [n−a, n−b], where a and/or b are (pre)configured or (pre)defined by a higher layer. According to the specific state of the specific configured sidelink grant, the transmitter UE may generate 1-bit HARQ-ACK information for indicating the specific configured sidelink grant based on at least one of the following methods:

if the specific configured sidelink grant includes one configured sidelink grant, the 1 bit indicates the HARQ-ACK information corresponding to the one configured sidelink grant;

if the specific configured sidelink grant includes one or more configured sidelink grants, and the one or more configured sidelink grants correspond to one HARQ process in total, the 1 bit indicates the HARQ-ACK information corresponding to the one HARQ process; wherein, the HARQ process corresponding to the configured sidelink grant is (pre)configured by the higher layer or derived by the UE according to a (pre)defined criterion;

if the specific configured sidelink grant includes one or more configured sidelink grants, and the one or more configured sidelink grants correspond to more than one HARQ processes in total, the 1 bit is generated using the manner of HARQ bundling; specifically, when the HARQ-ACK states of the more than one HARQ processes are all ACK, 1-bit ACK information is generated, otherwise 1-bit NACK information is generated; or, when the HARQ-ACK states of the more than one HARQ processes are all NACK, 1-bit NACK information is generated, otherwise 1-bit ACK information is generated;

if the specific configured sidelink grant includes multiple configured sidelink grants, and the multiple configured sidelink grants correspond to more than one HARQ processes in total, one of the multiple configured sidelink grants is selected, and the 1 bit is generated according to the HARQ-ACK information corresponding to the selected configured sidelink grant; optionally, one of the multiple configured sidelink grants is selected according to at least one of the following: service priority, for example, selecting the configured sidelink grant with the highest service priority (may be the service priority of the sidelink data transmitting on the scheduled sidelink transmission); time domain and/or frequency domain and/or code domain location of the resource for the sidelink transmission scheduled by the configured sidelink grant, for example, selecting a configured sidelink grant which schedules the latest sidelink transmission in the time domain; destination ID, for example, selecting a configured sidelink grant which schedules a sidelink transmission corresponding to a specific destination ID; geographical location, for example, selecting a sidelink grant which schedules a sidelink transmission corresponding to the smallest communication distance; and delay, for example, selecting a sidelink grant which schedules a sidelink transmission corresponding to the lowest delay budget;

if the specific configured sidelink grant includes one or more configured sidelink grants, and the one or more configured sidelink grants correspond to more than one HARQ processes in total, one of the more than one HARQ processes is selected, and the 1 bit is generated according to the HARQ-ACK information corresponding to the selected HARQ process; optionally, the specific method of selecting one from the more than one HARQ processes is similar to the method of selecting one configured sidelink grant from the multiple configured sidelink grants; and if the specific configured sidelink grant includes one or more configured sidelink grants, and the one or more configured sidelink grants correspond to more than one HARQ processes in total, the more than one HARQ processes are used as one HARQ process rather than multiple HARQ processes in parallel; specifically, after a previous HARQ process transmits a specific TB, if the TB transmission is successful and/or the maximum number of retransmissions has been reached, a latter HARQ process may transmit a new TB, otherwise, the latter HARQ process needs to retransmit the specific TB; the UE generates 1-bit HARQ-ACK information according to the HARQ state of the latest HARQ process; taking a specific scenario as an example, it is assumed that the one or more configured sidelink grants, when sorting according to the time domain resource location of the scheduled sidelink transmissions, correspond to HARQ processes 1, 2, 3, and 4 in sequence, and the HARQ process 1 transmits a certain transmission of TB1 and the transmission state is failed, and then the HARQ process 2 transmits a retransmission of TB1 and the transmission state is failed, then the HARQ process 3 transmits the retransmission of TB1 and the transmission state is successful, then the HARQ process 4 transmits a first transmission of TB2 and the transmission state is successful, the UE generates 1-bit ACK information according to the HARQ-ACK state of the HARQ process 4.

It should be noted that the HARQ-ACK state of the HARQ process and the HARQ-ACK information corresponding to the configured sidelink grant in the above example are not completely equivalent to the HARQ process or the HARQ-ACK information received by the sidelink transmission corresponding to the sidelink grant on the sidelink feedback channel PSFCH. For example, if the UE transmits groupcast data and a method of transmitting only NACK and transmitting no ACK is used, it is possible that any HARQ-ACK information is not received on the sidelink feedback channel, however, the HARQ-ACK state at this time should be understood as ACK. The method of determining the HARQ-ACK state of the HARQ process and the HARQ-ACK information corresponding to the configured sidelink grant may be any one of the methods in the existing technique for determining the sidelink HARQ-ACK information content when reporting the sidelink HARQ-ACK information to the base station.

If the base station may schedule fewer PUCCH resources for the UE in order to save uplink overhead and reduce the negative impact of half-duplex on the UE monitoring sidelink resource pool, the requirement that each configured sidelink grant has a corresponding independent PUCCH resource cannot be met, that is, the UE cannot guarantee that a PUCCH is only associated with one configured sidelink grant when the UE reports the sidelink HARQ-ACK information every time through the PUCCH. However, in the existing technique, only 1 bit is used to indicate the configured sidelink grant, and the UE does not report HARQ-ACK information of multiple configured sidelink grants. Therefore, the above example provides a method that how to transmit in the more than one configured sidelink grants and/or generate 1-bit HARQ-ACK information corresponding to the configured sidelink grant when one PUCCH resource is associated with the more than one configured sidelink grants.

Optionally, the generating separate HARQ-ACK dynamic codebooks or sub-codebooks in the first HARQ-ACK dynamic codebook for the second HARQ-ACK feedback information corresponding to the sidelink transmission and the third HARQ-ACK feedback information corresponding to the downlink transmission respectively further includes:

sorting the downlink HARQ-ACK dynamic codebook corresponding to the third HARQ-ACK feedback information of the downlink transmission and the sidelink HARQ-ACK dynamic codebook corresponding to the second HARQ-ACK feedback information of the sidelink transmission to generate the first HARQ-ACK dynamic codebook;

the C-DAI and/or T-DAI corresponding to the downlink HARQ-ACK dynamic codebook and the C-DAI and/or T-DAI corresponding to the sidelink HARQ-ACK dynamic codebook being separately counted; wherein the C-DAI represents cumulative number of information pairs including the serving cell and the PDCCH MO; in the information pairs, there is transmission and/or reception of a sidelink grant, and/or transmission and/or reception of a sidelink physical shared channel (PSSCH) scheduled by the sidelink grant; and the T-DAI represents a total number of information pairs including the serving cell and the PDCCH MO; in the information pairs, there is transmission and/or reception of a sidelink grant, and/or transmission and/or reception of PSSCH scheduled by the sidelink grant.

Optionally, the first HARQ-ACK codebook includes a first HARQ-ACK semi-static codebook, and the generating the first HARQ-ACK codebook including the second HARQ-ACK feedback information includes:

determining a PUCCH resource carrying the second HARQ-ACK feedback information;

determining a candidate sidelink reception occasion set according to the PUCCH resource;

generating a corresponding HARQ-ACK information bit for each candidate sidelink reception occasion in the candidate sidelink reception occasion set;

sorting the generated HARQ-ACK information bits to generate the first HARQ-ACK semi-static codebook including the second HARQ-ACK feedback information.

Optionally, the first HARQ-ACK codebook includes a first HARQ-ACK semi-static codebook, and the generating the first HARQ-ACK codebook including the second HARQ-ACK feedback information includes:

determining a PUCCH resource carrying the second HARQ-ACK feedback information;

determining a candidate sidelink reception occasion set and a candidate PDSCH reception occasion set according to the PUCCH resource;

generating a corresponding HARQ-ACK information bit for each candidate sidelink reception occasion and each candidate PDSCH reception occasion in the candidate sidelink reception occasion set and the candidate PDSCH reception occasion set;

sorting the generated HARQ-ACK information bits so as to generate the first HARQ-ACK semi-static codebook including the second HARQ-ACK feedback information.

Optionally, the second HARQ-ACK feedback information corresponding to the sidelink transmission and the third HARQ-ACK feedback information corresponding to the downlink transmission are multiplexed in a same first HARQ-ACK semi-static codebook or a same sub-codebook in the first HARQ-ACK semi-static codebook.

Alternatively, separate HARQ-ACK semi-static codebooks are generated for the second HARQ-ACK feedback information corresponding to the sidelink transmission and the third HARQ-ACK feedback information corresponding to the downlink transmission, respectively.

Alternatively, separate sub-codebooks in the first HARQ-ACK semi-static codebook are generated for the second HARQ-ACK feedback information corresponding to the sidelink transmission and the third HARQ-ACK feedback information corresponding to the downlink transmission, respectively.

Optionally, the determining the candidate sidelink reception occasion set includes:

determining a candidate sidelink reception occasion set for a partial bandwidth BWP and/or resource pool for sidelink activated in each serving cell corresponding to a given HARQ-ACK feedback time unit.

Optionally, the determining the candidate sidelink reception occasion in the candidate sidelink reception occasion set includes:

determining at least one of a time domain resource range, a frequency domain resource range, and a code domain resource range including a candidate sidelink reception occasion for a BWP and/or a resource pool for sidelink activated in each serving cell corresponding to a given HARQ-ACK feedback time unit.

Optionally, the determining the time domain resource range including candidate sidelink reception occasion includes:

obtaining a slot set q associated with the BWP and/or the resource pool, where q is used to indicate a time domain gap between the sidelink transmission and the second HARQ-ACK feedback information reporting corresponding to the sidelink transmission;

when a given HARQ-ACK feedback time cell is in the slot n, for all possible values of q, sequentially determining whether there is a possible sidelink transmission on the slot n−q, where n−q represents the difference between n and q;

when there is a possible sidelink transmission, counting the sidelink resource corresponding to the slot n−q into the candidate sidelink reception occasion set.

Optionally, according to at least one of a frequency domain resource range of the sidelink reception occasion, a code domain resource range of the sidelink reception occasion, and a configuration of resource used for sidelink transmission, the number of sidelink resources that may be used for sidelink transmission existing in one slot is determined.

The number of candidate sidelink reception occasions counted in the slot n−q is determined.

Optionally, in the process of generating the first HARQ-ACK semi-static codebook corresponding to the sidelink transmission, the determining the number of sidelink resources that may be used for sidelink transmission existing in one slot includes:

determining a total size of the sidelink resources existing in one slot according to at least one of a frequency domain resource range and a code domain resource range of the candidate sidelink reception occasion; and determining the number of sidelink resources that may be used for sidelink transmission existing in one slot according to at least one of time domain granularity, frequency domain granularity, and code domain granularity of the resources used for sidelink transmission indicated in the configuration of resources used for sidelink transmission as well as the total size of the resources used for sidelink transmission.

Optionally, the determining the candidate sidelink reception occasion set includes of:

sorting all candidate sidelink reception occasions in the candidate sidelink reception occasion set according to predetermined criterion. The predetermined criterion includes:

sorting in at least one of a BWP index, a resource pool index, a frequency domain index, a time domain index, and a code domain index in ascending order according to a predetermined order.

Optionally, the generating the first HARQ-ACK semi-static codebook corresponding to the sidelink transmission includes:

generating a corresponding first type of HARQ-ACK information bits for each candidate PDSCH reception occasion in the candidate PDSCH reception occasion set, and generating a corresponding second type of HARQ-ACK information bits for each candidate sidelink reception occasion in the candidate sidelink reception occasion set;

combining the first type of HARQ-ACK information bits and the second type of HARQ-ACK information bits to generate the first HARQ-ACK semi-static codebook.

Optionally, the determining the candidate sidelink reception occasion set and the candidate PDSCH reception occasion set includes:

jointly sorting all candidate reception occasions in the candidate sidelink reception occasion set and the candidate PDSCH reception occasion set according to a predetermined criterion;

the predetermined criterion includes at least one of the following:

sorting in at least one of a BWP index, a resource pool index, a frequency domain index, a time domain index, and a code domain index in ascending order according to a predetermined order;

sorting the sidelink reception occasion and the candidate PDSCH reception occasion corresponding to at least one of the BWP index, the resource pool index, the frequency domain index, the time domain index, and the code domain index in a predetermined order between the downlink and the sidelink.

Optionally, when the first UE determines not to transmit the sidelink data on one PSSCH and/or PSCCH scheduled by the configured sidelink grant, the HARQ-ACK feedback information corresponding to the PSSCH and/or PSCCH generated by the first UE is an ACK.

Optionally, the obtaining a configuration of a PUCCH candidate resource set for reporting downlink and/or sidelink HARQ-ACK information, and the determining how to generate a HARQ-ACK codebook based on the configuration of the PUCCH candidate resource set, includes any one of the following:

if the PUCCH candidate resource set corresponding to the downlink HARQ-ACK report and the PUCCH candidate resource set corresponding to the sidelink HARQ-ACK report are separately configured, generating separate HARQ-ACK codebooks or separate sub-codebooks of the HARQ-ACK codebook for the second HARQ-ACK feedback information corresponding to the sidelink transmission and the third HARQ-ACK feedback information corresponding to the downlink transmission, respectively; otherwise, if the PUCCH candidate resource set corresponding to the downlink HARQ-ACK report and the PUCCH candidate resource set corresponding to the sidelink HARQ-ACK report are jointly configured, multiplexing the second HARQ-ACK feedback information corresponding to the sidelink transmission and the third HARQ-ACK feedback information corresponding to the downlink transmission in a same HARQ-ACK codebook or a same sub-codebook of the HARQ-ACK codebook; or Regardless of whether the PUCCH candidate resource set corresponding to the downlink HARQ-ACK report and the PUCCH candidate resource set corresponding to the sidelink HARQ-ACK report are separately configured or not, if the same PUCCH candidate resources are included in the PUCCH candidate resource set, generating separate HARQ-ACK codebooks or separate sub-codebooks of the HARQ-ACK codebook for the second HARQ-ACK feedback information corresponding to the sidelink transmission and the third HARQ-ACK feedback information corresponding to the downlink transmission, respectively; or whether the PUCCH candidate resource set corresponding to the downlink HARQ-ACK report and the PUCCH candidate resource set corresponding to the sidelink HARQ-ACK report are separately configured or not, is independent of whether the HARQ-ACK information corresponding to the sidelink transmission and the downlink transmission is multiplexed in a same codebook, or separate codebooks are generated for the HARQ-ACK information corresponding to the sidelink transmission and the downlink transmission respectively, and there is no predetermined association.

Optionally, if separate HARQ-ACK codebooks are generated for the second HARQ-ACK feedback information corresponding to the sidelink transmission and the third HARQ-ACK feedback information corresponding to the downlink transmission respectively, and the obtained PUCCH resource for reporting the second HARQ-ACK feedback information of the sidelink transmission and the PUCCH resource for reporting the third HARQ-ACK feedback information of the downlink transmission are overlapped or at least overlapped in the time domain, one piece of the feedback information is transmitted according to the priority, and the transmission of another feedback information is stopped.

The PUCCH candidate resource set is used to determine a PUCCH resource that carries the HARQ-ACK feedback information of the sidelink transmission and/or the downlink transmission. Further, the configuration of the PUCCH candidate resource set includes time domain locations and/or frequency domain locations of the plurality of PUCCH candidate resources, and/or indexes of the plurality of PUCCH candidate resources. The UE acquires indication information of the PUCCH resource scheduled by the base station, and the indication information includes the time domain location and/or frequency domain location and/or index of the at least one PUCCH candidate resource in the PUCCH candidate resource set.

Wherein, the priority of the second HARQ-ACK feedback information of the sidelink transmission or the third HARQ-ACK feedback information corresponding to the downlink transmission may be determined based on at least one of the following:

priority between the downlink transmission and the sidelink transmission; and the service priority of the sidelink transmission, specifically, which is determined by the quality of service (QoS).

For example, the priority between the downlink transmission and the sidelink transmission is sidelink transmission QoS [R1, R2] lower than eMBB downlink transmission lower than sidelink transmission QoS [R3, R4] lower than URLLC (Ultra-reliable and Low Latency Communications) downlink transmission. When the QoS of the sidelink transmission of UE is located in the interval of [R3, R4], if downlink transmission conflicted with the HARQ reporting is the downlink transmission of the URLLC, the HARQ-ACK information of the downlink transmission of the URLLC is transmitted; otherwise, if downlink transmission conflicted with the HARQ reporting of the sidelink transmission is the downlink transmission of the eMBB, the HARQ-ACK information of the sidelink transmission is transmitted. When the QoS of the sidelink transmission of UE is located in the interval of [R1, R2], if downlink transmission conflicted with the HARQ reporting is the downlink transmission of the eMBB or the URLLC, the HARQ-ACK information of the downlink transmission is transmitted. In other examples, the priority of the downlink transmission, and the relationship of the priority of the downlink transmission and the priority of the sidelink transmission may be further refined according to service type of the downlink transmission or other parameters.

Figure 2:
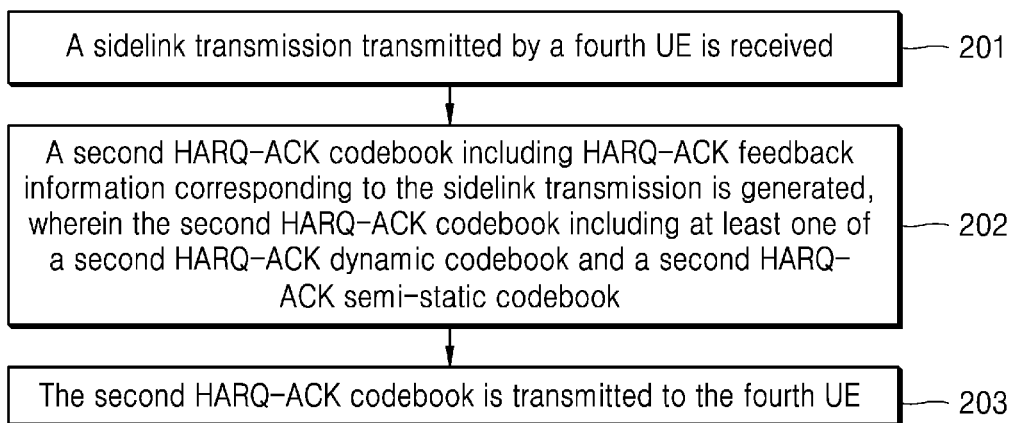
FIG. 2 illustrates a schematic flowchart diagram of a codebook-based feedback method according to another embodiment of the disclosure.

Another codebook-based feedback method, applied to a third UE, is provided in an embodiment of the disclosure. The schematic flowchart of the method is as shown in FIG. 2, and the method includes the following steps.

Step 201: a sidelink transmission transmitted by a fourth UE is received.

Step 202, a second HARQ-ACK codebook including HARQ-ACK feedback information corresponding to the sidelink transmission is generated, wherein the second HARQ-ACK codebook including at least one of a second HARQ-ACK dynamic codebook and a second HARQ-ACK semi-static codebook.

Step 203, the second HARQ-ACK codebook is transmitted to the fourth UE.

In the embodiment of the disclosure, the HARQ-ACK feedback information corresponding to the sidelink transmission is reported independently or reported with others.

Optionally, the generating the second HARQ-ACK semi-static codebook includes:

determining a physical sidelink feedback channel (PSFCH) resource carrying sidelink HARQ-ACK feedback information;

determining a candidate sidelink reception occasion set according to the PSFCH resource;

generating a corresponding HARQ-ACK information bit for each candidate sidelink reception occasion in the candidate sidelink reception occasion set; and sorting the generated HARQ-ACK information bits to generate the second HARQ-ACK semi-static codebook.

Optionally, the determining the candidate sidelink reception occasion set according to the PSFCH resource includes:

determining at least one of a time domain resource range, a frequency domain resource range, and a code domain resource range including a candidate sidelink reception occasion according to BWP and/or resource pool where the PSFCH resource is located;

determining the candidate sidelink reception occasion in each slot within the time domain resource range, where the candidate sidelink reception occasion set is composed of candidate sidelink reception occasions in all slots in the time domain resource range.

Optionally, in the process of generating the second HARQ-ACK semi-static codebook, the slot timing set f associated with the BWP and/or the resource pool that represents the time domain resource range is configured by a higher layer, which the higher layer configuration includes a direct configuration and an indirect configuration, the indirect configuration including determining f according to the PSFCH resource configuration, where f is a real number.

Optionally, the determining candidate sidelink reception occasion in each slot includes:

determining a total size of the sidelink resources existing in one slot according to at least one of a frequency domain resource range and a code domain resource range of the candidate sidelink reception occasion; and determining the number of sidelink resources that may be used for sidelink transmission and the number of candidate sidelink reception occasions existing in one slot according to at least one of time domain granularity, frequency domain granularity, and code domain granularity of the resources used for sidelink transmission indicated in the configuration of resources used for sidelink transmission as well as the total size of the resources used for sidelink transmission.

Optionally, the generating the second HARQ-ACK dynamic codebook including HARQ-ACK feedback information corresponding to the sidelink transmission includes:

determining a PSFCH resource carrying sidelink HARQ-ACK feedback information;

determining a counter downlink assignment index (C-DAI) and/or a total downlink assignment index (T-DAI) corresponding to the sidelink HARQ-ACK feedback information according to the PSFCH resource;

generating a HARQ-ACK information bit corresponding to the sidelink HARQ-ACK feedback information;

generating the second HARQ-ACK dynamic codebook according to at least one of C-DAI and T-DAI, as well as the HARQ-ACK information bit.

Optionally, a different second HARQ-ACK dynamic codebook is generated according to at least one of the following information:

identification of the UE indicating C-DAI and/or T-DAI, TB/CBG-level HARQ-ACK feedback, CBG configuration, unicast, groupcast, broadcast and parameters characterizing service priority, where the identification of the UE includes at least one of UE ID, UE source ID, group ID of the group in which the UE is located, ID of the UE within the group and ID index of the UE within the group, and the C-DAI and/or T-DAI is indicated by the second UE in the SCI.

Optionally, dynamically determining to enable or disable the second HARQ-ACK dynamic codebook for feedback of the sidelink groupcast service on the sidelink channel and/or the uplink channel, including at least one of the following:

when frequency domain size of the channel carrying the feedback of the sidelink groupcast service is greater than a predetermined threshold, determining to enable the second HARQ-ACK dynamic codebook for the feedback; and when the frequency domain size of the channel carrying the feedback of the sidelink groupcast service is not greater than the predetermined threshold, determining to disable the second HARQ-ACK dynamic codebook for feedback.

The codebook-based feedback method of the above embodiment of the disclosure is fully and comprehensively explained through the following embodiments.

In a first aspect of the disclosure, a HARQ-ACK dynamic codebook is used for HARQ-ACK feedback corresponding to sidelink data on an uplink channel.

It should be noted that, in the first aspect, a first HARQ-ACK feedback is first HARQ-ACK feedback information, a second HARQ-ACK feedback is second HARQ-ACK feedback information, and the HARQ-ACK dynamic codebook is the first HARQ-ACK dynamic codebook.

In this embodiment, a transmitter UE (first UE) of the sidelink data uses the Mode 1 transmission, that is, a sidelink transmission scheduled by a base station. The UE requests the base station to perform the sidelink transmission, obtains the sidelink grant transmitted by the base station for scheduling the sidelink transmission, transmits the sidelink data and/or the sidelink control information (SCI) according to the scheduling information indicated in the sidelink grant, and receives the HARQ-ACK feedback information provided by a receiver UE (second UE) of the sidelink data; subsequently, the transmitter UE reports the HARQ-ACK feedback corresponding to the sidelink data to the base station. For the sake of distinction, the HARQ-ACK feedback provided by the receiver UE of the sidelink data is referred to as the first HARQ-ACK feedback, and the HARQ-ACK feedback corresponding to the sidelink data reported by the UE to the base station is referred to as the second HARQ-ACK feedback. The first/second is merely a name identifier, and does not imply that the two have any predetermined order in logic or time.

In this embodiment, the UE reports the second HARQ-ACK feedback, which is transmitted on the uplink channel, to the base station by using the HARQ-ACK dynamic codebook. The UE acquires the sidelink grant, in which the scheduling information of the specific sidelink transmission is indicated, and C-DAI and/or T-DAI information corresponding to the sidelink transmission is also indicated. The UE generates a HARQ-ACK dynamic codebook containing the second HARQ-ACK information according to the C-DAI and/or the T-DAI information indicated in the sidelink grant, and reports the HARQ-ACK dynamic codebook to the base station.

Optionally, the dynamic codebook is carried on the PUCCH as Uplink Control Information (UCI). For example, the HARQ-ACK information bit included in the UCI corresponds to the dynamic codebook. Optionally, the dynamic codebook is carried on the PUSCH.

The generating the HARQ-ACK dynamic codebook corresponding to the sidelink transmission carried on the PUCCH by the UE includes:

determining a PUCCH resource carrying the second HARQ-ACK feedback information;

determining C-DAI and/or T-DAI corresponding to the second HARQ-ACK feedback information;

generating a HARQ-ACK information bit corresponding to the second HARQ-ACK feedback information; and generating a HARQ-ACK dynamic codebook corresponding to the second HARQ-ACK feedback information based on the C-DAI and/or the T-DAI and the HARQ-ACK information bit.

Optionally, as the transmitter UE of the sidelink data, if the UE transmits the sidelink data and/or the sidelink control information (SCI), UE generates a corresponding HARQ-ACK (second HARQ-ACK feedback) information bit according to the received HARQ-ACK (first HARQ-ACK feedback) information fed back by the receiver UE of the sidelink data. The HARQ-ACK information bit is used for reporting to the base station, to indicate whether the transmission of the sidelink data is successful.

Optionally, the transmitter UE will regard that the HARQ-ACK (first HARQ-ACK feedback) information fed back by the receiver UE of the sidelink data fails to be received as a NACK or DTX, where the DTX is dedicated to indicate the state that the transmitter UE fails to receive the HARQ-ACK feedback of the receiver UE.

Optionally, the HARQ-ACK (first HARQ-ACK feedback) information fed back by the receiver UE of the sidelink data corresponds to K transport blocks (TB) of sidelink data transmitted by the transmitter UE, where K is a positive integer. Optionally, the HARQ-ACK (second HARQ-ACK feedback) information reported by the transmitter UE of the sidelink data to the base station corresponds to K transport blocks (TB) of sidelink data transmitted by the transmitter UE, where K is a positive integer.

Optionally, as the receiver UE of the sidelink data, if the UE receives the sidelink data and/or the sidelink control information (SCI), the UE generates a corresponding HARQ-ACK (second HARQ-ACK feedback) information bit. The HARQ-ACK information bit is used for reporting to the base station, to indicate whether the transmission of the sidelink data is successful.

In the existing technique, the transmission of downlink data includes a TB-based transmission and a CBG-based transmission (referred to as a CBG transmission in the disclosure). An example of CBG transmission is that if the UE is provided with the RRC field PDSCH-CodeBlock-GroupTransmission of the serving cell, the UE receives a physical downlink shared channel (PDSCH) scheduled by the DCI format 1_1. The PDSCH includes CBGs of a TB. Similarly, this mechanism may also be used in the sidelink transmission.

Optionally, the transmission of the sidelink data includes TB-based transmission and CBG-based transmission. If the UE is provided with the RRC field PSSCH-CodeBlock-GroupTransmission, the UE receives the physical sidelink shared channel (PSSCH) in the sidelink transmission. The PSSCH includes CBGs of a TB of the sidelink data. Optionally, the field is dedicated to a resource pool, or dedicated to a cast type (groupcast/broadcast/unicast), or dedicated to a transmission mode (Mode 1/Mode 2), or dedicated to a certain specific service priority (for example, dedicated to the QoS, which is a service priority characterization parameter).

Optionally, for the above HARQ-ACK information bit corresponding to the second HARQ-ACK feedback, if the CBG transmission is not enabled, the UE generates one HARQ-ACK information bit for the TB of each sidelink service; otherwise, if the CBG transmission is enabled, the UE generates N HARQ-ACK information bits for the TB of each sidelink service. N is the maximum number of CBGs included in a TB, and the UE obtains the value of N by at least one of the following: CBG-related configuration or pre-configuration of the sidelink, configuration or pre-configuration of the sidelink resource pool.

Optionally, the UE determines, according to the configured or preconfigured or predefined information, whether the following at least one sidelink transmission enables CBG transmission, and accordingly determines to generate a TB-based second HARQ-ACK feedback information or CBG-based second HARQ-ACK feedback information for at least one of the following sidelink transmissions: a sidelink transmission within a serving cell, a sidelink transmission within a sidelink resource pool, a sidelink transmission in a sidelink transmission mode, a sidelink transmission of one service type, a sidelink transmission of one transmission type, a sidelink transmission corresponding to a type of grant and a given sidelink transmission. The sidelink transmission mode includes Mode 1 in which sidelink transmission is scheduled by the base station and Mode 2 in which sidelink transmission resource is selected by the UE autonomously, and further includes other transmission modes that may be defined systems in future. The service type may be determined according to a service type or a service priority related parameter (for example, QoS). The transmission type includes a broadcast, a groupcast, and a unicast. The sidelink transmission corresponding to the one type of grant includes a sidelink transmission corresponding to the dynamic grant, and a sidelink transmission corresponding to configured sidelink grant. Further, the sidelink transmission corresponding to configured sidelink grant includes a sidelink transmission corresponding to Type-1 configured sidelink grant, and a sidelink transmission corresponding to Type-2 configured sidelink grant. Optionally, the configured or preconfigured information is indicated in at least one of the following: RRC signaling; MAC signaling; physical layer signaling, including a sidelink grant carried on PDCCH/DCI and the PDSCH.

In a specific embodiment, for the receiver UE of the sidelink data, if the UE is provided with information to enable CBG transmission for a certain serving cell, or a certain sidelink resource pool, or a certain sidelink transmission mode, or a certain sidelink service type, or a certain transmission type, or a corresponding type of grant, or a specific sidelink transmission, the UE receives a PSSCH scheduled by the sidelink grant or SCI, including CBGs of TB of at least one sidelink service. The UE generates HARQ-ACK (second HARQ-ACK feedback) information of the CBG-enabled sidelink transmission, by using a method similar to the generation of the HARQ-ACK information of the downlink transmission in the existing mechanism, and fed back it to the transmitter UE and/or the base station.

In another specific embodiment, for the transmitter UE of the sidelink data, if the UE is provided with information to enable CBG transmission for a certain serving cell, or a certain sidelink resource pool, or a certain sidelink transmission mode, or a certain sidelink service type, or a transmission type, or a corresponding type of grant, or a specific sidelink transmission, the UE receives a HARQ-ACK feedback (first HARQ-ACK feedback) information of the CBG-enabled sidelink transmission, and correspondingly generates another HARQ-ACK feedback (second HARQ-ACK feedback) information corresponding to the CBG-enabled sidelink transmission to be reported to the base station, and transmits it to the base station. Optionally, the transmitter UE indicates, in the SCI, whether the sidelink transmission scheduled by the SCI is enabled with CBG. Optionally, the transmitter UE further indicates, in the SCI, the C-DAI and/or T-DAI corresponding to the sidelink transmission scheduled by the SCI. Optionally, the transmitter UE forwards the received HARQ-ACK feedback (first HARQ-ACK feedback) information of the CBG-enabled sidelink transmission to the base station as the second HARQ-ACK feedback, or regenerates another HARQ-ACK feedback (second HARQ-ACK feedback) information corresponding to the CBG-enabled sidelink transmission to be reported to the base station according to the received HARQ-ACK feedback (first HARQ-ACK feedback) information of the CBG-enabled sidelink transmission and reports it to the base station.

The above configuration method allows the NR V2X system to specifically configure the transmission in a certain resource pool or some types of sidelink resource transmission to enable/disable CBG-based transmission, according to the characteristics of the resource pool, the characteristics of the sidelink service, and the like. Compared with the configuration based on the serving cell in the NR system, the configuration flexibility is improved, and some UEs with limited capabilities can be better supported.

Optionally, the UE determines a PDCCH monitoring occasion (MO) of the DCI carrying the sidelink grant and/or a PDSCH resource carrying the sidelink grant in the slot n, then the UE transmits the HARQ-ACK information of the sidelink data on the PUCCH in the slot n+K'$_0$. The K'$_0$ is determined based on at least one of the following: a sidelink HARQ-ACK timing indicator indicated in the sidelink grant, a higher layer parameter, and a configured or preconfigured or a predefined offset. It should be noted that K'$_0$ is m.

Optionally, the values of the same or different K'$_0$ are used for PDCCH MO in the slot n and PDSCH in the slot n.

Optionally, the sidelink HARQ-ACK timing indicator indicated in the sidelink grant includes at least one of: a PDSCH-to-HARQ-ACK feedback timing indicator, a PDCCH MO-to-HARQ-ACK feedback timing indicator, a PSSCH-to-HARQ-ACK feedback timing indicator, a PSCCH-to-HARQ-ACK feedback timing indicator, and a PSFCH-to-HARQ-ACK feedback timing indicator. Optionally, for the PDCCH MO-to-HARQ-ACK feedback timing indicator, the UE acquires a sidelink grant in the PDCCH MO. Optionally, for the PDSCH-to-HARQ-ACK feedback timing indicator, the UE acquires a sidelink grant in the PDSCH.

In a specific embodiment, the sidelink HARQ-ACK timing indicator indicated in the sidelink grant multiplexes a value of the PDSCH-to-HARQ-ACK feedback timing indicator in the existing technique, and the K'$_0$ determined by the UE is sum of the obtained value of the sidelink HARQ-ACK timing indicator and the above-configured or preconfigured or predefined offset. For example, the sidelink HARQ-ACK timing indicator indicated in the sidelink grant is K$_0$, which is a value in the existing technique; the UE determines that K'$_0$=K$_0$+K$_{SLoffset}$ K$_{SLoffset}$ being a configured or preconfigured or predefined offset.

In another specific embodiment, a value of the sidelink HARQ-ACK timing indicator indicated in the sidelink grant is different from a value of the PDSCH-to-HARQ-ACK feedback timing indicator in the existing technique, and the UE determines either use the value of the PDSCH-to-HARQ-ACK feedback timing indicator in the existing technique or use the value of the sidelink HARQ-ACK timing indicator according to the received signaling being a sidelink grant or an uplink/downlink grant in the existing technique.

The advantages of the method in the above two embodiment is that, before the transmitter UE reports the HARQ-ACK feedback (second HARQ-ACK feedback) information of the sidelink data to the base station, the HARQ-ACK feedback (first HARQ-ACK feedback) information provided by the receiver UE needs to be acquired first, thus a delay of reporting the HARQ-ACK is likely to be greater than a usual downlink HARQ-ACK feedback delay in the NR system. It helps to support a larger HARQ-ACK feedback delay by introducing the above offset or new value.

In another specific embodiment, the PDSCH-to-HARQ-ACK feedback timing indicator indicated in the sidelink grant multiplexes a value of a timer in the existing technique, and K'$_0$ determined by the UE is the obtained value of this timer.

The advantages of the method in the above embodiment is that the method of indicating the PDSCH-to-HARQ-ACK feedback timing indicator in the existing technique being K$_0$ can be completely multiplexed, so that the UE may multiplex HARQ-ACK information corresponding to the sidelink transmission and HARQ-ACK information corresponding to the downlink transmission in a same HARQ-ACK codebook more easily, thereby reducing system complexity.

Alternatively, the HARQ-ACK information of the sidelink data may be carried on the PUSCH, if both are transmitted in the same slot. If the HARQ-ACK information of the sidelink data is indicated in the HARQ-ACK dynamic codebook, the HARQ-ACK dynamic codebook indicating the HARQ-ACK information of the sidelink data is carried on the PUSCH in a method similar to that in the existing mechanism.

The UE transmits HARQ-ACK information (second HARQ-ACK feedback information) of the sidelink data in the PUCCH, and the HARQ-ACK information is transmitted using the HARQ-ACK dynamic codebook. Since current HARQ-ACK dynamic codebook is only used to feed back the HARQ-ACK information of the downlink transmission transmitted by the corresponding base station to the UE, when the HARQ-ACK (second HARQ-ACK feedback) information corresponding to the sidelink transmission also fed back on the uplink channel by using the HARQ-ACK dynamic codebook, there are two types of feasible schemes: multiplexing the HARQ-ACK information corresponding to the sidelink transmission and the HARQ-ACK information corresponding to the downlink transmission in the existing mechanism in a same codebook or in a same sub-codebook; or generating separate codebooks or sub-codebooks for the HARQ-ACK information corresponding to the sidelink transmission and the HARQ-ACK information corresponding to the downlink transmission in the existing mechanism.

Optionally, the UE determines, according to the configured or preconfigured or predefined information, to multiplex the HARQ-ACK information corresponding to the sidelink transmission and the HARQ-ACK information corresponding to the downlink transmission in the existing mechanism in a same codebook or in a same sub-codebook, or to generate separate codebooks or sub-codebooks for the HARQ-ACK information corresponding to the sidelink transmission. For example, the UE acquires information indicated by the base station in the RRC signaling, and/or physical layer signaling such as information indicated in the DCI, and determines whether the HARQ-ACK feedback of the sidelink transmission uses a multiplexed or separate dynamic codebook.

The details of the technical methods used in the two types of schemes are explained below.

The HARQ-ACK corresponding to the sidelink transmission and the HARQ-ACK corresponding to the downlink transmission are multiplexed in a same codebook or a same sub-codebook.

The UE acquires C-DAI and/or T-DAI information indicated in at least one of DCI, sidelink grant, and SCI, and generates a HARQ-ACK dynamic codebook corresponding to the HARQ-ACK information of the downlink transmission and/or the sidelink transmission.

The C-DAI exists in DCI format 1_0 or DCI format 1_1. Alternatively, it also exists in the DCI format as a sidelink grant. C-DAI represents the cumulative number of {serving cell, PDCCH MO} pair. In the {serving cell, PDCCH MO} pair, there is a PDSCH reception or SPS PDSCH release associated with the DCI format 1_0 or the DCI format 1_1, and there is also transmission and/or reception of a sidelink grant and/or transmission and/or reception of the sidelink data or PSSCH scheduled by the sidelink grant. The cumulative number is calculated until the current serving cell and the current PDCCH MO. The PDCCH MO includes a PDCCH MO corresponding to DCI format 1_0 or DCI format 1_1, and further includes a PDCCH MO corresponding to a DCI format as a sidelink grant. That is, the C-DAI in the sidelink grant and the C-DAI of the PDSCH reception and/or the SPS PDSCH release associated with the DCI format 1_0 and/or the DCI format 1_1 are jointly counted. The UE assumes that the statistical order of the cumulative numbers is: ascending by the serving cell index and then ascending by the PDCCH MO index; or, ascending by the serving cell index, and then ascending by the PDCCH MO index corresponding to the DCI format 1_0 or DCI format 1_1, and then ascending by the PDCCH MO index corresponding to the sidelink grant. The PDCCH MO index is greater than or equal to 0 and less than cardinality of the PDCCH MO set, which defines a total number of PDCCH MOs.

The T-DAI exists in the DCI format 1_1. Optionally, the T-DAI also exists in the DCI format as a sidelink grant. The T-DAI represents a total number of {serving cell, PDCCH MO} pair; in the {serving cell, PDCCH MO} pair, there is a PDSCH reception or a SPS PDSCH release associated with DCI format 1_0 or DCI format 1_1, and there is also transmission and/or reception of a sidelink grant and/or transmission and/or reception of the sidelink data or PSSCH scheduled by the sidelink grant. Similarly, the T-DAI in the sidelink grant and the T-DAI of the PDSCH reception associated with DCI format 1_1 are jointly counted. The total number is updated from PDCCH MO to PDCCH MO up to the current PDCCH MO.

The UE derives C-DAI and/or T-DAI jointly counted from the HARQ-ACK corresponding to the sidelink transmission and the HARQ-ACK corresponding to the downlink transmission according to a method similar to that of existing mechanism. The UE assumes that in one PDCCH MO, the T-DAI values in all DCI formats 1_1 and in the DCI format as a sidelink grant (if the T-DAI exists in the DCI format as a sidelink grant) are the same.

The UE may generate a dynamic codebook based on the C-DAI and T-DAI values in each DCI. The dynamic codebook includes HARQ-ACK information of X PDSCH reception and/or SPS PDSCH release and/or sidelink data transmission, where X is equal to the T-DAI value in the last detected DCI. The HARQ-ACK information of PDSCH reception and/or SPS PDSCH release and/or sidelink data transmission scheduled by a certain DCI is arranged at the Yth position of the dynamic codebook, Y being equal to the value of C-DAI in the DCI. The UE determines the HARQ-ACK information bits of the PDSCH reception and/or the SPS PDSCH release and/or the sidelink data transmission according to a method similar to the existing mechanism. However, if the DAI used when determining a certain HARQ-ACK information bit is the DAI indicated in the DCI format as the sidelink grant, the determined corresponding HARQ-ACK information bit indicates the HARQ-ACK feedback (second HARQ-ACK feedback) information corresponding to the sidelink transmission; otherwise, if the DAI used when determining a certain HARQ-ACK information bit is the DAI indicated in the DCI format 1_0 or 1_1 (including C-DAI and/or T-DAI), the determined corresponding HARQ-ACK information bit indicates the HARQ-ACK feedback information corresponding to the downlink transmission. After the HARQ-ACK information of all the detected DCI-scheduled data is arranged, a NACK is filled in the remaining position of the dynamic codebook where the HARQ-ACK information is not filled.

In addition, in the existing technique, if part of the serving cell enables CBG transmission, and another part of the serving cell does not enable CBG transmission, the UE generates two HARQ-ACK sub-codebooks for TB-based feedback and CBG-based feedback, respectively. The HARQ-ACK sub-codebook corresponding to the CBG-based feedback is placed after the HARQ-ACK sub-codebook corresponding to the TB-based feedback, and the final HARQ-ACK dynamic codebook is obtained. Correspondingly, the UE assumes that the values of C-DAI and T-DAI corresponding to each sub-codebook are separately counted.

Therefore, optionally, if part of the serving cell and/or part of the sidelink transmission enables CBG transmission, and another part of the serving cell and/or another part of the sidelink transmission does not enable CBG transmission, the UE also generates two HARQ-ACK sub-codebooks, the first HARQ-ACK sub-codebook corresponding to the HARQ-ACK feedback of the TB-based downlink transmission and/or sidelink transmission, and the second HARQ-ACK sub-codebook corresponding to the HARQ-ACK feedback of the CBG-based downlink transmission and/or sidelink transmission. Correspondingly, the UE assumes that the C-DAI and T-DAI corresponding to the two HARQ-ACK sub-codebooks are separately counted, and in each sub-codebook, the C-DAI and/or T-DAI corresponding to the sidelink transmission and the downlink transmission are jointly counted. The method for the UE to generate the two HARQ-ACK sub-codebooks is similar to that in the existing technique, however, the parameters used include parameters of the sidelink transmission having same function as those in the existing technique in addition to the parameters in the existing technique.

Optionally, the sidelink grant in the above method is dynamic grant. The HARQ-ACK dynamic codebook further indicates the HARQ-ACK information corresponding to the sidelink transmission scheduled by the configured sidelink grant. In addition to generating a dynamic codebook based on C-DAI and/or T-DAI in each DCI according to the above method, the UE determines whether the sidelink grant configured in the sidelink system is in an active state in a predetermined order. If P configured sidelink grants are activated, and the sidelink transmission scheduled by the configured sidelink grant meets a preset condition, the UE adds the HARQ-ACK feedback (second HARQ-ACK feedback) information of the sidelink transmission scheduled by the activated P configured sidelink grants at the end of the dynamic codebook. Optionally, the UE adds P×Q bits at the end of the dynamic codebook, where the P×Q bits correspond to the HARQ-ACK feedback (second HARQ-ACK feedback) information of the sidelink transmission scheduled by the activated P configured sidelink grants, the HARQ-ACK feedback of the sidelink transmission scheduled by each configured sidelink grant includes Q HARQ-ACK information bits, where P=1, or P is a positive integer. Similarly, to the SPS PDSCH in the existing mechanism, since the configured sidelink grant activates the periodic multi-block sidelink resources and cannot be scheduled by the DAI, the corresponding HARQ-ACK information is placed at the end of the dynamic codebook.

Optionally, the sidelink transmission scheduled by the configured sidelink grant meeting a preset condition includes: if the sidelink transmission scheduled by the configured sidelink grant is on the slot $n-K'_{0,sps}$, or the sidelink transmission scheduled by the configured sidelink grant is located in the slot interval $[n-K'_{0,sps-1}, n-K'_{0,sps-2}]$, and the UE transmits the HARQ-ACK dynamic codebook including the feedback (second HARQ-ACK feedback)

information of the sidelink transmission on the PUCCH on the slot n, the sidelink transmission scheduled by the configured sidelink grant meets the preset condition. The $K'_{0,sps}$ is the feedback timing value of the sidelink transmission scheduled by the configured sidelink grant to the HARQ, and the $K'_{0,sps-1}$ and the $K'_{0,sps-2}$ is the maximum and minimum values of the feedback timing of the sidelink transmission scheduled by the configured sidelink grant to the HARQ respectively.

If the sidelink transmission scheduled by the configured sidelink grant does not meet the preset condition (for example, the time domain resource location of the sidelink transmission scheduled by the configured sidelink grant is not within the slot interval of the preset condition), then:

the second HARQ-ACK feedback information of the sidelink transmission scheduled by the configured grant that does not meet the preset condition is not added to the first HARQ-ACK dynamic codebook; for example, assuming that the UE acquires a total of Q configured grants, and Q' configured grants of the Q configured grants meet the preset condition when the UE reports the first HARQ-ACK dynamic codebook, the UE adds the second HARQ-ACK feedback information of the sidelink transmission scheduled by the Q' configured sidelink grants at the end of the first HARQ-ACK dynamic codebook; or adding the second HARQ-ACK feedback information of the sidelink transmission scheduled by the all configured grants to the first HARQ-ACK dynamic codebook, and setting the second HARQ-ACK feedback information of the sidelink transmission scheduled by the configured grants that does not meet the preset condition to be a first predetermined state.

Optionally, if the sidelink transmission scheduled by the configured sidelink grant or the dynamic grant is not actually transmitted due to no arrival of sidelink data to upper layer, the second HARQ-ACK feedback information corresponding to the sidelink transmission is set to be a second predetermined state.

In a specific example, the first predetermined state is a NACK. The base station may determine, according to location of the sidelink transmission scheduled by the configured grant configured for the UE, the NACK indicating that the sidelink transmission scheduled by the configured sidelink grant does not meet the preset condition, instead of transmission failure (or the first predetermined state is an ACK, and similarly, the base station may determine that the ACK is not used to indicate the success of transmission). The second predetermined state is an ACK, used to indicate to the base station that there is no need to schedule the sidelink resource for retransmission (specifically, the sidelink resource for retransmission corresponds to the retransmission of the sidelink transmission scheduled by the configured sidelink grant or the dynamic grant).

Optionally, the UE first adds a HARQ-ACK information bit corresponding to the SPS PDSCH, and then adds a HARQ-ACK information bit corresponding to the configured sidelink grant; or vice versa.

Optionally, the UE sorts HARQ-ACK information bits corresponding to the SPS PDSCH and the configured sidelink grant according to the same criterion and adds them to the dynamic codebook in order.

Optionally, if P>1, and/or if sorting the HARQ-ACK information bits corresponding to the SPS PDSCH and the configured sidelink grant according to the same criterion, the HARQ-ACK feedback (second HARQ-ACK feedback) corresponding to the sidelink transmission scheduled by the configured sidelink grant is added at the end of the HARQ-ACK dynamic codebook sequentially, in the ascending order of indexes of the configured sidelink grant (if the parameter is present) and/or indexes of the SPS PDSCH (if the parameter is present).

Optionally, if P>1, and/or if sorting the HARQ-ACK information bits corresponding to the SPS PDSCH and the configured sidelink grant together according to the same criterion, the HARQ-ACK feedback (second HARQ-ACK feedback) corresponding to the sidelink transmission scheduled by the configured sidelink grant is added at the end of the HARQ-ACK dynamic codebook sequentially in the sequence of the resources of the sidelink transmission scheduled by the configured sidelink grant and/or the resources of the SPS PDSCH. Optionally, the sequence of the resources of the sidelink transmission scheduled by the configured sidelink grant and/or the resources of the SPS PDSCH is determined according to the ascending order of the frequency domain resources first and then the ascending order of the time domain resources, or according to the ascending order of the time domain resources first and then the ascending order of the frequency domain resources.

Optionally, if the UE generates two HARQ-ACK sub-codebooks for TB-based feedback and CBG-based feedback, respectively: the HARQ-ACK information corresponding to CBG-disabled active configured sidelink grant (if any) is added at the end of the TB-based feedback HARQ-ACK sub-codebook, and the HARQ-ACK information corresponding to CBG-enabled active configured sidelink grant (if any) is added at the end of the CBG-based feedback HARQ-ACK sub-codebook; or at the end of the last sub-codebook, the HARQ-ACK information corresponding to the CBG-disabled or CBG-enabled active configured sidelink grant (if any) is added in the order corresponding to the two sub-codebooks, that is, if the order of the two sub-codebooks is that the previous sub-codebook is a TB-based sub-codebook, and the latter sub-codebook is a CBG-based sub-codebook, the HARQ-ACK information corresponding to the CBG-disabled configured sidelink grant (if any) is added first and then the HARQ-ACK information corresponding to the CBG-enabled configured sidelink grant (if any) is added, and vice versa.

Optionally, the HARQ-ACK feedback of the sidelink transmission scheduled by each configured sidelink grant includes Q HARQ-ACK information bits, and the value of Q is determined based on whether the HARQ-ACK feedback is TB level feedback or CBG level feedback, or the value of Q is the same for TB level and CBG level feedback.

It should be further noted that, this embodiment takes the HARQ-ACK feedback (second HARQ-ACK feedback) information corresponding to the sidelink transmission scheduled by the configured sidelink grant being placed at the end of the HARQ-ACK dynamic codebook as an example. However, the HARQ-ACK feedback (second HARQ-ACK feedback) information corresponding to the sidelink transmission scheduled by the configured sidelink grant may similarly be placed at a specific position of the HARQ-ACK dynamic codebook, for example at the initial position.

Optionally, in the process of determining the dynamic codebook, if the switching of BWP occurs, the UE does not feedback the PDSCH, the SPS PDSCH release, and the HARQ-ACK information of the sidelink data before the switching of BWP. Optionally, in the process of determining the dynamic codebook, if the switching of resource pool occurs, the UE feeds back or does not feedback HARQ-ACK information of the sidelink data before the switching of resource pool.

Based on the above dynamic codebook generation manner, the process of HARQ-ACK feedback of the downlink transmission and the HARQ-ACK feedback of the sidelink transmission may be simplified, so that the UE does not need to feedback through separate signaling, thereby saving feedback overhead; the using of jointly counted DAI, rather than separately counted DAI, also makes it easier for the UE to calculate C-DAI and T-DAI, reduce the number of simultaneously buffered C-DAI and T-DAI, and accordingly generate a joint HARQ-ACK codebook instead of multiple HARQ-ACK codebooks, thereby reducing system complexity.

In the above optional embodiment, the dynamic sidelink grant and the configured sidelink grant are indicated in the same HARQ-ACK dynamic codebook, and the configured sidelink grant is added at the end of the HARQ-ACK in the similar way of indicating HARQ-ACK information of the SPS PDSCH in the existing technique. Another optional method is to indicate the dynamic sidelink grant and the configured sidelink grant in two separate HARQ-ACK dynamic codebooks; wherein the DAI of the dynamic sidelink grant is jointly counted with the DAI indicated in the DCI format, such as DCI formats 1_0 and 1_1, for scheduling the downlink transmission, and the method of the UE to generate the dynamic codebook containing the HARQ-ACK information of the dynamic sidelink grant is similar to that in the above embodiment; the configured sidelink grant does not require the DAI indication, and the method for the UE to generate the dynamic codebook containing the HARQ-ACK information of the configured sidelink grant is similar to that in the above embodiment.

Figure 3:
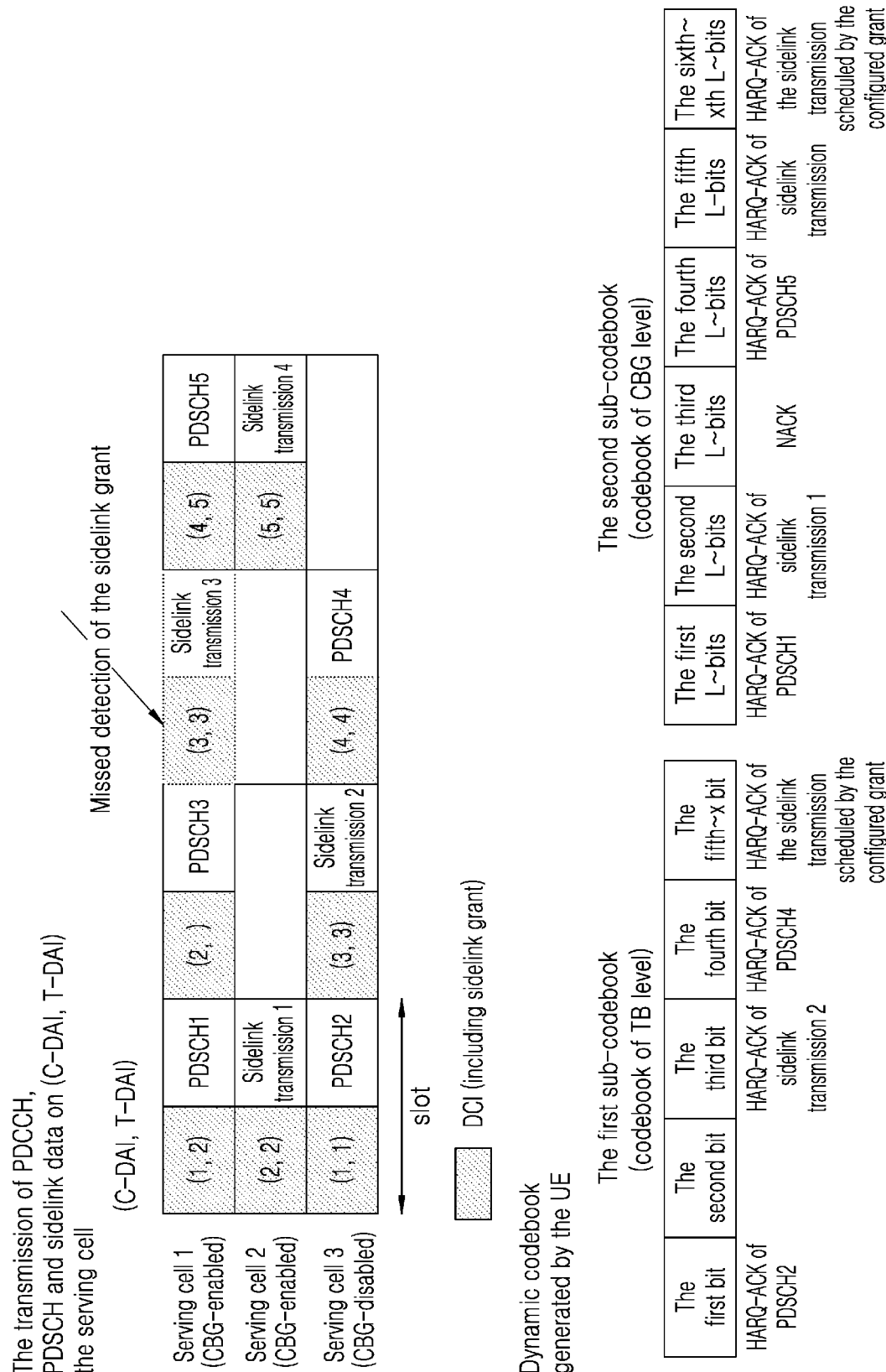
FIG. 3 illustrates a schematic diagram of a based-codebook feedback according to an embodiment of the disclosure.

FIG. 3 schematically provides a specific embodiment. It is assumed in this embodiment that the T-DAI will be indicated in sidelink grant. UE is configured with 3 serving cells, and whether the serving cell is configured to enable CBG as shown in the FIG. 3. The UE generates CBG level HARQ-ACK information for PDSCH reception scheduled by the DCI format 1_1 on serving cells 1 and 2, and the UE is configured to generate CBG level HARQ-ACK information for the sidelink transmission scheduled by sidelink grant on serving cells 1 and 2; the UE generates TB level HARQ-ACK information for PDSCH reception scheduled by the DCI format 1_0 on serving cells 1 and 2, PDSCH reception or SPS PDSCH release scheduled by DCI formats 1_1 and 1_0 on serving cell 3, and the UE is configured to generate TB level HARQ-ACK information for sidelink transmission scheduled by sidelink grant on serving cell 3.

The information acquired by the UE in four PDCCH MOs shown in FIG. 3 is as follows:

in the first PDCCH MO, the DCI format 1_1 on the serving cell 1 schedules CBG-enabled PDSCH1, the sidelink grant on the serving cell 2 schedules CBG-enabled sidelink transmission 1, and the DCI format 1_1 on the serving cell 3 schedules CBG-disenabled PDSCH2;

in the second PDCCH MO, the DCI format 1_0 on the serving cell 1 schedules CBG-disenabled PDSCH3, and the sidelink grant on the serving cell 3 schedules CBG-disenabled sidelink transmission 2;

in the third PDCCH MO, the DCI format 1_1 on the serving cell 3 schedules CBG-disenabled PDSCH4; the PDCCH MO actually has sidelink transmission 3 scheduled by the sidelink grant in the serving cell 1, but the UE fails to detect the sidelink grant;

in the fourth PDCCH MO, the DCI format 1_1 on the serving cell 1 schedules CBG-enabled PDSCH 5, and the sidelink grant on the serving cell 2 schedules CBG-enabled sidelink transmission 4.

(C-DAI, T-DAI) indicated in each DCI format or sidelink grant is shown in FIG. 3.

It should be additionally noted that the illustrated PDSCH and the sidelink transmission adjacent to the right side of the DCI are mainly used to describe type and identifier of the transmission scheduled by the DCI, and do not represent time-frequency position of the transmission scheduled by the DCI. For example, the time domain position of the sidelink transmission 1 scheduled by the sidelink grant indicating (C-DAI, T-DAI) being (2, 2) is not necessarily in the slot in which the first PDCCH MO is located, and it is the same for sidelink transmissions 2~4.

The HARQ-ACK dynamic codebook generated by the UE according to the DCI format 1_0, the DCI format 1_1, and the C-DAI and T-DAI indicated in the sidelink grant in the three serving cells is as shown in the figure. For the third L-bits in the second sub-codebook (CBG level codebook), since the UE does not receive DCI corresponding to the C-DAI, the corresponding HARQ-ACK information bits are filled with NACK.

Optionally, the UE further adds a HARQ-ACK of the sidelink transmission scheduled by the configured sidelink grant at the end of each sub-codebook; the HARQ-ACK information of sidelink transmission scheduled by one or more configured sidelink grant may be added. For the first sub-codebook of TB level, the HARQ-ACK information of the sidelink transmission scheduled by the CBG-disenabled configured sidelink grant is added, and in sidelink transmission scheduled by each configured sidelink grant, one TB corresponds to 1-bit HARQ-ACK information; for the second sub-codebook of CBG level, the HARQ-ACK information of sidelink transmission scheduled by the CBG-enabled configured sidelink grant is added, and in sidelink transmission scheduled by each configured sidelink grant, one TB corresponds to L-bits HARQ-ACK information. If each configured sidelink grant schedules multiple sidelink TBs, the HARQ-ACK information of the TB level and the CBG level respectively correspond to a plurality of 1-bit and a plurality of L-bits HARQ-ACK information.

Optionally, the HARQ-ACK corresponding to the sidelink transmission and the HARQ-ACK corresponding to the downlink transmission use separate codebooks or sub-codebooks.

The UE acquires C-DAI and/or T-DAI information indicated by the DCI, and generates a HARQ-ACK dynamic codebook corresponding to the HARQ-ACK information of the downlink transmission (for convenience of description, it is referred to as a downlink HARQ-ACK dynamic codebook in this embodiment). The process multiplexes existing mechanisms.

The UE acquires C-DAI and/or T-DAI information indicated in the sidelink grant and/or SCI, and generates a HARQ-ACK dynamic codebook corresponding to the HARQ-ACK information of the sidelink transmission (for convenience of description, it is referred to as a sidelink HARQ-ACK dynamic codebook in this embodiment).

The UE sequentially arranges the downlink HARQ-ACK dynamic codebook and the sidelink HARQ-ACK dynamic codebook to generate a final HARQ-ACK dynamic codebook. For example, the UE obtains the final HARQ-ACK dynamic codebook by placing the sidelink HARQ-ACK codebook after the downlink HARQ-ACK dynamic codebook.

The process of generating a sidelink HARQ-ACK dynamic codebook is described below.

Optionally, the DAI corresponding to the downlink HARQ-ACK dynamic codebook and the DAI corresponding to the sidelink HARQ-ACK dynamic codebook are separately counted.

For the C-DAI corresponding to the sidelink HARQ-ACK dynamic codebook: optionally, the C-DAI exists in the DCI format as a sidelink grant. The C-DAI represents cumulative number of {serving cell, PDCCH MO} pair; in the {serving cell, PDCCH MO} pair, there is transmission and/or reception of a sidelink grant and/or transmission and/or reception of the sidelink data or PSSCH scheduled by the sidelink grant; the cumulative number is calculated until the current serving cell and the current PDCCH MO. The PDCCH MO includes a PDCCH MO corresponding to a DCI format as a sidelink grant, and does not include a PDCCH MO corresponding to the DCI format 1_0 or DCI format 1_1. That is, the C-DAI in the sidelink grant and the C-DAI of the PDSCH reception or SPS PDSCH release associated with DCI format 1_0 or DCI format 1_1 are separately counted. The UE assumes that the statistical order of the cumulative numbers is: ascending by serving cell index, and then ascending by PDCCH MO index. The PDCCH MO index is greater than or equal to 0 and less than cardinality of PDCCH MO set, the cardinality defining a total number of PDCCH MOs, or the cardinality defining the total number of PDCCH MOs corresponding to the sidelink transmission.

For T-DAI corresponding to the sidelink HARQ-ACK dynamic codebook: the T-DAI exists in the DCI format as a sidelink grant. The T-DAI represents a total number of {serving cell, PDCCH MO} pairs; in the {serving cell, PDCCH MO} pair, there is transmission and/or reception of a sidelink grant and/or transmission and/or reception of the sidelink data or PSSCH scheduled by the sidelink grant; similarly, the T-DAI in the sidelink grant and the T-DAI of the PDSCH reception or SPS PDSCH release associated with the DCI format 1_0 or DCI format 1_1 are separately counted. The total number is calculated until the current PDCCH MO, which is updated from PDCCH MO to PDCCH MO.

The UE derives the C-DAI and/or T-DAI of the HARQ-ACK corresponding to the sidelink transmission according to a method similar to the existing mechanism. The UE assumes that in one PDCCH MO, all T-DAI values in the DCI format as a sidelink grant are the same.

The UE may generate a sidelink HARQ-ACK dynamic codebook, which includes HARQ-ACK information of X sidelink data transmissions, based on the C-DAI and T-DAI values in each DCI format as a sidelink grant, X being equal to the T-DAI value in the last detected sidelink grant. HARQ-ACK information of the sidelink data transmission scheduled by a certain DCI is arranged in the Yth position of the dynamic codebook, Y being equal to the value of the C-DAI in the DCI. The UE determines the HARQ-ACK information bits of the sidelink data transmission according to a method similar to the existing mechanism, but the DAI used when UE determines a certain HARQ-ACK information bit is the DAI (including C-DAI and/or T-DAI) indicated in the DCI format as the sidelink grant, and the determined corresponding HARQ-ACK information bits indicate the HARQ-ACK feedback information (second HARQ-ACK feedback) corresponding to the sidelink transmission. After the HARQ-ACK information of the data scheduled by all the detected DCI is arranged, the NACK is filled in the remaining position of the dynamic codebook where the HARQ-ACK information is not filled.

Optionally, if part of the sidelink transmission enables CBG transmission, and another part of the sidelink transmission does not enable CBG transmission, the UE may also generates two sidelink HARQ-ACK sub-codebooks, where the first sidelink HARQ-ACK sub-codebook corresponds to HARQ-ACK feedback of TB-based sidelink transmission, and the second sidelink HARQ-ACK sub-codebook corresponds to HARQ-ACK feedback of the CBG-based sidelink transmission. Accordingly, the UE assumes that C-DAI and T-DAI corresponding to the two sidelink HARQ-ACK sub-codebooks are separately counted. The method by which the UE generates the two sidelink HARQ-ACK sub-codebooks is similar to that in the existing technique, but the parameters used include parameters of the sidelink transmission having same function as those in the existing technique.

Optionally, the sidelink grant in the above method is a dynamic grant. The HARQ-ACK dynamic codebook further indicates HARQ-ACK information corresponding to the sidelink transmission scheduled by the configured sidelink grant. In addition to generating a dynamic codebook based on C-DAI and/or T-DAI in each DCI according to the above method, the UE adds HARQ-ACK feedback (second HARQ-ACK feedback) information of the sidelink transmission scheduled by the configured sidelink grant at the end or other specific position of the sidelink HARQ-ACK dynamic codebook by a similar method as that used in the scenario of HARQ-ACK feedback information corresponding to sidelink transmission and HARQ-ACK feedback information corresponding to downlink transmission using separate codebooks/sub-codebooks.

Optionally, if the UE generates two sidelink HARQ-ACK sub-codebooks for TB-based feedback and CBG-based feedback, respectively, HARQ-ACK information corresponding to CBG-disenabled active configured sidelink grant (if any) is added at the end of the sidelink HARQ-ACK sub-codebook for the TB-based feedback, and HARQ-ACK information corresponding to CBG-enabled active configured sidelink grant (if any) is added at the end of the sidelink HARQ-ACK sub-codebook for the CGB-based feedback; or HARQ-ACK information corresponding to the CBG-disabled or CBG-enabled active configured sidelink grant (if any) is added at the end of the last sidelink sub-codebook, in the order corresponding to the two sidelink sub-codebooks. That is, if the order of the two sidelink sub-codebooks is that the previous sidelink sub-codebook is a TB-based sub-codebook, and the latter sidelink sub-codebook is a CBG-based sub-codebook, HARQ-ACK information corresponding to the CBG-disabled configured sidelink grant (if any) is added first and then HARQ-ACK information corresponding to the CBG-enabled configured sidelink grant (if any) is added, and vice versa.

It should be further noted that, this embodiment takes the HARQ-ACK feedback (second HARQ-ACK feedback) information corresponding to the sidelink transmission scheduled by the configured sidelink grant being placed at the end of the HARQ-ACK dynamic codebook as an example. However, the HARQ-ACK feedback (second HARQ-ACK feedback) information corresponding to the sidelink transmission scheduled by the configured sidelink grant may similarly be placed at a specific position of the HARQ-ACK dynamic codebook, for example at the initial position.

The other mechanism in which the UE determines the separate sidelink HARQ-ACK dynamic codebooks is similar to the mechanism in the scenario in which the UE determines the HARQ-ACK dynamic codebook multiplexed by HARQ-ACK feedback information corresponding to sidelink transmission and downlink transmission, and the repeated description will be omitted.

Based on the generation manner of the above dynamic codebook, the feedback overhead may be similarly saved. The separately counted DAI is used instead of the jointly counted DAI, so that the existing technical may be utilized more effectively when the UE generates the HARQ-ACK codebook corresponding to the downlink transmission. At the same time, the DAI information of the downlink transmission and the sidelink transmission is respectively indicated more clearly, so as to avoid the undetected of the DAI of the downlink transmission affecting the base station to interpret the HARQ-ACK codebook of the sidelink transmission, and vice versa.

In the scenario where the UE determines the HARQ-ACK dynamic codebook multiplexed by the HARQ-ACK corresponding to the sidelink transmission and the downlink transmission, an embodiment in which a dynamic sidelink grant and a configured sidelink grant are indicated in two separate HARQ-ACK dynamics codebooks or sub-codebooks is provided. Similarly, in the scenario where the UE determines the sidelink HARQ-ACK dynamic codebook and the downlink HARQ-ACK dynamic codebook, which are independent from each other, of the HARQ-ACK corresponding to the sidelink transmission and the downlink transmission, the HARQ-ACK information corresponding to the sidelink transmission and the downlink transmission may also be indicated in the two separate HARQ-ACK dynamic codebooks or sub-codebooks based on the sidelink grant being the dynamic grant or the configured grant. Optionally, the UE may further divide the sidelink HARQ-ACK dynamic codebook into a plurality of HARQ-ACK sub-codebooks corresponding to different state values according to at least one of the configured grant being Type-1 or Type-2 grant, sidelink resource pool corresponding to the scheduling information indicated in the sidelink grant, sidelink transmission scheduled by sidelink grant being broadcast/groupcast/unicast. Correspondingly, C-DAI and/or T-DAI of different HARQ-ACK sub-codebooks are separately counted.

Figure 4:
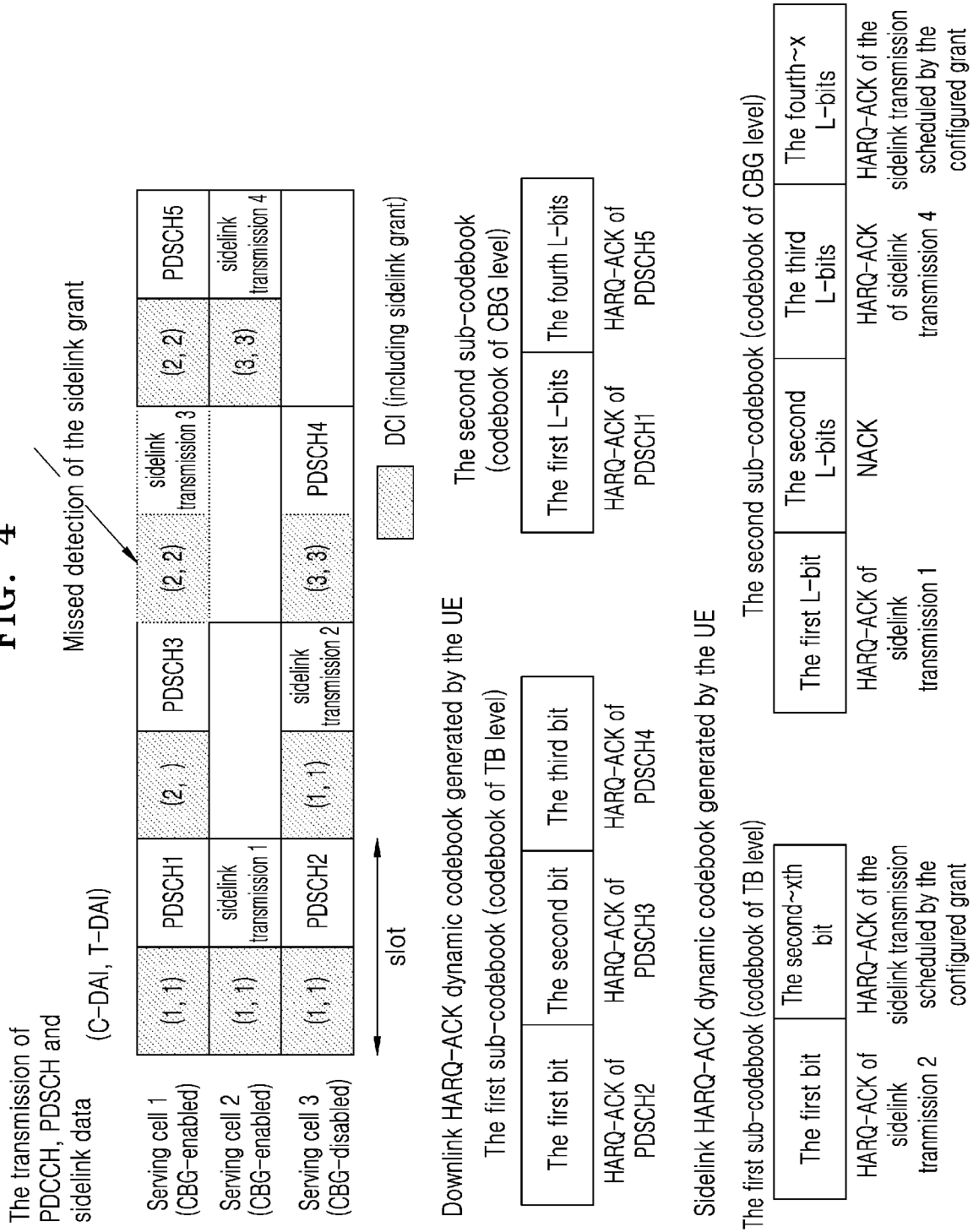
FIG. 4 illustrates a schematic diagram of a based-codebook feedback according to another embodiment of the disclosure.

FIG. 4 schematically provides a specific embodiment. UE is configured with 3 serving cells, and whether the serving cell is configured to enable CBG as shown in the FIG. 4. The UE generates CBG level HARQ-ACK information for PDSCH reception scheduled by DCI format 1_1 on serving cells 1 and 2, and the UE is configured to generate CBG level HARQ-ACK information for sidelink transmission scheduled by sidelink grant on serving cells 1 and 2; the UE generates TB level HARQ-ACK information for PDSCH reception scheduled by DCI format 1_0 on serving cells 1 and 2, PDSCH reception or SPS PDSCH release scheduled by DCI formats 1_1 and 1_0 on serving cell 3, and the UE is configured to generate TB level HARQ-ACK information for sidelink transmission scheduled by sidelink grant on serving cell 3.

The information acquired by the UE in four PDCCH MOs shown in FIG. 4 is as follows:

in the first PDCCH MO, the DCI format 1_1 on the serving cell 1 schedules s CBG-enabled PDSCH1, the sidelink grant on the serving cell 2 schedules CBG-enabled sidelink transmission 1, and the DCI format 1_1 on the serving cell 3 schedules CBG-disabled PDSCH2;

in the second PDCCH MO, the DCI format 1_0 on the serving cell 1 schedules CBG-disabled PDSCH3, and the sidelink grant on the serving cell 3 schedules CBG-disabled sidelink transmission 2;

in the third PDCCH MO, the DCI format 1_1 on the serving cell 3 schedules CBG-disabled PDSCH4; in the third PDCCH MO, actually there is a sidelink transmission 3 scheduled by the sidelink grant on the serving cell 1, but the UE fails to detect the sidelink grant;

in the fourth PDCCH MO, the DCI format 1_1 on the serving cell 1 schedules CBG-enabled PDSCH 5, and the sidelink grant on the serving cell 2 schedules the CBG-enabled sidelink transmission 4.

(C-DAI, T-DAI) indicated in each DCI format or sidelink grant is shown in FIG. 4.

It should be additionally noted that the illustrated PDSCH and the sidelink transmission adjacent to the right side of the DCI are mainly used to describe the type and identifier of the transmission scheduled by the DCI, and do not represent time-frequency position of the transmission scheduled by the DCI. For example, the time domain position of the sidelink transmission 1 scheduled by the sidelink grant indicating (C-DAI, T-DAI) being (1, 1) is not necessarily in the slot in which the first PDCCH MO is located, and it is the same for sidelink transmissions 2~4.

The HARQ-ACK dynamic codebook generated by the UE, according to the DCI format 1_0, the DCI format 1_1, and the C-DAI and T-DAI indicated in the sidelink grant in the three serving cells, includes a downlink HARQ-ACK dynamic codebook and a sidelink HARQ-ACK dynamic codebook, the downlink/sidelink HARQ-ACK dynamic codebook being as shown in FIG. 4.

For the second L-bits in the second sub-codebook (CBG level codebook) in the sidelink HARQ-ACK dynamic codebook, since the UE does not receive the DCI corresponding to the C-DAI, the corresponding HARQ-ACK information bits are filled with NACK.

In addition, the UE further adds HARQ-ACK of the sidelink transmission scheduled by the configured sidelink grant at the end of each sub-codebook, and the details are similar to those in FIG. 4.

In a second aspect of the disclosure, a HARQ-ACK semi-static codebook is used for HARQ-ACK feedback corresponding to sidelink data on an uplink channel.

It should be noted that, in the second aspect, the first HARQ-ACK feedback is the first HARQ-ACK feedback information, the second HARQ-ACK feedback is the second HARQ-ACK feedback information, and the HARQ-ACK semi-static codebook is the first HARQ-ACK semi-static codebook.

In this embodiment, a transmitter UE (first UE) of the sidelink data uses Mode 1 transmission, that is, a sidelink transmission scheduled by base station. The UE requests the base station to perform the sidelink transmission, obtains the sidelink grant transmitted by the base station for scheduling the sidelink transmission, transmits sidelink data and/or sidelink control information (SCI) according to scheduling information indicated in the sidelink grant, and receives HARQ-ACK feedback information provided by a receiver UE (second UE) of the sidelink data; subsequently, the transmitter UE reports HARQ-ACK feedback corresponding to the sidelink data to the base station. For the sake of distinction, the HARQ-ACK feedback provided by the receiver UE of the sidelink data is referred to as the first HARQ-ACK feedback, and the HARQ-ACK feedback corresponding to the sidelink data reported by the UE to the base station is referred to as the second HARQ-ACK feedback. The first/second is merely a name identifier, and does not imply that the two have any predetermined order in logic or time.

In this embodiment, the UE reports the second HARQ-ACK feedback, which is transmitted on the uplink channel using a HARQ-ACK semi-static codebook, to the base station. The UE generates a HARQ-ACK semi-static codebook corresponding to the sidelink transmission, and reports the semi-static codebook to the base station.

Optionally, the semi-static codebook is carried on the PUCCH as a UCI. For example, the UCI includes a HARQ-ACK information bit, corresponding to the semi-static codebook. Optionally, the semi-static codebook is carried on the PUSCH.

The generating, by the UE, the HARQ-ACK semi-static codebook corresponding to the sidelink transmission carried on the PUCCH includes the following:

determining a PUCCH resource carrying the second HARQ-ACK feedback information;

determining a candidate sidelink reception occasion set;

generating a corresponding HARQ-ACK information bit for each candidate sidelink reception occasion in the candidate sidelink reception occasion set;

sorting the generated HARQ-ACK information bits to generate a HARQ-ACK semi-static codebook corresponding to the second HARQ-ACK feedback information.

Alternatively, the generating, by the UE, the HARQ-ACK semi-static codebook corresponding to the sidelink transmission carried on the PUCCH includes the following:

determining a PUCCH resource carrying the second HARQ-ACK feedback information;

determining a candidate sidelink reception occasion set and a candidate PDSCH reception occasion set;

generating a corresponding HARQ-ACK information bit for each candidate sidelink reception occasion and each candidate PDSCH reception occasion in the candidate sidelink reception occasion set and the candidate PDSCH reception occasion set; and sorting the generated HARQ-ACK information bits to generate a HARQ-ACK semi-static codebook containing the second HARQ-ACK feedback information.

The process for generating the HARQ-ACK (second HARQ-ACK feedback) information bit corresponding to the sidelink transmission by the UE, and the process of determining, by the UE, the time domain resource for reporting second HARQ-ACK feedback in the PUCCH to the base station are similar to those in the embodiment in the first aspect, and will not be repeated herein. The HARQ-ACK information of the sidelink data indicated by the HARQ-ACK semi-static codebook may also be carried on the PUSCH similarly to the embodiment in the first aspect.

The UE transmits HARQ-ACK information (second HARQ-ACK feedback information) of the sidelink data in the PUCCH, the HARQ-ACK information being transmitted using the HARQ-ACK semi-static codebook. Since current HARQ-ACK semi-static codebook is only used to feed back the HARQ-ACK information of the downlink transmission transmitted by the corresponding base station to the UE, similarly to the embodiment in the first aspect, there are two feasible solutions when the HARQ-ACK (second HARQ-ACK feedback) information corresponding to the sidelink transmission is also fed back on the uplink channel through HARQ-ACK semi-static codebook: the HARQ-ACK information corresponding to the sidelink transmission and the HARQ-ACK information corresponding to the downlink transmission in the existing mechanism are multiplexed in a same codebook or a same sub-codebook; or separate codebooks or sub-codebooks are generated for the HARQ-ACK information corresponding to the sidelink transmission and the HARQ-ACK feedback information corresponding to the downlink transmission, respectively.

Optionally, the UE determines, according to the configured or preconfigured or predefined information, that the HARQ-ACK information corresponding to the sidelink transmission and the HARQ-ACK information corresponding to the downlink transmission in the existing mechanism are multiplexed in a same codebook or in a same sub-codebook, or generates an separate codebook or sub-codebook for the HARQ-ACK information corresponding to the sidelink transmission. For example, the UE acquires information indicated by the base station in the RRC signaling, and/or physical layer signaling such as information indicated in the DCI, and determines whether the HARQ-ACK feedback of the sidelink transmission uses a multiplexed or separate semi-static codebook.

The main difference between the second aspect and the first aspect is the process in which the UE generates a HARQ-ACK codebook according to the HARQ-ACK information bits corresponding to the sidelink transmission, which is described in detail below.

The HARQ-ACK corresponding to the sidelink transmission and the HARQ-ACK corresponding to the downlink transmission use separate codebooks or sub-codebooks.

The UE determines a candidate sidelink reception occasion set for the BWP and/or resource pool for sidelink activated in each serving cell corresponding to a given HARQ-ACK feedback time unit. In the sidelink system, each sidelink resource that may have the sidelink transmission is referred to as a candidate sidelink reception occasion, and determining the candidate sidelink reception occasion set is determining a set of all candidate sidelink reception occasions corresponding to the given HARQ-ACK feedback time unit.

Optionally, the candidate sidelink reception occasion set is dedicated to BWP and/or resource pool, and each BWP and/or resource pool with the HARQ-ACK semi-static codebook enabled has a candidate sidelink reception occasion set. Alternatively, the candidate sidelink reception occasion set includes candidate sidelink reception occasions in a plurality of BWPs and/or resource pools, where the plurality of BWPs and/or resource pools may be all BWPs and/or resource pools configured for the UE or specific subsets of all BWPs and/or resource pools configured for the UE.

Optionally, for sidelink resources that may have sidelink transmission, the UE determines, according to configured/preconfigured/predefined criterion, that the sidelink transmission includes at least one of PSSCH transmission, PSCCH transmission, PSFCH transmission, PSSCH reception, PSCCH reception, PSFCH reception. In a specific embodiment, the UE determines to use a sidelink resource that may have a PSSCH transmission or a sidelink resource that may have a PSFCH reception as a candidate sidelink reception occasion.

Optionally, the determining, by the UE, the candidate sidelink reception occasion includes: determining, by the UE, at least one of a time domain resource range, a frequency domain resource range, and a code domain resource range including the candidate sidelink reception occasion, for the BWP and/or the resource pool for sidelink activated in each serving cell corresponding to a given HARQ-ACK feedback time unit.

Optionally, the determining, by the UE, the time domain resource range including the candidate sidelink reception occasion includes: acquiring, by the UE, a slot set $K'_1$ associated with BWP and/or the resource pool, where $K'_1$ is a value set for indicating a time domain gap between the sidelink transmission and reporting of the second HARQ-ACK corresponding to the sidelink transmission. If the given HARQ-ACK feedback time unit is located in slot n, the UE determines whether there is a possible sidelink transmission on the slot $n-K'_1$ for all possible values of $K'_1$.

If exists, the sidelink resource corresponding to the slot is included in the candidate sidelink reception occasion set. It should be noted that $K'_1$ is q.

Optionally, $K'_1$ indicates the number of slots in the physical sense, or the number of slots configured to the sidelink. When $K'_1$ indicates the number of slots in the physical sense, the meaning of the slot $n-K'_1$ is the same as that in the existing technique. When $K'_1$ indicates the number of slots configured to the sidelink, the meaning of the slot $n-K'_1$ is that the $K'_1$ th slot, which is configured to the sidelink, before the slot n, rather than simply calculated from the physical index of the slot.

Optionally, if $K'_1$ indicates the number of slots in the physical sense, the determining, by the UE, whether there is a possible sidelink transmission on the slot $n-K'_1$ includes that: the UE determines whether the slot $n-K'_1$ is a slot configured to the sidelink; if yes, the UE further determines whether the slot $n-K'_1$ is configured to be sidelink resource that do not conform to the sidelink transmission defined in this embodiment (for example, the sidelink resource for the sidelink broadcast channel); if not, the UE counts the slot $n-K'_1$ in the candidate sidelink reception occasion set; otherwise, the slot $n-K'_1$ is not counted in the candidate sidelink reception occasion set. Optionally, if $K'_1$ indicates the number of slot configured to the sidelink, the determining, by the UE, whether there is a possible sidelink transmission on the slot $n-K'_1$ includes that: the UE determines whether the slot $n-K'_1$ is configured to be sidelink resources that do not conform to the sidelink transmission defined in this embodiment (for example, the sidelink resource for the sidelink broadcast channel); if not, the UE counts the slot $n-K'_1$ in the candidate sidelink reception occasion set; otherwise, the slot $n-K'_1$ is not counted in the candidate sidelink reception occasion set.

Optionally, the UE determines candidate sidelink reception occasion in each slot within a time domain resource range, and the candidate sidelink reception occasion set is composed of candidate sidelink reception occasions in all slots in the time domain resource range. Alternatively, if the slot $n-K'_1$ is counted in the candidate sidelink reception occasion set, the UE determines whether there may be a plurality of sidelink transmissions in one slot, and/or how many possible sidelink transmissions may exist in one slot. The UE determines how many possible sidelink transmissions exist in one slot, according to at least one of the frequency domain resource range, the code domain resource range of the sidelink reception occasion, and the configuration of resources used for sidelink transmission. Accordingly, the UE determines how many candidate sidelink reception occasions corresponding to the slot $n-K'_1$ are counted.

Optionally, the determining, by the UE, how many possible sidelink transmissions exist in one slot includes determining, by the UE, according to at least one of the frequency domain resource range and the code domain resource range of the candidate sidelink reception occasion, the total size of the sidelink resources exist in one slot; and determining, by the UE, the number of sidelink resources that may be used for sidelink transmission in one slot, according to at least one of a time domain granularity, a frequency domain granularity, a code domain granularity of the resources used for the sidelink transmission indicated in the configuration of the resources used for the sidelink transmission, as well as the total size.

Optionally, the UE determines whether there is more than one sidelink resources used for sidelink transmission in one slot according to whether the UE has the capability to support simultaneous transmission of a plurality of sidelink transmissions.

Optionally, the UE determines the number of time domain granularities of the resources used by sidelink transmission according to the capability of UE, whether the BWP and/or the resource pool corresponding to the candidate sidelink reception occasion set are configured to enable symbol level transmission, and the configuration of the symbol level transmission if enabled. In the NR system, since the symbol level PDSCH transmission is supported, the UE may assume that one or more PDSCH transmissions are in one slot according to different capabilities of UE, and calculate one or more candidate PDSCH reception occasions accordingly. Similarly, in a sidelink system, according to the capabilities of UE and whether the symbol level transmission is enabled, the UE may assume that one or more sidelink transmissions are in sidelink resource in one slot and one given frequency domain granularity (for example, one sub-channel), and calculate one or more candidate sidelink reception occasions accordingly.

Optionally, the UE determines that the frequency domain resource range including the candidate sidelink reception occasion is all of or the configured/preconfigured/predefined subset of the frequency domain resources of the BWP and/or the resource pool corresponding to the candidate sidelink reception occasion set.

Optionally, the UE determines that the code domain resource range including the candidate sidelink reception occasion is configured by a higher layer. Optionally, the maximum number of the sidelink transmissions capable of code division multiplexing (CDM) on a sidelink time-frequency resource is determined according to the higher layer configuration.

In a specific embodiment, the UE, as the transmitter of the sidelink data, feeds back the second HARQ-ACK feedback information to the base station. The UE does not enable symbol level transmission, that is, only supports transmission of subframe level. Assuming that the UE transmits the second HARQ-ACK feedback to the base station in the slot n, the determining the candidate sidelink reception occasion set corresponding to one resource pool includes that: the UE acquires the slot timing set $K'_1$ associated with the resource pool, determines successively whether there is a possible sidelink transmission on the slot $n-K'_1$ for all possible value of $K'_1$, and if exist, the sidelink resources corresponding to the slot are counted in the candidate sidelink reception occasion set. Assuming that the resource pool includes K frequency domain sub-channels (possibly at least one of a PSSCH sub-channel, a PSCCH sub-channel, and a PSFCH sub-channel), the UE determines that there may be one candidate sidelink reception occasion on the slot $n-K'_1$, and no a plurality of candidate sidelink reception occasions, since the UE may only transmit one sidelink transmission at the same time.

In another specific embodiment, the UE, as the transmitter of the sidelink data, feeds back the second HARQ-ACK feedback information to the base station. The UE does not enable symbol level transmission, that is, only supports transmission of the subframe level. Assuming that the UE transmits the second HARQ-ACK feedback to the base station in the slot n, the determining the candidate sidelink reception occasion set corresponding to one resource pool includes that: the UE acquires the slot timing set $K'_1$ associated with the resource pool, determines successively whether there is a possible sidelink transmission on the slot $n-K'_1$ for all possible value of $K'_1$, and if exist, the sidelink resources corresponding to the slot are counted in candidate sidelink reception occasion set. Assuming that the resource pool includes K frequency domain sub-channels (possibly at least one of a PSSCH sub-channel, a PSCCH sub-channel, and a PSFCH sub-channel), the UE determines there may be K candidate sidelink reception occasions on the slot n−K'$_1$. Alternatively, assuming that the resource pool includes K frequency domain sub-channels, and there are at most P sidelink transmission code divisions multiplexing on each sub-channel in each slot, the UE determines that there may be K×P candidate sidelink reception occasions on the slot n−K'$_1$.

Optionally, the determining, by the UE, the candidate sidelink reception occasion set further includes sorting all candidate sidelink reception occasions in the set according to a predetermined criterion. Optionally, the predetermined criterion includes: ascending by at least one of a BWP index, a resource pool index, a frequency domain index, a time domain index, and a code domain index according to a predetermined order. For example, for the candidate sidelink reception occasion set corresponding to one resource pool, they are sorted in ascending order by the frequency domain index firstly, and then in ascending order by the time domain index. For example, for the candidate sidelink reception occasion set corresponding to a plurality of BWPs and a plurality resource pools, they are sorted in ascending order by the frequency domain index firstly, then in ascending order by the time domain index, in ascending order by the resource pool, and in ascending order by the BWP lastly; or they are sorted in ascending order by the frequency domain index firstly, in ascending order by the resource pool, in ascending order by the BWP, in ascending order by the time domain index lastly.

Optionally, the UE generates a corresponding HARQ-ACK information bit for each candidate sidelink reception occasion in the candidate sidelink reception occasion set, and combines all HARQ-ACK information bits into a HARQ-ACK semi-static codebook.

The method of generating the HARQ-ACK information bits for a candidate sidelink reception occasion is similar to that in the existing technique or the first aspect. However, the following differences are allowed to be existed therebetween.

Optionally, the HARQ-ACK feedback (second HARQ feedback) information reported to the base station by the UE is the feedback of the sidelink transmission scheduled by the corresponding base station, or the feedback of all sidelink transmissions corresponding to the UE (including sidelink transmission scheduled by the base station and the sidelink transmission determined by the UE itself).

Optionally, if the HARQ-ACK feedback (second HARQ feedback) information reported to the base station is the feedback of the sidelink transmission scheduled by the base station, HARQ-ACK information bits corresponding to the actual HARQ-ACK feedback state are generated for the candidate sidelink reception occasion corresponding to the sidelink transmission scheduled by the base station, and corresponding HARQ-ACK information bits are generated according to a predefined criterion instead of the actual HARQ-ACK feedback state for other candidate sidelink reception occasions (for example, always generating ACK).

Optionally, if the HARQ-ACK feedback information reported to the base station (second HARQ feedback) is the feedback of all sidelink transmissions corresponding to the UE, the HARQ-ACK information bits corresponding to the actual HARQ-ACK feedback state is generated for each candidate sidelink reception occasion.

Figure 5:
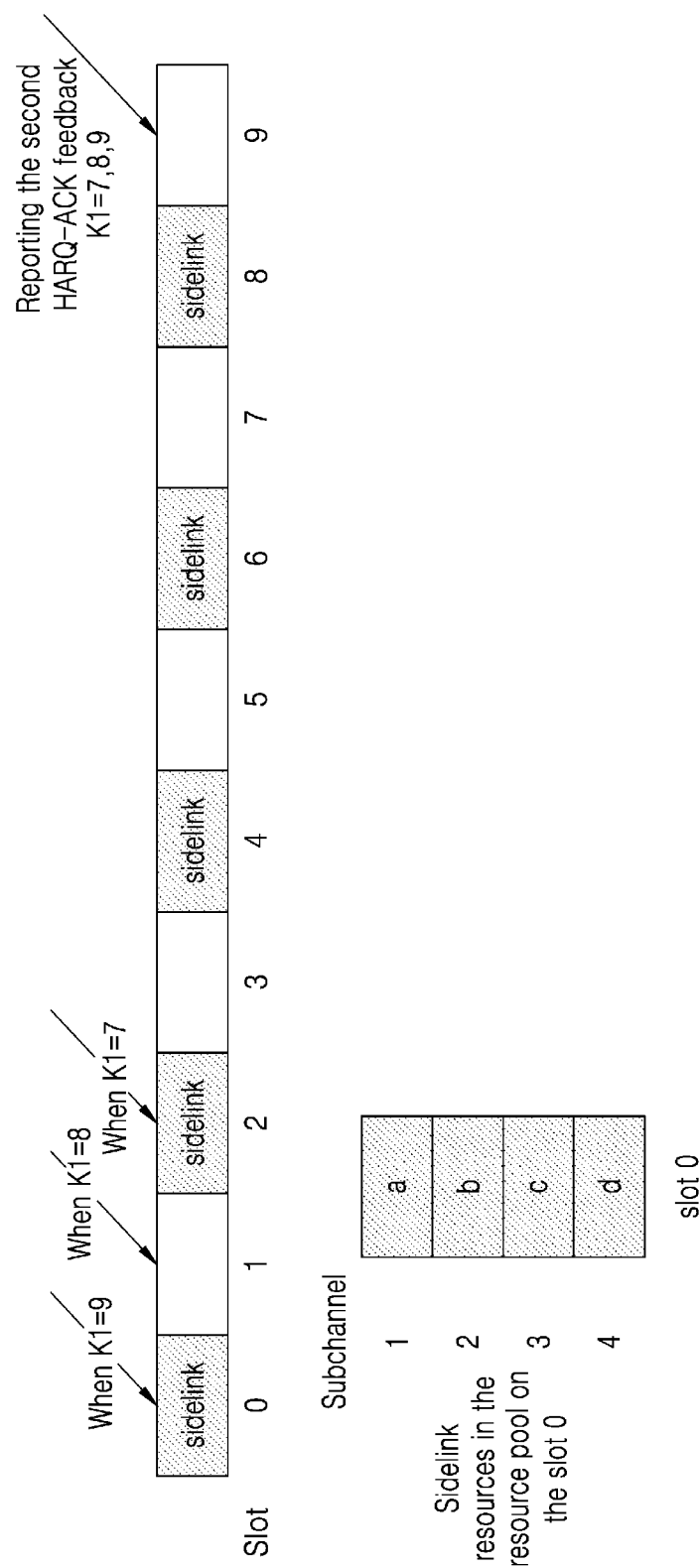
FIG. 5 illustrates a schematic diagram of a based-codebook feedback according to another embodiment of the disclosure.

FIG. 5 schematically provides a specific embodiment. UE does not enable symbol level transmission, that is, only supports transmission of the subframe level. The UE reports the HARQ-ACK feedback (second HARQ-ACK feedback) information corresponding to the sidelink transmission to the base station in slot 9, using the HARQ-ACK semi-static codebook corresponding to one resource pool. The UE acquires slot timing set associated with the resource pool K'$_1$={7, 8, 9}, where K'$_1$ indicates the number of slots in the physical sense. The determining sequentially by the UE whether there is a possible sidelink transmission on the slot n−K'$_1$ includes that: when K'$_1$=7 and the slot 2 being configured for sidelink, the slot 2 cannot be used for sidelink transmission as defined in this embodiment, since it is used for carrying transmission of synchronization signal and/or channel of sidelink; when K'$_1$=8, the slot 1 cannot be used for sidelink transmission as defined in this embodiment, since it is not configured for sidelink; when K'$_1$=9, the slot 0 is configured for sidelink and can be used for sidelink transmission as defined in this embodiment. The UE continues to determine the number of candidate sidelink reception occasions on the slot 0, and determines that the resource pool includes four sub-channels in the frequency domain according to configuration information of the resource pool, and thus the UE determines that there are four candidate sidelink reception occasions on the slot 0. The UE sorts the candidate sidelink reception occasions in ascending order by frequency domain and then time domain. The candidate occasion set finally determined by the UE is {a, b, c, d}. The UE sequentially determines HARQ-ACK information bits for each candidate sidelink reception occasion, and sorts the HARQ-ACK information bits in order to generate a HARQ-ACK semi-static codebook for sidelink transmission.

The K'$_1$ provided in FIG. 5 is a set of values, whose values are provided in an enumerated manner. Another manner is determining of the values according to the threshold. For example, the UE assumes K'$_2$<K'$_1$<K'$_3$, and K'$_1$ is a positive integer, K'$_2$ and K'$_3$ is values configured by a higher layer. In this method, K'$_2$ may represent the minimum processing time for the UE to decode the sidelink transmission (for example, decode the PSSCH or decode the PSFCH) and generate the second HARQ-ACK feedback, and K'$_3$ may represent the maximum delay allowed by the second HARQ-ACK feedback.

Optionally, HARQ-ACK corresponding to the sidelink transmission and HARQ-ACK corresponding to the downlink transmission are multiplexed in a same codebook or sub-codebook.

The UE reuses the existing technique to determine a candidate PDSCH reception occasion set. The UE further determines candidate sidelink reception occasion set, for BWP and/or resource pool for sidelink activated in each serving cell corresponding to a given HARQ-ACK feedback time unit. The UE reuses the existing mechanism to generate a corresponding HARQ-ACK information bit for each candidate PDSCH reception occasion in the candidate PDSCH reception occasion set, generate a corresponding HARQ-ACK information bit for each candidate sidelink reception occasion in the candidate sidelink reception occasion set, and combine the two types of generated HARQ-ACK information bits to generate a HARQ-ACK semi-static codebook.

The method of determining the candidate sidelink reception occasion set and generating the corresponding HARQ-ACK information bit for each candidate sidelink reception occasion in the candidate sidelink reception occasion set, by the UE, is similar to the method described in the scenario where HARQ-ACK corresponding to the sidelink transmission and HARQ-ACK corresponding to the downlink transmission use separate codebooks/sub-codebooks, and the main difference therebetween is the method of combining the two types of generated HARQ-ACK information bits to generate the HARQ-ACK semi-static codebook.

Optionally, the determining by the UE the candidate sidelink reception occasion set and determining by the UE the candidate PDSCH reception occasion set further includes, according to a predetermined criterion, jointly sorting all candidate reception occasions in the two sets. Optionally, the predetermined criterion includes, according to a predetermined order, sorting candidate sidelink reception occasions and candidate PDSCH reception occasions in ascending order by at least one of a BWP index, a resource pool index, a frequency domain index, a time domain index, and a code domain index, and further includes according to a predetermined order between a downlink and a sidelink, sorting candidate sidelink reception occasions and candidate PDSCH reception occasions corresponding to at least one of above indexes. For example, for candidate sidelink reception occasion set corresponding to one resource pool, UE jointly sorts candidate sidelink reception occasions, for example, according to the predetermined order between a downlink and a sidelink firstly, and then ascending order based on the frequency domain index, and ascending order by the time domain index lastly.

Figure 6:
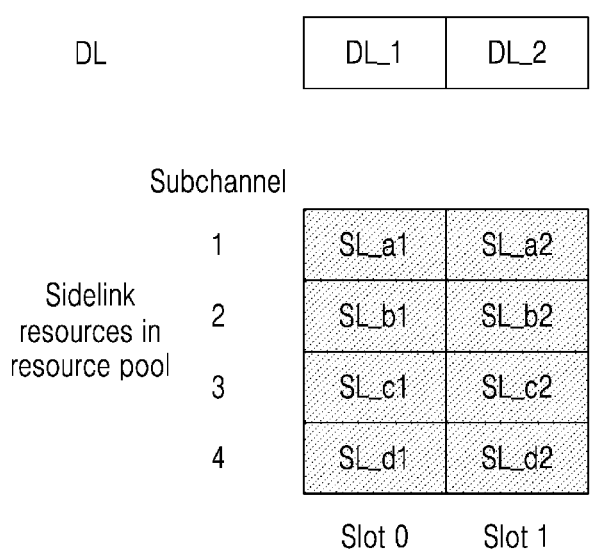
FIG. 6 illustrates a schematic diagram of a based-codebook feedback according to a further embodiment of the disclosure.

FIG. 6 schematically provides a specific embodiment. The UE determines that there are candidate PDSCH reception occasion and candidate sidelink reception occasion on slot 0 and slot 1, according to slot timing sets corresponding to downlink and sidelink respectively and the second HARQ-ACK reporting time, as shown in FIG. 4. The UE sorts the candidate PDSCH reception occasion and the candidate sidelink reception occasion according to a predetermined order between a downlink and a sidelink firstly, then ascending order by a frequency domain index, and then ascending order by a time domain index. The candidate occasion set finally determined by the UE is {DL_1, SL_a1, SL_b1, SL_c1, SL_d1, DL_2, SL_a2, SL_b2, SL_c2, SL_d2}. The UE sequentially determines HARQ-ACK information bits for each candidate PDSCH reception occasion and candidate sidelink reception occasion, and sorts the HARQ-ACK information bits in order to generate a HARQ-ACK semi-static codebook for sidelink transmission.

In a third aspect of the disclosure, a semi-static codebook is used for HARQ-ACK feedback corresponding to sidelink data on a sidelink channel.

It should be noted that in the third aspect, the HARQ-ACK feedback is HARQ-ACK feedback information, and the HARQ-ACK semi-static codebook is a second HARQ-ACK semi-static codebook.

In this embodiment, a transmitter UE (a fourth UE) of sidelink data transmits sidelink data and/or sidelink control information (SCI), and a receiver UE (a third UE) of the sidelink data provides HARQ-ACK feedback information to the transmitter UE. The HARQ-ACK feedback information is transmitted on a sidelink channel, which is a Physical Sidelink Feedback Channel (PSFCH), by using a HARQ-ACK semi-static codebook. The receiver UE of the sidelink data generates the HARQ-ACK semi-static codebook containing HARQ-ACK feedback information of sidelink transmission, and transmits the HARQ-ACK semi-static codebook to the transmitter UE of the sidelink data. Optionally, the HARQ-ACK semi-static codebook is carried on the PSFCH.

Similar to the embodiment in the second aspect, the UE determines a candidate sidelink reception occasion set for a given HARQ-ACK feedback time unit. In the sidelink system, each sidelink resource that may have sidelink transmission is referred to as a candidate sidelink reception occasion, and determining the candidate sidelink reception occasion set is to determine a set of all candidate sidelink reception occasions corresponding to the given HARQ-ACK feedback time unit.

The generating the HARQ-ACK semi-static codebook corresponding to PSSCH and/or PSCCH reception carried on the PSFCH by the receiver UE of the sidelink data includes:

determining a physical sidelink feedback channel (PSFCH) resource carrying sidelink HARQ-ACK feedback information;

determining a candidate sidelink reception occasion set;

generating a corresponding HARQ-ACK information bit for each candidate sidelink reception occasion in the candidate sidelink reception occasion set; and sorting the generated HARQ-ACK information bits in order to generate the HARQ-ACK semi-static codebook corresponding to the HARQ-ACK feedback information.

Optionally, the UE determines the PSFCH resource carrying the HARQ-ACK according to the mapping relationship between the PSSCH and/or the PSCCH and PSFCH, or the PSFCH resource information indicated in the PSSCH and/or the PSCCH.

Optionally, the UE determines the candidate sidelink reception occasion set using a mechanism similar to that in the embodiment in the second aspect.

Optionally, the determining, by the UE, the candidate sidelink reception occasion set according to the PSFCH resource, includes: determining, by the UE, the candidate sidelink reception occasion set corresponding to the BWP and/or the resource pool according to the BWP and/or the resource pool where the PSFCH resource is located. Optionally, the above step further includes: determining, according to the PSFCH resource, a sidelink resource that may have PSSCH reception and/or PSCCH reception, each sidelink resource that may have PSSCH reception and/or PSCCH reception being referred to as a candidate sidelink reception occasion. Optionally, the step further includes: determining, according to the PSFCH resource, a range of the sidelink resources corresponding to the candidate sidelink reception occasion set, and a sidelink resource size corresponding to each candidate sidelink reception occasion, and determining the candidate sidelink reception occasion set accordingly.

Optionally, each of the foregoing sidelink resources that may have PSSCH reception and/or PSCCH reception is a time domain and a frequency domain and/or a code domain resource. Optionally, the code domain resource is used to distinguish the sidelink UE that transmits the PSCCH and/or the PSSCH on a same time-frequency resource, and the receiver UE of the sidelink data may determine the code domain resource based on at least one of identification of the transmitter UE (for example, source ID, ID or index of transmitter UE in the groupcast in the UE group) and a specific sidelink transmission parameter of the transmitter UE. Optionally, the code domain resource is used to distinguish the sidelink UE that transmits the PSFCH on a same time-frequency resource, and the receiver UE of the sidelink data may determine the code domain resource based on identity of the transmitter UE, a specific sidelink transmission parameter related to the transmitter UE, identity of the receiver UE (for example, destination ID, ID or index of the receiver UE in the groupcast in the UE group), and a specific sidelink transmission parameter related to the receiver UE.

Optionally, the range of the sidelink resource corresponding to the candidate sidelink reception occasion set includes at least one of a time domain resource range, a frequency domain resource range, and a code domain resource range. Optionally, sidelink resource size corresponding to each candidate sidelink reception occasion includes at least one of N1 slots or N2 symbols in the time domain, M sub-channels in the frequency domain, and K codewords in the code domain.

Optionally, the determining, by the UE, the time domain resource range includes: acquiring a slot timing set $K'_1$ associated with the resource pool, and determining the set of sidelink slots corresponding to the candidate sidelink reception occasion set according to the slot n and the $K'_1$ where the PSFCH is located in a method similar to that in the embodiment in the second aspect, which is the time domain resource range.

Optionally, $K'_1$ is configured by a higher layer, including direct configuration and indirect configuration. Optionally, the indirect configuration includes that the UE derives and determines $K'_1$ according to PSFCH resource configuration. Optionally, if the PSFCH resource configuration includes, the PSFCH resource periodically exists in the time domain in the sidelink resource pool and the period is K slots, then $K'_1$ includes {Lmin, Lmin+1, ... Lmin+K−1}. The Lmin is used to indicate the latest slot in which the HARQ-ACK information may be fed back in the PSFCH, and thus can be used to characterize the minimum delay of HARQ-ACK processing. $K'_1$ is a set of values, including K slots, corresponding to the configuration of the PSFCH resource. It should be noted that $K'_1$ is f.

Optionally, the determining, by the UE, the candidate sidelink reception occasion set according to the PSFCH resource, further includes: determining, by the UE, the candidate sidelink reception occasion in each slot in the time domain resource range, the candidate sidelink reception occasion set is composed of the candidate sidelink reception occasions in all slots within the time domain resource range. Optionally, determining, by the UE, the candidate sidelink reception occasion in each slot, includes: determining a total size of a sidelink resource exist in one slot, according to at least one of a frequency domain resource range and a code domain resource range of the candidate sidelink reception occasion; and determining the number of sidelink resources that may be used for the sidelink transmission in one slot, according to at least one of time domain granularity, frequency domain granularity and code domain granularity of resources used for sidelink transmission indicated in the configuration of resources used for the sidelink transmission, and the total size.

Optionally, the sidelink resource size corresponding to each candidate sidelink reception occasion determined by the UE includes one slot in the time domain, M sub-channels in the frequency domain, and K codewords in the code domain, and the range of sidelink resources includes M0 sub-channels in the frequency domain and K0 codewords in the code domain; then the UE may accordingly determine that there are M0/M×K0/K candidate sidelink reception occasions in each slot. If M0/M or K0/K is not an integer, the M0/M or K0/K may be rounded up and rounded down.

Optionally, the UE determines, according to the number or maximum number of sidelink transmissions received in each slot or received simultaneously corresponding to the capability of UE, the number of more than one sidelink resources used for sidelink transmission existed in one slot, and/or the maximum number of sidelink resources used for sidelink transmission existed in a slot. For example, if the UE determines that there are M0/M×K0/K candidate sidelink reception occasions in each slot, and at most X sidelink transmissions are received in each slot corresponding to capability of UE, the UE finally determines the number of candidate sidelink reception occasions existing in each slot is the minimum value of M0/M×K0/K and X.

Optionally, the UE determines the number of time domain granularities of the resources used by sidelink transmission according to the capability of UE, whether the BWP and/or the resource pool corresponding to the candidate sidelink reception occasion set are configured to enable symbol level transmission, and the configuration of the symbol level transmission if enabled, and determines the candidate sidelink reception occasion set accordingly, which is similar to that in the embodiment in the second aspect.

Optionally, the UE determines that the frequency domain resource range including the candidate sidelink reception occasion is all the frequency domain resources of the BWP and/or the resource pool corresponding to the candidate sidelink reception occasion set, or the configured/preconfigured/predefined subset of all the frequency domain resources.

Optionally, the UE derives and determines, according to the PSFCH resource configuration, the frequency domain resource range including the candidate sidelink reception occasion. Optionally, if the PSFCH resource configuration includes that the PSFCH resource periodically exists in the frequency domain in the sidelink resource pool and the period is K sub-channels or RBs, the frequency domain resource range of the candidate sidelink reception occasion includes K sub-channels or RBs.

Optionally, if the PSFCH resource configuration acquired by the UE includes each PSFCH being associated with X PSSCH resources and/or PSCCH resources, the UE determines that the candidate sidelink reception occasion set corresponding to the PSFCH resource includes X PSSCH resources and/or PSCCH resources corresponding to the PSFCH resource. Optionally, each N PSSCH resource and/or PSCCH resource is a candidate sidelink reception occasion, and N=1 or N is a positive integer.

Optionally, the UE generates HARQ-ACK feedback information for each candidate sidelink reception occasion, and if the PSCCH and/or the PSSCH are not successfully decoded at a candidate sidelink reception occasion, the generated HARQ-ACK feedback information is NACK. Otherwise the generated information is ACK. In detail, description including how to generate TB level and CBG level feedback is similar to those in the embodiments in the first/second aspects and the existing technique, and the description will not be repeated.

Some typical scenarios to which the method in the third aspect applies are briefly exemplified below.

Scenario 1: A transmitter UE of sidelink data transmits a plurality of PSSCHs in parallel using a plurality of HARQ processes in a plurality of PSSCHs. The parallel transmission means that, after the Nth PSSCH is transmitted by using the Nth HARQ process and before the corresponding HARQ-ACK feedback information is received, the N+1th PSSCH is transmitted by using the N+1th HARQ process, if the N+1th HARQ process is available, without needing to wait for the HARQ-ACK feedback information of the Nth PSSCH. In this scenario, a receiver UE may carry feedback information corresponding to a plurality of PSSCHs in one HARQ-ACK feedback information, and the feedback information of different PSSCHs is indicated by different bits in the HARQ-ACK codebook. The transmitter UE extracts the HARQ-ACK information bits from the HARQ-ACK codebook according to the transmission resource used by itself.

Scenario 2: UE determines that a plurality of PSSCHs and/or PSCCHs are mapped to a same or a same group of PSFCH resources in a resource pool according to PSFCH configuration of the resource pool. For example, the PSFCH configuration information indicates that the PSFCH periodically exists every N slots in the time domain, and every M sub-channels in the frequency domain, and each M×N PSSCHs and/or PSCCHs are mapped to a same or a same group of PSFCH resources. A group of PSFCH resources herein refers to a group of PSFCH resources sharing the same time-frequency resource and code division multiplexing. In this scenario, a receiver UE may need to feed back HARQ-ACK feedback information corresponding to M×N PSSCHs and/or PSCCHs in the PSFCH. The feedback information may correspond to one or more transmitter UEs. Therefore, the receiver UE may carry feedback information corresponding to a plurality of PSSCHs/PSCCHs in one HARQ-ACK feedback information, and the feedback information of different PSSCHs/PSCCHs is indicated by different bits in the HARQ-ACK codebook. Each possible transmitter UE extracts HARQ-ACK information bits from the HARQ-ACK codebook according to the transmission resources used by itself.

For scenario 2, since the HARQ-ACK information fed back by the receiver UE of the sidelink data may need to be received by the transmitter UE of the plurality of sidelink data, the information carrying the HARQ-ACK should in the mechanism similar to the mechanism in broadcast or groupcast. Therefore, optionally, the transmitting the PSFCH carrying the HARQ-ACK semi-static codebook by the UE, includes that the UE performs function control according to the information of more than one UE, and/or the UE performs function control according to downlink path loss, and/or the UE performs function control according to a same mechanism as the broadcast. Optionally, the more than one UE includes transmitter UE of the actual PSSCH reception and/or PSCCH reception corresponding to the HARQ-ACK semi-static codebook. Optionally, the information includes at least one of sidelink path loss, sidelink layer 1 and/or layer 3 RSRP, and sidelink CSI. The method may make the PSFCH function control take into account a plurality of data transmitter UEs that have been perceived, and/or potential data transmitter UEs that have not been perceived, so that the transmitter UE is more likely to receive the feedback information carried on the PSFCH.

In a fourth aspect of the disclosure, a dynamic codebook is used for HARQ-ACK feedback corresponding to sidelink data on a sidelink channel.

It should be noted that, in the fourth aspect, the HARQ-ACK feedback is HARQ-ACK feedback information, and the HARQ-ACK dynamic codebook is a second HARQ-ACK dynamic codebook.

In this embodiment, a transmitter UE (a fourth UE) of sidelink data transmits sidelink data and/or sidelink control information (SCI), and a receiver UE (a third UE) of the sidelink data provides HARQ-ACK feedback information to the transmitter UE. The HARQ-ACK feedback information is transmitted on the sidelink channel, which is a Physical Sidelink Feedback Channel (PSFCH), by using a HARQ-ACK dynamic codebook. The receiver UE of the sidelink data generates a HARQ-ACK dynamic codebook including the HARQ-ACK feedback information of the sidelink transmission, and transmits the HARQ-ACK dynamic codebook to the transmitter UE of the sidelink data. Optionally, the HARQ-ACK dynamic codebook is carried on the PSFCH.

The generating the HARQ-ACK dynamic codebook corresponding to the PSSCH and/or PSCCH reception carried on the PSFCH by the receiver UE of the sidelink data, includes:

determining a PSFCH resource carrying sidelink HARQ-ACK feedback information;

determining C-DAI and/or T-DAI corresponding to the sidelink HARQ-ACK feedback information;

generating a HARQ-ACK information bit corresponding to the sidelink HARQ-ACK feedback information; and generating the HARQ-ACK dynamic codebook corresponding to the sidelink HARQ-ACK feedback information based on the C-DAI and/or the T-DAI and the HARQ-ACK information bit.

Optionally, the C-DAI and/or T-DAI are indicated in the SCI transmitted by the transmitter UE of the sidelink data.

Similar to the embodiment of the first aspect, the receiver UE of the sidelink data transmitting the PSFCH generates the HARQ-ACK dynamic codebook based on the acquired C-DAI and/or T-DAI information. However, in the embodiment of the first aspect, the C-DAI and/or T-DAI information is indicated by the base station to the sidelink UE, and in the embodiment of the fourth aspect, the C-DAI and/or T-DAI information is indicated by the transmitter UE in the sidelink control information (SCI). In the embodiment of the first aspect, the information generated by the sidelink UE is the HARQ-ACK information to be reported to the base station, which may be generated based on the HARQ-ACK information of the receiver UE of the sidelink data or the actual sidelink reception state, and may include DTX. However, in the embodiment of the fourth aspect, the information generated by the sidelink UE is the HARQ-ACK information that is fed back to the transmitter UE of the data, which is directly generated according to the actual reception state on the sidelink, and excludes DTX.

The receiver UE of the sidelink data generates the HARQ-ACK dynamic codebook based on the actual state of the PSCCH and PSSCH decoding, and the C-DAI and/or T-DAI information indicated in the received SCI. The overall mechanism in the embodiment of the fourth aspect, and the specific principle of generating the HARQ-ACK dynamic codebook based on the C-DAI and/or T-DAI, are substantially similar to those in the embodiment of the first aspect.

Optionally, the following differences are allowed to be existed in those embodiments:

In the embodiment of the first aspect, it is generally assumed that the UE only can accept the scheduling from one base station. However, in the embodiment of the fourth aspect, the receiver UE of the sidelink data may need to receive data from a plurality of transmitter UEs, and therefore accordingly it is necessary to generate a HARQ-ACK dynamic codebook therefor according to the C-DAI and/or T-DAI indicated by each transmitter UE. Further, in the embodiment of the fourth aspect, the receiver UE of the sidelink data may generate different HARQ-ACK codebooks based on at least one of the following information, respectively: identification of the UE indicating the C-DAI and/or T-DAI (including at least one of UE ID, UE source ID, group ID of the group in which the UE is located, and ID/index of the UE within the group), TB/CBG-level HARQ-ACK feedback, CBG configuration, unicast/groupcast/broadcast, parameters characterizing service priority (for example, PPPP, and QoS). Taking the group ID of the group in which the UE is located in the above-described information as an example, when the group ID corresponding to the sidelink transmission is different, the receiver UE generates different HARQ-ACK codebooks; otherwise, when the group ID corresponding to the sidelink transmission is the same, the receiver UE generates the same HARQ-ACK codebook. The method may also be understood as that the UE generates one HARQ-ACK codebook for the sidelink transmission corresponding to each group ID. Optionally, the difference in the at least one piece of information further includes that the at least one piece of information belongs to a different range. Taking the QoS in the above information as an example, it is assumed that the QoS value is 1 to 16 and is divided into two ranges of 1 to 8 and 9 to 16 according to a predefined criterion, and the UE generates separate HARQ-ACK codebooks for sidelink transmission corresponding to different range of QoS, respectively.

The typical scenario to which the third aspect applies may also be similarly applied to the fourth aspect, and the beneficial effects thereof will not be repeatedly described. Compared the semi-static codebook in the third aspect with the dynamic codebook in the fourth aspect, the semi-static codebook may better feedback the transmission on a large predetermined sidelink resource, and indicate a larger amount of information. However, if there is only limited transmission on the indicated large-scale sidelink resources, it may cause waste of overhead. The dynamic codebook may provide feedback for a specific transmission, the overhead is relatively small, and it helps to improve the flexibility of the system.

Optionally, for all the embodiments in the disclosure, if the HARQ-ACK information corresponding to the sidelink transmission scheduled by the configured sidelink grant is generated on a PSSCH scheduled by the configured sidelink grant, and it is determined that the transmitter UE does not actually transmit the sidelink data, the HARQ-ACK information corresponding to the PSSCH generated by the transmitter UE is ACK.

Optionally, if the transmitter UE is configured not to report ACK, and/or is configured to report only NACK and/or DTX, the transmitter UE does not report the HARQ-ACK information corresponding to the PSSCH.

A typical application scenario of the method is that the transmitter UE does not have data to be transmitted in the UE buffer on the PSSCH scheduled by the configured sidelink grant. At this time, since the UE does not actually transmit the PSSCH, accordingly the UE will not receive the HARQ-ACK feedback (first HARQ-ACK feedback) provided by the receiver of the sidelink data, and cannot generate the HARQ-ACK (second HARQ-ACK feedback) information to be reported to the base station according to the first HARQ-ACK feedback. At this time, in order to prevent the base station from unnecessarily scheduling the retransmission resource for the transmitter UE, the transmitter UE should report the ACK, and the base station will accordingly understand the ACK as that there is no need to schedule the retransmission resource for the PSSCH.

Furthermore, for the third and fourth aspects, additional enhancements in groupcast feedback may also be considered. The groupcast feedback in the NR V2X system may support different receiver UEs in the same group to transmit HARQ-ACK feedback in code division multiplexing on the same time-frequency resource. Therefore, if PUCCH format 2 in the existing technique is adopted to carry the HARQ-ACK codebook, the performance of the PUCCH format 2 after code division multiplexing needs to be considered. According to the discussion in the current NR ungranted frequency band characteristics, when the frequency domain resources for carrying the PUCCH format 2 are sufficiently large, code division multiplexing may be performed on a plurality of PUCCH formats 2 in an OCC-like manner. In this scenario, the performance of PUCCH format 2 will not be seriously impacted. Therefore, whether to enable the HARQ-ACK codebook for groupcast may be determined based on the size of the PSFCH frequency domain resource.

Optionally, the UE dynamically determines to enable or disable the HARQ-ACK codebook for feedback on the sidelink channel and/or the uplink channel of the sidelink groupcast service. Optionally, if the frequency domain size of the channel for carrying the feedback of the sidelink groupcast service is greater than or equal to a given threshold, the UE determines to enable the HARQ-ACK codebook for the feedback; and/or if the frequency domain size of the channel for carrying the feedback of the sidelink groupcast service is smaller or equal to the given threshold, the UE determines to disable the HARQ-ACK codebook for the feedback. Optionally, the given threshold is configured/defined respectively for different types of channels (for example, uplink channel/sidelink channel).

In a specific embodiment, UE determines corresponding PSFCH resource according to PSCCH and/or PSCCH resources used by sidelink groupcast service, and/or information indicated in SCI, and/or PSFCH configuration of the sidelink resource pool where the service is located. The UE determines whether to enable the HARQ-ACK codebook according to whether the PSFCH resource is greater than a given threshold N sub-channels or N RBs in the frequency domain.

When generating a Type 1 HARQ-ACK codebook of sidelink transmission, since the codebook is reported to the base station by the transmitter UE, the codebook reflects the HARQ-ACK information corresponding to the PSSCH actually transmitted by the transmitter UE. The transmitter UE cannot transmit a plurality of sidelink transmissions simultaneously on one time domain resource (for example, one slot). Therefore, for a Type 1 codebook of the sidelink transmission, a preferred method is that in a resource pool, there is one candidate sidelink reception occasion on each time domain resource. If the UE is configured with a plurality of resource pools, for each time domain resource, there is one candidate sidelink reception occasion on each different resource pool respectively, or different resource pools share a same candidate sidelink reception occasion.

Optionally, the time domain resource corresponds to the time domain resource granularity of the sidelink system. For example, when the sidelink system only supports transmission at slot level, that is, a slot will not be further divided into smaller time units for a plurality of sidelink transmissions, the time domain resource is a slot. When the sidelink system supports transmission at symbol level, the time domain resource is one or more symbols.

When generating a Type 2 HARQ-ACK codebook of sidelink transmission, if the UE is configured with a plurality of sidelink resource pools, the respective DAIs corresponding to the plurality of sidelink resource pools may be separately counted or jointly counted. For separate counting, when generating a Type 2 codebook, the UE separately calculates {C-DAI, T-DAI} for each resource pool, and generates one Type 2 codebook for each resource pool based on its DAI, or generates one sub-codebook for each resource pool based on its DAI and generates a Type 2 codebook by sorting the sub-codebooks of all resource pools in order. For the latter, the method of sorting in order includes: when the UE is configured with a plurality of sidelink resource pools, the index of each sidelink resource pool is obtained, and the UE sorts the sub-codebooks of all resource pools according to the indexes of the sidelink resource pools. For joint counting, when generating a Type 2 codebook, the UE jointly calculates {C-DAI, T-DAI} for each resource pool, and generates one Type 2 codebook for all resource pools based on their DAIs. Optionally, if the UE obtains a plurality of sidelink grants on one time domain resource, and the plurality of sidelink grants indicate transmissions in different resource pools, the UE calculates DAI values respectively indicated in the plurality of sidelink grants in a predetermined order. The predetermined order includes sorting by cells and/or sorting by indexes of resource pools.

In a specific example, the respective DAIs corresponding to the plurality of sidelink resource pools are separately counted. The UE obtains two sidelink grants, i.e. A and B, and sidelink grants A and B schedule sidelink transmissions in resource pool 1 and resource pool 2, respectively. The {C-DAI, T-DAI} indicated in the sidelink grants A and B are {1, 1} and {2, 2}, respectively. Since the DAIs are separately counted, the UE considers that the {C-DAI, T-DAI} corresponding to the sidelink codebook corresponding to the resource pool 1 is {1, 1}, and accordingly, the generated Type 2 codebook is 1 bit in length, and thus the HARQ-ACK information bit of the sidelink transmission scheduled by the sidelink grant A is the first bit in the codebook. The UE considers that the {C-DAI, T-DAI} corresponding to the sidelink codebook corresponding to the resource pool 2 is {2, 2}, and accordingly, the generated Type 2 codebook is 2 bits in length, and thus the HARQ-ACK information bit of the sidelink transmission scheduled by the sidelink grant B is the second bit in the codebook.

In another specific example, the respective DAIs corresponding to the plurality of sidelink resource pools are jointly counted. The UE obtains two sidelink grants, i.e. A and B, and sidelink grants A and B schedule sidelink transmissions in resource pool 1 and resource pool 2, respectively. The {C-DAI, T-DAI} indicated in sidelink grants A and B are {1, 1} and {2, 2}, respectively. Since the DAIs are jointly counted, and the Type 2 codebook generated by the UE is 2 bits in length, the HARQ-ACK information bit of the sidelink transmission scheduled by the sidelink grant A is the first bit in the codebook, and the HARQ-ACK information bit of the sidelink transmission scheduled by the sidelink grant B is the second bit in the codebook. In this example, if the sidelink grants A and B are obtained on the same time domain resource, this example further includes that the UE calculates the DAI for each resource pool according to the resource pool indexes order, that is, firstly calculates the DAI {1, 1} for the resource pool 1, and then calculates the DAI {2, 2} for resource pool 2.

Optionally, after obtaining the PUCCH resource corresponding to the sidelink transmission scheduled by the base station, if determining that the transmission on the resource is collided with other uplink, downlink, or sidelink transmissions, the sidelink UE needs to resolve the collision. The PUCCH resource corresponding to the sidelink transmission includes a PUCCH resource for reporting whether the sidelink transmission is successful, and the transmission on this resource includes a PUCCH or UCI carrying the HARQ-ACK information of the sidelink transmission. The PUCCH transmission on the resource colliding with other uplink, downlink, or sidelink transmissions, includes that the resource overlaps or partially overlaps with resources used by the other uplink, downlink, or sidelink transmissions in the time domain. Optionally, it further includes that the UE does not have the capability to transmit the collided plurality of transmissions simultaneously, and/or the UE does not have the capability to transmit and receive the collided plurality of transmissions simultaneously.

The method for resolving the collision includes at least one of the following: multiplexing the collided transmissions on the same resource or multiplexing in one transmission; dropping at least one of the collided transmissions; and transmitting and/or receiving an undropped transmission among the collided transmissions in a manner when no collision occurs. Optionally, in this example and the following examples, dropping of at least one of the collided transmissions may also be replaced with postponing of at least one of the collided transmissions.

Optionally, the method for resolving the collision includes: according to a predetermined condition, transmitting and/or receiving N undropped transmissions among the collided transmissions in a manner when no collision occurs; and dropping transmission and/or reception of other transmissions among the collided transmissions. The value of N is fixed/(pre)configured/(pre)defined, and/or determined according to the predetermined condition. The predetermined condition includes at least one of the following: priority of service scenario (such as URLLC scenario, eMBB scenario, sidelink scenario, sidelink public safety scenario, sidelink non-public safety scenario, sidelink commercial scenario) corresponding to the transmission, priority of information carried in the transmission (such as priority of data indicated by QoS, priority of UCI/DCI information carried in the transmission), and priority of a channel of the transmission (such as the priorities of the downlink channel, the uplink channel, the sidelink channel, and further such as specific priorities of uplink/downlink/sidelink channels of PUCCH, PUSCH, PDCCH, PSSCH), UE's capability of supporting multiple simultaneous transmissions, and the duplex capability of the UE (such as half-duplex/full-duplex).

Optionally, if a transmission corresponds to more than one priorities, the priority of the transmission is determined according to the highest priority, or the lowest priority, or the average value of the priorities. For example, if a transmission is the transmission of HARQ-ACK codebook of sidelink data, and the codebook carries HARQ-ACK information of a plurality of sidelink TBs, the priority of the transmission is determined according to the minimum value of QoS (corresponding to the highest priority), or the maximum value of QoS (corresponding to the lowest priority), or the average value of the QoS corresponding to the plurality of sidelink TBs.

Optionally, the value of N is fixed to one. The sidelink UE resolving collision between transmission on the PUCCH resource corresponding to the sidelink transmission scheduled by the base station and other uplink/downlink/sidelink transmissions, includes that the sidelink UE transmits and/or receives one transmission with the highest priority among the collided transmissions in a same manner as when no collision occurs, and drops the other transmissions.

In a specific example, the prioritization of different service scenarios is that the priority of the URLLC is higher than that of the eMBB, and the priority of the eMBB is higher than that of the sidelink transmission. If the sidelink UE determines that more than one transmission needs to be transmitted and/or received on a specific resource (for example, a slot/symbol), the sidelink UE:

determines whether there is a transmission corresponding to the URLLC among the more than one transmissions, such as data or control signaling corresponding to the URLLC, the control signaling including HARQ-ACK information corresponding to the URLLC and scheduling information corresponding to the URLLC; and if there is a transmission corresponding to the URLLC, further determines to transmit and/or receive one transmission with the highest priority among the transmissions corresponding to the URLLC, and drops other transmissions on the specific resource;

otherwise, if there is no transmission corresponding to the URLLC, continues to determine whether there is a transmission corresponding to eMBB among the more than one transmissions, such as data or control signaling corresponding to the eMBB, the control signaling including HARQ-ACK information corresponding to the eMBB and scheduling information corresponding to the eMBB; and if there is a transmission corresponding to the eMBB, further determines to transmit/receive a transmission with the highest priority among the transmissions corresponding to the eMBB, and drops other transmissions on the specific resource; and otherwise, if there is no transmission corresponding to the eMBB, continues to determine the priorities of the more than one transmissions, and further determines to transmit/receive a transmission with the highest priority among the more than one transmissions, and drops the other transmissions on the specific resource; for example, if the more than one transmissions all are sidelink transmissions, the UE determines to transmit/receive a transmission with the minimum value of QoS and drops other transmissions on the specific resource according to the QoS parameters of the more than one transmissions.

In the above example, the priorities of all services in a given service scenario are lower than or higher than that of another given service scenario. For example, the priority of any eMBB service is lower than that of any URLLC service and higher than that of any sidelink service. In another example, the priority of any URLLC service is higher than the priority of any eMBB/sidelink service, but there is no absolute relationship between the priorities of the eMBB and the sidelink service. For example, some sidelink services (for example, services in the sidelink public safety scenario) have higher priorities than that of any eMBB service and any eMBB service has higher priority than that of other sidelink services (for example, services in the sidelink non-public safety scenario/sidelink commercial scenario). For example, the priorities of the sidelink service and the eMBB service are determined according to the specific service type. The UE sorts the priorities of different services according to the priority parameters corresponding to each service type.

In another specific example, the priorities of different service scenarios are priority of URLLC>priority of sidelink transmission with specific service priority>priority of eMBB>priority of remaining sidelink transmissions. If the sidelink UE determines that more than one transmission needs to be transmitted and/or received on a specific resource (for example, a slot/symbol), the sidelink UE:

determines whether there is a transmission corresponding to the URLLC among the more than one transmissions, such as data or control signaling corresponding to the URLLC, the control signaling including HARQ-ACK information corresponding to the URLLC and scheduling information corresponding to the URLLC; and if there is a transmission corresponding to the URLLC, further determines to transmit/receive a transmission with the highest priority among the transmissions corresponding to the URLLC, and drops other transmissions on the specific resource;

otherwise, if there is no transmission corresponding to the URLLC, continues to determine whether there is a sidelink transmission with specific service priority among the more than one transmissions; and if there is a sidelink transmission with specific service priority, further determines to transmit/receive a transmission with the highest priority among the sidelink transmissions with specific service priority, and drops other transmissions on the specific resource; optionally, the sidelink transmission with the specific service priority is a sidelink transmission with a QoS lower than a given threshold;

otherwise, if there is no sidelink transmission with specific service priority, continues to determine whether there is a transmission corresponding to the eMBB among the more than one transmissions, such as data or control signaling corresponding to the eMBB, the control signaling including HARQ-ACK information corresponding to the eMBB and scheduling information corresponding to the eMBB; and if there is a transmission corresponding to the eMBB, further determines to transmit/receive a transmission with the highest priority among the transmissions corresponding to the eMBB, and drops other transmissions on the specific resource;

otherwise, if there is no transmission corresponding to the eMBB, continues to determine the priorities of the more than one transmissions, and further determines to transmit/receive a transmission with the highest priority among the more than one transmissions, and drops other transmissions on the specific resource; for example, if the more than one transmissions are all sidelink transmissions, the UE determines to transmit/receive a transmission with the minimum value of QoS and drops other transmissions on the specific resource according to the QoS parameters of the more than one transmissions.

The above examples are mainly used to illustrate the impact of different service scenarios and/or service types on priority determination. Similarly, the channel being an uplink/downlink/sidelink channel, and the channel type (such as, data channel/control channel) may also be used to determine the priorities of different transmissions. In a specific example, if the sidelink UE determines that more than one transmissions need to be transmitted and/or received on a specific resource (for example, a slot/symbol), the UE firstly determines whether to transmit or receive on this resource according to the priorities of the uplink channel, downlink channel and sidelink channel, and/or the priorities of different channel types (such as the priorities of channel type of PDSCH, PDCCH, PUCCH, PUSCH, PSSCH, PSCCH, and PSFCH), and then determines whether to transmit or receive a transmission with the highest priority according to the priorities of different channel types and/or the priorities of the service scenarios and/or the priorities of the service types. In another specific example, the priority of each transmission is jointly determined according to the type of channel used by the transmission, the service scenario corresponding to the transmission, and the service type corresponding to the transmission. The UE determines to transmit or receive a transmission with the highest priority according to the priority of each of the more than one transmission. For example, the UE assumes that the priority of the PUCCH transmission corresponding to the sidelink transmission is lower than that of any transmission corresponding to the URLLC, and the priority of the PUCCH transmission corresponding to the sidelink transmission whose QoS meets a first specific condition is higher than that of UCI transmission of the eMBB (the UCI includes a UCI carrying specific content, for example, a UCI carrying HARQ-ACK feedback information of PDSCH; or the UCI includes any UCI), and the priority of the PUCCH transmission corresponding to the sidelink transmission whose QoS does not meet the first specific condition or meets a second specific condition is lower than that of the UCI transmission of the eMBB. The first specific condition and/or the second specific condition include at least one of the following: the QoS being within a given threshold range, and QoS being any QoS. The UCI transmission of the eMBB is a specific type of UCI (for example, a specific type such as CSI, HARQ-ACK codebook), or the UCI transmission may be any type of UCI. The UE determines, according to the priority condition, to transmit or receive a transmission with the highest priority.

Optionally, the value of N is configured, or determined according to UE's capability. If the N is determined according to the UE's capability, optionally, if the sidelink UE determines to transmit N transmissions with the highest priority among the collided transmissions, where N is the maximum number of simultaneous transmissions that the UE can support. The method for the UE to select the N transmissions with the highest priority is similar to that when N=1, and the description is not repeated. Optionally, if the sidelink UE determines to transmit the N transmissions with the highest priority among the collided transmissions, the method further includes: the UE selects one transmission with the highest priority; and then, the UE selects one transmission with the second highest priority among other transmissions which can be transmitted simultaneously with the transmission with the highest priority, and so on until a total of N transmissions are selected; or the UE selects the remaining N−1 transmissions with the highest priority among other transmissions which can be transmitted simultaneously with the transmission with the highest priority.

Optionally, if the sidelink UE determines to transmit the N transmissions with the highest priority among the collided transmissions, the method further includes that the UE determines the transmission power of the N transmissions, including at least one of the following methods:

the UE determines the N transmissions with the highest priority, and determines their transmission power according to the method when no collision occurs; then, the UE determines whether the total transmission power of the N transmissions exceeds the maximum transmission power of the UE; if it exceeds, then the UE reduces the transmission power of each transmission proportionally until the total transmission power of the N transmissions does not exceed the maximum transmission power of the UE. The advantage of this method is that the implementation complexity is relatively low and power allocation is performed relatively fairly among the N transmissions transmitted, thus relatively fairly ensuring probability of each transmission being successfully received; and the UE selects one transmission with the highest priority, and determines its transmission power according to the method when no collision occurs; then, the UE uses the remaining transmission power for other transmissions. Specifically, the UE preferentially ensures the transmission power of the transmission with the second highest priority to be the same as that when no collision occurs, and then uses the remaining transmission power for the remaining transmissions, and so on. Or, the UE determines whether the transmission power of the N−1 transmissions other than the transmission with the highest priority exceeds the remaining transmission power. If the remaining transmission power is exceeded, the transmission power of each of the other N−1 transmission is proportionally reduced until the transmission power of the other N−1 transmissions does not exceed the remaining transmission power. The advantage of this method is that it may ensure that the transmission power of the transmission with the highest priority is not affected by other transmissions, and it may also ensure that the transmission power of the transmission with the higher priority is less likely to be affected by other transmissions with lower priority, thereby ensuring the probability of services with the higher priority being successfully received.

Optionally, the method for resolving the collision further includes: if the collided transmissions include PUCCH and/or UCI, multiplexing the collided PUCCH transmission and/or UCI transmission in the same PUCCH and/or UCI according to a predetermined condition. Optionally, the method for resolving the collision further includes: if the collided transmissions include PUCCH and/or UCI, and also include PUSCH transmission, multiplexing the collided PUCCH transmission and/or UCI transmission on the same PUCCH and/or UCI according to a predetermined condition, and/or piggybacking the PUCCH and/or UCI on the PUSCH.

The predetermined condition includes at least one of the following: the information carried by the collided transmissions being a specific type (for example, any one of HARQ-ACK information and CSI information), and the collided transmissions carrying the same type of information (for example, both being HARQ-ACK codebook), the collided transmissions corresponding to a specific service type or service scenario (for example, any one of the eMBB scenario, sidelink scenario), the total length of the collided transmissions after being multiplexed not exceeding a given threshold, and the number of the collided transmissions not exceeding a given threshold.

Multiplexing the collided PUCCH transmission and/or UCI transmission in the same PUCCH and/or UCI, specifically includes sorting HARQ-ACK codebooks carried in the collided PUCCH transmission and/or UCI transmission in accordance with predetermined criteria in the same PUCCH and/or UCI. The predetermined criteria include at least one of the following: sorting according to the priorities of the HARQ-ACK codebooks; sorting according to the priorities of the PUCCH and/or UCI carrying the HARQ-ACK codebooks; sorting according to the priorities of the data transmissions corresponding to the HARQ-ACK codebooks; sorting according to the priorities of the resource type of data transmissions corresponding to the HARQ-ACK codebooks; and sorting according to the resource location of the data transmissions corresponding to the HARQ-ACK codebooks.

The priorities in the above-mentioned various criteria include the priorities of the N transmissions with the highest priority among the collided transmissions determined by the UE in the above example, and also include the priorities indicated by specific parameters and/or priorities predetermined/preconfigured by specific criteria. For the latter, a specific example is that the priorities of different HARQ-ACK codebooks are predetermined/preconfigured according to specific criteria. For example, the priority of the HARQ-ACK codebook corresponding to the URLLC is the highest, followed by the priority of the HARQ-ACK codebook corresponding to the sidelink transmission of which the service priority meets a predetermined condition (for example, when the service priority is indicated by the QoS parameter, the QoS is less than a specific threshold), and then the priority of the HARQ-ACK codebook corresponding to the eMBB, and the priority of HARQ-ACK codebook corresponding to the other sidelink transmissions is the lowest. Further, the priorities of different TB-level codebooks and CBG-level codebooks are predetermined/preconfigured according to specific criteria. For example, the priorities of HARQ-ACK codebooks include: priority of a TB-level codebook corresponding to the URLLC>priority of a CBG-level codebook corresponding to the URLLC>priority of a TB-level codebook corresponding to the eMBB>priority of a CBG-level codebook corresponding to the eMBB>priority of a TB-level codebook corresponding to the sidelink transmission>priority of a CBG-level codebook corresponding to the sidelink transmission.

Sorting according to the priorities of the resource types of the data transmissions corresponding to the HARQ-ACK codebooks, includes, sorting according to, for example, resources of the data transmissions corresponding to the HARQ-ACK codebooks being uplink/downlink resources, and the specific type of channel occupied by the resources of the data transmissions corresponding to the HARQ-ACK codebooks. Sorting according to the resource locations of the data transmissions corresponding to the HARQ-ACK codebooks includes sorting according to the order of the resource locations of the data transmissions corresponding to the HARQ-ACK codebooks in time domain and/or frequency domain. Sorting according to the priorities of the resource types of the data transmissions corresponding to the HARQ-ACK codebooks and/or according to the resource locations of the data transmissions corresponding to the HARQ-ACK codebooks, further includes that when the HARQ-ACK codebooks correspond to more than one data transmissions, sorting according to priority of the resource type and/or resource location of a specific data transmission, for example, sorting according to the priority of the resource type and/or resource location of the last or first data transmission.

In this example, the priorities for sorting the HARQ-ACK codebooks may also be understood as the order for sorting the HARQ-ACK codebooks. For example, sorting the codebooks according to the predetermined/preconfigured priorities of different HARQ-ACK codebooks according to specific criteria is equivalent to sorting the codebooks in the predetermined/preconfigured order of the different HARQ-ACK codebooks according to specific criteria.

Optionally, the sorting HARQ-ACK codebooks carried in the collided PUCCH transmission and/or UCI transmission in accordance with predetermined criteria in the same PUCCH and/or UCI further includes: when a specific condition is met, using a configured/preconfigured first group of priority of the HARQ-ACK codebook; otherwise, using a configured/preconfigured second group of priority of the HARQ-ACK codebook.

The specific condition includes: difference in size (or number of bits) of the HARQ-ACK codebook carried in the collided PUCCH transmission and/or UCI transmission being greater than or equal to a threshold.

The first group of priority may be determined based on service type of uplink/downlink service corresponding to the HARQ-ACK codebook (such as URLLC and eMBB) and based on priority of the sidelink service (such as priority indicated by QoS), and the second group of priority may be determined based on the service type of the uplink/downlink service corresponding to the HARQ-ACK codebook and based on whether the corresponding service is a sidelink service. For example, the first group of priority may include following: the codebook corresponding to the sidelink service with priority belonging to a first threshold range>the codebook corresponding to the URLLC>the codebook corresponding to the sidelink service with priority belonging to a second threshold range>the codebook corresponding to the eMBB>the codebook corresponding to the sidelink service with priority belonging to a third threshold range; wherein, the first threshold range/second threshold range/third threshold range may be indicated by range of the value of the QoS. For example, the second group of priority may include following: the priority of the codebook corresponding to the URLLC>the priority of the codebook corresponding to the eMBB>the priority of the codebook corresponding to the sidelink service; alternatively, the second group of priority may include following: the codebook corresponding to the URLLC>the codebook corresponding to the sidelink service>the codebook corresponding to the eMBB.

In the sidelink communication system, when the UE obtains the sidelink resource scheduled by the base station, it may not report the priority of the sidelink service transmitted on the sidelink resource to the base station. Therefore, when the base station schedules the HARQ-ACK codebook corresponding to the sidelink service and the HARQ-ACK codebook corresponding to the downlink service, reported by the UE, on the same time domain resource, it may not be able to determine which codebook is reported by the UE, thus the base station needs to blind detection the received codebooks. In this scenario, the base station may schedule different other parameters for each HARQ-ACK codebook. The other parameters include other parameters than the time-domain resource location in the parameters indicated when scheduling the PUCCH, such as frequency-domain resources, codes domain resources (such as cyclic shift), and PUCCH format. Therefore, the above method may take effect in the scenario where the base station determines the type of codebook reported by the UE and the scenario where the base station cannot determine the type of codebook reported by the UE and requires blind detection.

After receiving the sidelink data channel, if the sidelink UE needs to feed back HARQ-ACK information to the transmitter UE of the data on the sidelink, the sidelink UE determines sidelink resource for transmitting the HARQ-ACK information according to identity of the transmitter UE and identity of the receiver UE. The sidelink resource for transmitting the HARQ-ACK information includes at least one of a time domain resource, a frequency domain resource, and a code domain resource. The code domain resource includes a cyclic shift of a sequence used by the HARQ-ACK. A specific example is as follows:

a UE determines an index of a PSFCH resource for a PSFCH transmission in response to a PSSCH reception, as $(P_{ID}+M_{ID}) \bmod R_{PRB, CS}^{PSFCH}$ where $P_{ID}$ is a physical layer source ID provided by SCI format 0_2 [5, TS 38.212] scheduling the PSSCH reception, $M_{ID}$ is zero or $M_{ID}$ is the identity of the UE receiving the PSSCH as indicated by higher layers.

The $M_{ID}$, which is the identity of the UE receiving the PSSCH as indicated by higher layers, is mainly used in a groupcast scenario. The identity of the UE receiving the PSSCH as indicated by higher layers is also called the UE's ID within a group. The main purpose of the identity is that when providing feedback for the groupcast service, different receiver UEs have different ID within the group, thus indexes of different PSFCH resources will be determined accordingly, so as to avoid the collision caused by the HARQ-ACK feedback of different receiver UEs of the groupcast service being transmitted on the same resource. The $M_{ID}$, which is 0, is mainly used in a unicast scenario. In this scenario, since the service has only one receiver UE, there is no need to consider the collision between multiple receiver UEs, so there is no need to introduce a group ID and it may reduce system complexity by using a fixed value for $M_{ID}$.

In view of the above motivation, in the above process, the method for the UE to determine the identity of the receiver UE (for example, $M_{ID}$ in the above example) includes the UE determining the identity of the receiver UE according to the cast type. For example, when the cast type is unicast or groupcast HARQ-ACK feedback option 1 (that is, a feedback option in which the UE only feeds back NACK information and does not feedback ACK information), the UE determines that the $M_{ID}$ is 0; when the cast type is groupcast HARQ-ACK feedback option 2 (that is, a feedback option in which the UE feeds back the ACK or NACK information), the UE determines that the $M_{ID}$ is the identity of the UE receiving the PSSCH as indicated by higher layers. Therefore, if the receiver UE for the sidelink data channel needs to feed back HARQ-ACK information to the sidelink transmitter UE, the receiver UE needs to identify the cast type corresponding to the sidelink reception associated with the feedback information, and further determines the identity of the receiver UE according to the cast type.

The UE determines the cast type based on at least one of the following methods: determining the cast type by using the SCI format; determining the cast type by using the physical layer ID; determining the cast type by using a specific domain explicitly indicated in the physical layer signaling; and determining the cast type by using a specific domain explicitly or implicitly indicated in the higher layer signaling.

Optionally, the SCI includes 1st stage SCI and 2nd stage SCI. The 2nd stage SCI includes format A and format B; wherein the format A is dedicated to indicate groupcast HARQ-ACK feedback option 1, and may be used to indicate broadcast; and the format B is used to indicate unicast and groupcast HARQ-ACK feedback option 2, and may also be used to indicate broadcast. The 1st stage SCI or 2nd stage SCI indicates that the HARQ is disabled, thereby indicating that the cast type is broadcast; or indicates that the HARQ is enabled, thereby indicating that the cast type is groupcast or unicast. In the 2nd stage SCI, the cast type is implicitly indicated by the physical layer ID, or the cast type is indicated by the explicitly indicated specific domain. In the MAC signaling, the cast type is determined by the explicitly or implicitly indicated specific domain, such as a domain in the MAC header. Accordingly, the UE determines that the cast type is groupcast HARQ-ACK feedback option 1 (or groupcast HARQ-ACK feedback option 1/broadcast) or the cast type is unicast/groupcast HARQ-ACK feedback option 2/broadcast according to the received the 2nd stage SCI format; the UE determines whether the cast type is broadcast according to the HARQ being enabled/disabled indicated in the received SCI; if the cast type is unicast/groupcast HARQ-ACK feedback option 2 and is not broadcast, the UE further determines whether the cast type is unicast or groupcast HARQ-ACK feedback option 2 according to the physical layer ID (such as a destination ID indicated in the SCI), and/or the UE determines whether the cast type is unicast or groupcast HARQ-ACK feedback option 2 according to the specific domain explicitly indicated in the SCI, and/or the UE determines whether the cast type is unicast or groupcast HARQ-ACK feedback option 2 according to a MAC layer signaling (for example, the domain in the MAC header). After determining the cast type, the UE determines that the $M_{ID}$ is 0 when the cast type is unicast or groupcast HARQ-ACK feedback option 1, and determines that the $M_{ID}$ is the identity of the UE receiving the PSSCH as indicated by higher layers when the cast type is groupcast HARQ-ACK feedback option 2.

In the above method of indicating the cast type, in order to reduce the signaling overhead of SCI, a feasible method is that:

the UE determines that the cast type is groupcast HARQ-ACK feedback option 1 (or groupcast HARQ-ACK feedback option 1/broadcast) or the cast type is unicast/groupcast HARQ-ACK feedback option 2/broadcast according to the SCI format; and the UE determines whether the cast type is broadcast, according to the HARQ being enabled/disabled indicated in the received SCI;

subsequently, if the UE determines that the cast type is unicast/groupcast HARQ-ACK feedback option 2, the UE further determines that the cast type is unicast or the cast type is groupcast HARQ-ACK feedback option 2 according to the physical layer ID; if the cast type cannot be distinguished according to the physical layer ID, for example, if the unicast ID set overlaps with the groupcast ID set, which are configured to the physical layer by the higher layer, and a destination ID indicated in the received SCI belongs to the overlapping part of the two sets, the UE decodes the data and determines the cast type according to the information indicated in the higher layer signaling.

The advantage of the above method is that, since the UE may determine the cast type by the SCI format, the HARQ enabling/disabling indication domain, the physical layer ID, and/or the higher layer signaling, there is no need to add bits that explicitly indicate the cast type in the SCI, thereby reducing the SCI format size. However, the above method has potential risks when the UE fails to successfully decode the PSSCH. When the decoding of PSSCH is failed, the UE cannot determine the cast type by the higher layer signaling, so if the UE determines that the cast type is unicast/groupcast HARQ-ACK feedback option 2, and the cast type cannot be distinguished according to the physical layer ID, the UE cannot further distinguish whether the cast type is unicast or groupcast HARQ-ACK feedback option 2, thus it is impossible to determine whether the $M_{ID}$ is 0 or the $M_{ID}$ is the identity of the UE receiving the PSSCH as indicated by higher layers.

In response to this problem, a feasible method is that if the UE fails to successfully decode the PSSCH and determines that the cast type is unicast/groupcast HARQ-ACK feedback option 2, and the cast type cannot be distinguished according to the physical layer ID, the UE determines that the $M_{ID}$ is 0.

The main advantage of the above method is that if the cast type is unicast, the transmitter UE will monitor the PSFCH resource corresponding to the $M_{ID}$ being 0, that is, the determining the $M_{ID}$ being 0 in the above method determines the correct PSFCH resources, the HARQ-ACK feedback will not be affected. If the cast type is groupcast HARQ-ACK feedback option 2, the transmitter UE will monitor the PSFCH resource corresponding to the $M_{ID}$ of each receiver UE of each groupcast service (the $M_{ID}$ is the identity of the UE receiving the PSSCH as indicated by higher layers), if the $M_{ID}$ of a receiver UE of the groupcast service is 0, the transmitter UE may still receive a NACK feedback on the PSFCH resource corresponding to the $M_{ID}$ being 0; if the $M_{ID}$ of any receiver UE of the groupcast service is not 0, the transmitter UE will consider that it has failed to receive the HARQ-ACK feedback information of the receiver UE when the transmitter UE monitors the PSFCH resource corresponding to the $M_{ID}$ of the receiver UE using the above method (the $M_{ID}$ is the identity of the UE receiving the PSSCH as indicated by higher layers), since the receiver UE actually transmits feedback information on the PSFCH resource corresponding to $M_{ID}$ being 0. In groupcast HARQ-ACK feedback option 2, when the transmitter UE receives NACK information from any receiver UE, or when it fails to receive HARQ-ACK information from any receiver UE, retransmission will be triggered. Therefore, in the above method, the retransmission of groupcast HARQ-ACK feedback option 2 actually may be triggered correctly, that is, the HARQ-ACK feedback of the groupcast HARQ-ACK feedback option 2 will not be affected. Therefore, in the above method, the HARQ-ACK retransmission may be correctly triggered under the premise of controlling SCI overhead.

Similarly, another feasible method is that: if the UE fails to decode the PSSCH successfully and the cast type is determined to be unicast/groupcast HARQ-ACK feedback option 2, and the cast type cannot be distinguished according to the physical layer ID, the UE determines that the $M_{ID}$ is the identity of the UE receiving the PSSCH as indicated by higher layers.

The main advantages of the above method are similar to that of the previous method. When the cast type is the groupcast HARQ-ACK feedback option 2, the above method selects the correct PSFCH resource and will not affect the HARQ-ACK feedback; when the cast type is the unicast, the transmitter UE will monitor the PSFCH resource corresponding to the $M_{ID}$ being 0, thus the HARQ-ACK information feedback by the receiver UE using the above method may not be received, and transmission of the HARQ is triggered due to the absence of the HARQ-ACK information, so that the HARQ-ACK feedback of the unicast service will not be affected. Therefore, in the above method, the HARQ-ACK retransmission may be correctly triggered under the premise of controlling SCI overhead.

Embodiment 2

Figure 7:
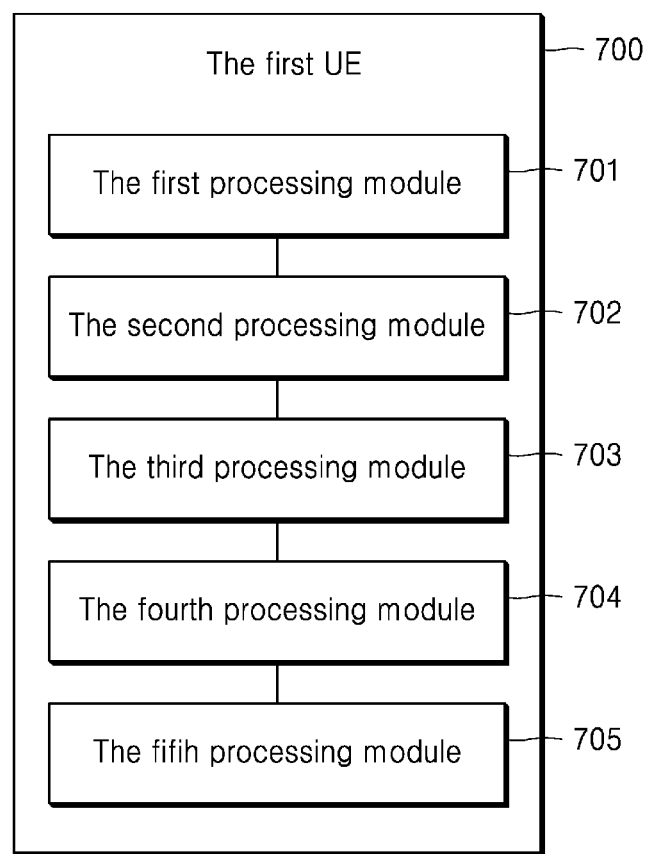
FIG. 7 is a schematic structural diagram of a first UE according to an embodiment of the disclosure.

Based on the same inventive concept of the foregoing embodiment, an embodiment of the disclosure further provides a first UE, a schematic structural diagram of which is as shown in FIG. 7. The first UE 700 includes a first processing module 701, a second processing module 702, a third processing module 703, a fourth processing module 704, and a fifth processing module 705.

The first processing module 701 is configured to transmit a sidelink transmission to a second UE.

The second processing module 702 is configured to receive first hybrid automatic repeat request acknowledgement (HARQ-ACK) feedback information transmitted by the second UE.

The third processing module 703 is configured to generate, according to the received first HARQ-ACK feedback information, second HARQ-ACK feedback information corresponding to the sidelink transmission.

The fourth processing module 704 is configured to generate a first HARQ-ACK codebook including the second HARQ-ACK feedback information.

The fifth processing module 705 is configured to report the first HARQ-ACK codebook to a base station.

Optionally, the first HARQ-ACK codebook includes a first HARQ-ACK dynamic codebook, and the generating the first HARQ-ACK codebook including the second HARQ-ACK feedback information, includes:

determining a physical uplink control channel (PUCCH) resource carrying the second HARQ-ACK feedback information;

determining, according to the PUCCH resource, a count downlink allocation index (C-DAI) and/or a total downlink allocation index (T-DAI) corresponding to the second HARQ-ACK feedback information;

generating a HARQ-ACK information bit corresponding to the second HARQ-ACK feedback information; and generating the first HARQ-ACK dynamic codebook according to at least one of the C-DAI and the T-DAI, and the HARQ-ACK information bit.

Optionally, the determining the physical uplink control channel (PUCCH) resource carrying the second HARQ-ACK feedback information includes:

when the sidelink transmission is scheduled by sidelink grant, and physical downlink control channel (PDCCH) monitoring occasion (MO) of downlink control information (DCI) carrying the sidelink grant and/or physical downlink shared channel (PDSCH) resource carrying the sidelink grant are determined in a slot n, determining that the second HARQ-ACK feedback information of sidelink data is transmitted on PUCCH in slot n+m;

wherein the m is determined by at least one of a sidelink HARQ-ACK timing indicator, a higher layer parameter, a configured offset, a preconfigured offset, and a predefined offset indicated in the sidelink grant, where the n and m are real numbers;

the sidelink HARQ-ACK timing indicator indicated in the sidelink grant includes at least one of: a PDSCH-to-HARQ-ACK feedback timing indicator, a PDCCH MO-to-HARQ-ACK feedback timing indicator, a PSSCH-to-HARQ-ACK feedback timing indicator, a PSCCH-to-HARQ-ACK feedback timing indicator, and a PSFCH-to-HARQ-ACK feedback timing indicator.

Optionally, the generating the first HARQ-ACK dynamic codebook including the second HARQ-ACK feedback information includes:

multiplexing the second HARQ-ACK feedback information corresponding to the sidelink transmission and third HARQ-ACK feedback information corresponding to downlink transmission in a same first HARQ-ACK dynamic codebook or a same sub-codebook in the first HARQ-ACK dynamic codebook; or generating separate HARQ-ACK dynamic codebooks for the second HARQ-ACK feedback information corresponding to the sidelink transmission and the third HARQ-ACK feedback information corresponding to the downlink transmission, respectively; or generating separate sub-codebooks in the first HARQ-ACK dynamic codebook for the second HARQ-ACK feedback information corresponding to the sidelink transmission and the third HARQ-ACK feedback information corresponding to the downlink transmission, respectively.

Optionally, the multiplexing the second HARQ-ACK feedback information corresponding to the sidelink transmission and the third HARQ-ACK feedback information corresponding to the downlink transmission in the same first HARQ-ACK dynamic codebook or the same sub-codebook in the first HARQ-ACK dynamic codebook further includes at least one of the following:

the sidelink transmission being scheduled by the sidelink grant, wherein C-DAI(s) in the sidelink grant and PDSCH reception associated with DCI format 1_0 are jointly counted;

the sidelink transmission being scheduled by the sidelink grant, wherein the C-DAI(s) in the sidelink grant and C-DAI of semi-persistent scheduling (SPS) PDSCH release associated with DCI format 1_0 are jointly counted;

the sidelink transmission being scheduled by the sidelink grant, wherein the C-DAI(s) in the sidelink grant and PDSCH reception associated with DCI format 1_1 are jointly counted;

the sidelink transmission being scheduled by the sidelink grant, wherein the C-DAI in the sidelink grant and C-DAI of SPS PDSCH release associated with DCI format 1_1 are jointly counted;

and the sidelink transmission being scheduled by the sidelink grant, wherein T-DAI in the sidelink grant and T-DAI of the PDSCH reception associated with DCI format 1_1 are jointly counted.

Optionally, the generating the first HARQ-ACK dynamic codebook including the second HARQ-ACK feedback information further includes at least one of the following:

determining whether at least one sidelink transmission enables code block group (CBG) transmission according to at least one of configured information, preconfigured information, and predefined information;

generating TB-based second HARQ-ACK feedback information or HARQ-ACK information bit corresponding to the second HARQ-ACK feedback information for the at least one sidelink transmission if the CBG transmission is not enabled; and generating CBG-based second HARQ-ACK feedback information or the HARQ-ACK information bit corresponding to the second HARQ-ACK feedback information for the at least one sidelink transmission if CBG transmission is enabled.

Wherein the sidelink transmission includes at least one of the following:

a sidelink transmission within a serving cell, a sidelink transmission within a sidelink resource pool, a sidelink transmission in a sidelink transmission mode, a sidelink transmission of one service type, a sidelink transmission of one transmission type, a sidelink transmission corresponding to a type of grant and a given sidelink transmission.

Optionally, the generating the CBG-based second HARQ-ACK feedback information or the HARQ-ACK information bit corresponding to the second HARQ-ACK feedback information for the at least one sidelink transmission includes:

obtaining maximum number of CBGs included in one transport block (TB) of sidelink data included in the sidelink transmission;

wherein the obtaining maximum number of CBGs included in one TB of sidelink data included in the sidelink transmission includes at least one of the following:

obtained by CBG-related configuration of sidelink, CBG-related pre-configuration of sidelink, configuration of sidelink resource pool, and pre-configuration of sidelink resource pool.

Optionally, the generating the first HARQ-ACK dynamic codebook corresponding to the sidelink transmission includes:

generating a first HARQ-ACK dynamic sub-codebook and a second HARQ-ACK dynamic sub-codebook, the first HARQ-ACK dynamic sub-codebook corresponding to third HARQ-ACK feedback information of TB-based downlink transmission and/or second HARQ-ACK feedback information of TB-based sidelink transmission, and the second HARQ-ACK dynamic sub-codebook corresponding to third HARQ-ACK feedback information of CBG-based downlink transmission and/or second HARQ-ACK feedback information of CBG-based sidelink transmission.

Optionally, C-DAI and T-DAI corresponding to the first HARQ-ACK dynamic sub-codebook and the second HARQ-ACK dynamic sub-codebook respectively are separately counted, and in the first HARQ-ACK dynamic sub-codebook and the second HARQ-ACK dynamic sub-codebook, C-DAI and/or T-DAI corresponding to the sidelink transmission and downlink transmission are jointly counted.

Optionally, when P configured sidelink grants are activated, and the sidelink transmission scheduled by the configured sidelink grant meets a preset condition, the second HARQ-ACK feedback information of the sidelink transmission scheduled by the activated P configured sidelink grants are added at the end of the first HARQ-ACK dynamic codebook and/or at the end of the dynamic codebook including the sidelink HARQ-ACK feedback information corresponding to the dynamic sidelink grant, P being a positive integer.

Optionally, the generating the first HARQ-ACK dynamic codebook further includes at least one of the following:

in the first HARQ-ACK dynamic codebook, firstly adding a HARQ-ACK information bit corresponding to SPS PDSCH, and then adding a HARQ-ACK information bit corresponding to the configured sidelink grant;

sorting, based on a same criterion, the HARQ-ACK information bits corresponding to the SPS PDSCH and the configured sidelink grant, and sequentially adding them to the first HARQ-ACK dynamic codebook;

adding the HARQ-ACK information bit corresponding to the configured sidelink grant at the end of the sub-codebook in the first HARQ-ACK dynamic codebook corresponding to the second HARQ-ACK feedback information of the sidelink transmission; and adding the HARQ-ACK information bit corresponding to the SPS PDSCH at the end of the sub-codebook in the first HARQ-ACK dynamic codebook corresponding to the third HARQ-ACK feedback information of the downlink transmission.

Optionally, the generating separate HARQ-ACK dynamic codebooks or separate sub-codebooks in the first HARQ-ACK dynamic codebook for the second HARQ-ACK feedback information corresponding to the sidelink transmission and the third HARQ-ACK feedback information corresponding to the downlink transmission, respectively, further includes:

sorting downlink HARQ-ACK dynamic codebook corresponding to the third HARQ-ACK feedback information of the downlink transmission and sidelink HARQ-ACK dynamic codebook corresponding to the second HARQ-ACK feedback information of the sidelink transmission so as to generate the first HARQ-ACK dynamic codebook; and the C-DAI and/or T-DAI corresponding to the downlink HARQ-ACK dynamic codebook and the C-DAI and/or T-DAI corresponding to the sidelink HARQ-ACK dynamic codebook being separately counted; wherein the C-DAI represents cumulative number of information pairs including serving cell and PDCCH MO; in the information pairs, there is transmission and/or reception of a sidelink grant, and/or transmission and/or reception of a sidelink physical shared channel (PSSCH) scheduled by the sidelink grant; and the T-DAI represents a total number of information pairs including the serving cell and the PDCCH MO; in the information pairs, there is transmission and/or reception of a sidelink grant, and/or transmission and/or reception of the PSSCH scheduled by the sidelink grant.

Optionally, the first HARQ-ACK codebook includes a first HARQ-ACK semi-static codebook, and the generating the first HARQ-ACK codebook including the second HARQ-ACK feedback information includes:

determining the PUCCH resource carrying the second HARQ-ACK feedback information;

determining, according to the PUCCH resource, a candidate sidelink reception occasion set;

generating a corresponding HARQ-ACK information bit for each candidate sidelink reception occasion in the candidate sidelink reception occasion set; and sorting the generated HARQ-ACK information bits in order to generate the first HARQ-ACK semi-static codebook including the second HARQ-ACK feedback information.

Optionally, the first HARQ-ACK codebook includes a first HARQ-ACK semi-static codebook, and the generating the first HARQ-ACK codebook including the second HARQ-ACK feedback information includes:

determining the PUCCH resource carrying the second HARQ-ACK feedback information;

determining, according to the PUCCH resource, a candidate sidelink reception occasion set and a candidate PDSCH reception occasion set;

generating a corresponding HARQ-ACK information bit for each candidate sidelink reception occasion and each candidate PDSCH reception occasion in the candidate sidelink reception occasion set and the candidate PDSCH reception occasion set; and sorting the generated HARQ-ACK information bits in order to generate the first HARQ-ACK semi-static codebook including the second HARQ-ACK feedback information.

Optionally, the second HARQ-ACK feedback information corresponding to the sidelink transmission and the third HARQ-ACK feedback information corresponding to the downlink transmission are multiplexed in a same first HARQ-ACK semi-static codebook or a same sub-codebook in the first HARQ-ACK semi-static codebook; or separate HARQ-ACK semi-static codebooks are generated for the second HARQ-ACK feedback information corresponding to the sidelink transmission and the third HARQ-ACK feedback information corresponding to the downlink transmission, respectively; or separate sub-codebooks in the first HARQ-ACK semi-static codebook are generated for the second HARQ-ACK feedback information corresponding to the sidelink transmission and the third HARQ-ACK feedback information corresponding to the downlink transmission, respectively.

Optionally, the determining the candidate sidelink reception occasion set includes:

determining the candidate sidelink reception occasion set for a partial bandwidth (BWP) and/or resource pool for sidelink activated in each serving cell corresponding to a given HARQ-ACK feedback time unit.

Optionally, the determining the candidate sidelink reception occasion in the candidate sidelink reception occasion set includes:

determining at least one of a time domain resource range, a frequency domain resource range, and a code domain resource range including the candidate sidelink reception occasion for a BWP and/or a resource pool for sidelink activated in each serving cell corresponding to a given HARQ-ACK feedback time unit.

Optionally, the determining the time domain resource range including the candidate sidelink reception occasion, includes:

obtaining a slot timing set q associated with the BWP and/or the resource pool, where q is used to indicate a time domain gap between the sidelink transmission and the reporting of second HARQ-ACK feedback information corresponding to the sidelink transmission;

when a given HARQ-ACK feedback time unit is located in slot n, for all possible values of q, it is sequentially determined whether there is a possible sidelink transmission on the slot n–q, n–q representing the difference between n and q;

when there is a possible sidelink transmission, the sidelink resource corresponding to the slot n–q is counted into the candidate sidelink reception occasion set.

Optionally, determining the number of sidelink resources that may be used for sidelink transmission in one slot, according to at least one of a frequency domain resource range, a code domain resource range, and a configuration of resources used for sidelink transmission;

determining the number of the candidate sidelink reception occasions counted in the slot n–q.

Optionally, in the process of generating the first HARQ-ACK semi-static codebook corresponding to the sidelink transmission, the determining the number of sidelink resources that may be used for sidelink transmission in one slot includes:

determining a total size of the sidelink resources existing in one slot, according to at least one of a frequency domain resource range and a code domain resource range of the candidate sidelink reception occasion; and determining the number of sidelink resources that may be used for sidelink transmission existing in one slot, according to at least one of time domain granularity, frequency domain granularity and code domain granularity of resources used for sidelink transmission indicated in the configuration of resources used for sidelink transmission, and the total size.

Optionally, the determining the candidate sidelink reception occasion set includes:

sorting all candidate sidelink reception occasions in the candidate sidelink reception occasion set according to a predetermined criterion; the predetermined criteria includes:

sorting in ascending order by at least one of a BWP index, a resource pool index, a frequency domain index, a time domain index, and a code domain index, according to a predetermined order.

Optionally, the generating the first HARQ-ACK semi-static codebook corresponding to the sidelink transmission includes:

generating a corresponding first type of HARQ-ACK information bit for each candidate PDSCH reception occasion in the candidate PDSCH reception occasion set, and generating a corresponding second type of HARQ-ACK information bit for each candidate sidelink reception occasion in the candidate sidelink reception occasion set; and combining the first type of HARQ-ACK information bit and the second type of HARQ-ACK information bit to generate the first HARQ-ACK semi-static codebook.

Optionally, the determining the candidate sidelink reception occasion set and the candidate PDSCH reception occasion set includes:

sorting all the candidate reception occasions in the candidate sidelink reception occasion set and the candidate PDSCH reception occasion set, according to a predetermined criterion;

the predetermined criteria includes at least one of the following:

sorting in ascending order by at least one of a BWP index, a resource pool index, a frequency domain index, a time domain index, and a code domain index, according to a predetermined order;

sorting the sidelink reception occasion and the candidate PDSCH reception occasion according to at least one of the BWP index, the resource pool index, the frequency domain index, the time domain index, and the code domain index, according to a predetermined order between the downlink and the sidelink.

Optionally, when the first UE determines not to transmit sidelink data on one PSSCH and/or PSCCH scheduled by the configured sidelink grant, the HARQ-ACK feedback information corresponding to the PSSCH and/or PSCCH generated by the first UE is ACK.

Optionally, the generating the first HARQ-ACK dynamic codebook, including generating a dynamic codebook including sidelink HARQ-ACK feedback information corresponding to a dynamic sidelink grant and/or sidelink HARQ-ACK feedback information corresponding to a configured sidelink grant, includes at least one of the following:

generating the dynamic codebook including the sidelink HARQ-ACK feedback information corresponding to the dynamic sidelink grant according to at least one of the C-DAI and the T-DAI, and the HARQ-ACK information bit, wherein the at least one of the C-DAI and the T-DAI is a C-DAI and/or a T-DAI indicated in the dynamic sidelink grant, and the HARQ-ACK information bit is a HARQ-ACK information bit corresponding to a sidelink transmission scheduled by the dynamic sidelink grant;

adding the sidelink HARQ-ACK feedback information corresponding to the configured sidelink grant at the end of the dynamic codebook including the sidelink HARQ-ACK feedback information corresponding to the dynamic sidelink grant; and adding the sidelink HARQ-ACK feedback information corresponding to the configured sidelink grant at the end of the first HARQ-ACK dynamic codebook.

Optionally, when a total of Q configured sidelink grants are obtained, the second HARQ-ACK feedback information of the sidelink transmission scheduled by all the Q configured sidelink grants are added at the end of the first HARQ-ACK dynamic codebook and/or at the end of the dynamic codebook of the sidelink HARQ-ACK feedback information corresponding to the dynamic sidelink grant, where Q is a positive integer.

Optionally, the adding the sidelink HARQ-ACK feedback information corresponding to the configured sidelink grant at the end of the dynamic codebook including the sidelink HARQ-ACK feedback information corresponding to the dynamic sidelink grant and/or the adding the sidelink HARQ-ACK feedback information corresponding to the configured sidelink grant at the end of the first HARQ-ACK dynamic codebook includes:

adding a HARQ-ACK information bit corresponding to the configured sidelink grant in a predetermined order, wherein the predetermined order includes at least one of the following:

when the configured sidelink grant is obtained, obtaining an index corresponding to the configured sidelink grant; after determining that HARQ-ACK information bits corresponding to K configured sidelink grants need to be added, according to the indexes corresponding to the K configured sidelink grants, sorting the HARQ-ACK information bits corresponding to the configured sidelink grants correspondingly in ascending order by the index or in descending order by the index; wherein K is a positive integer;

after determining that the HARQ-ACK information bits corresponding to the K configured sidelink grants need to be added, according to resource locations of the sidelink transmissions scheduled by the K configured sidelink grants, sorting the HARQ-ACK information bits corresponding to the configured sidelink grants correspondingly; and after determining that the HARQ-ACK information bits corresponding to the K configured sidelink grants need to be added, according to types of the K configured sidelink grants, sorting the HARQ-ACK information bits corresponding to the configured sidelink grants correspondingly.

Optionally, the obtaining a configuration of a PUCCH candidate resource set for reporting downlink and/or sidelink HARQ-ACK information, and the determining how to generate a HARQ-ACK codebook based on the configuration of the PUCCH candidate resource set, includes any one of the following:

when the PUCCH candidate resource set corresponding to the downlink HARQ-ACK report and the PUCCH candidate resource set corresponding to the sidelink HARQ-ACK report are separately configured, generating separate HARQ-ACK codebooks or separate sub-codebooks of the HARQ-ACK codebook for the second HARQ-ACK feedback information corresponding to the sidelink transmission and the third HARQ-ACK feedback information corresponding to the downlink transmission, respectively; when the PUCCH candidate resource set corresponding to the downlink HARQ-ACK report and the PUCCH candidate resource set corresponding to the sidelink HARQ-ACK report are jointly configured, the second HARQ-ACK feedback information corresponding to the sidelink transmission and the third HARQ-ACK feedback information corresponding to the downlink transmission being multiplexed in a same HARQ-ACK codebook or a same sub-codebook of the HARQ-ACK codebook; or when the PUCCH candidate resource set corresponding to the downlink HARQ-ACK report and the PUCCH candidate resource set corresponding to the sidelink HARQ-ACK report are separately configured or not separately configured and the same PUCCH candidate resources are included in the PUCCH candidate resource set, generating separate HARQ-ACK codebooks or separate sub-codebooks of the HARQ-ACK codebook for the second HARQ-ACK feedback information corresponding to the sidelink transmission and the third HARQ-ACK feedback information corresponding to the downlink transmission, respectively; or regardless of whether the PUCCH candidate resource set corresponding to the downlink HARQ-ACK report and the PUCCH candidate resource set corresponding to the sidelink HARQ-ACK report are separately configured or not, the HARQ-ACK information corresponding to the sidelink transmission and the downlink transmission being multiplexed in a same codebook, or generating separate codebooks for the HARQ-ACK information corresponding to the sidelink transmission and the downlink transmission, respectively.

For the content not detailed in the first UE provided by the embodiment of the disclosure, reference may be made to the foregoing codebook-based feedback method. The beneficial effect that the first UE may achieve is the same as that of the foregoing codebook-based feedback method, and will not be repeated herein.

Applying of the embodiments of the disclosure has the following beneficial effects at least:

transmitting a sidelink transmission to a second UE; receiving first HARQ-ACK feedback information transmitted by the second UE; generating, according to the received first HARQ-ACK feedback information, second HARQ-ACK feedback information corresponding to the sidelink transmission; generating a first HARQ-ACK codebook including the second HARQ-ACK feedback information; and reporting the first HARQ-ACK codebook to a base station. In this way, the second HARQ-ACK feedback information corresponding to the sidelink transmission is reported independently or reported with others.

Figure 8:
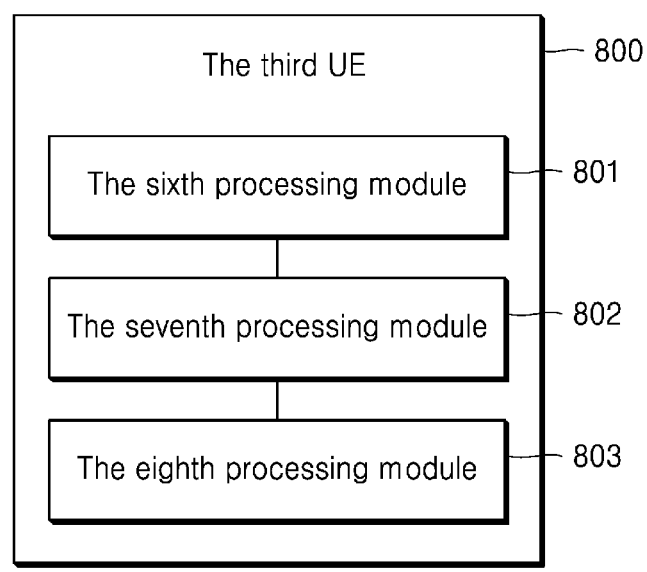
FIG. 8 is a schematic structural diagram of a third UE according to an embodiment of the disclosure.

Based on the same inventive concept of the foregoing embodiment, an embodiment of the disclosure further provides a third UE, a schematic structural diagram of which is as shown in FIG. 8. The third UE 800 includes a sixth processing module 801, a seventh processing module 802 and an eighth processing module 803.

The sixth processing module 801 is configured to receive a sidelink transmission transmitted by a fourth UE.

The seventh processing module 802 is configured to generate a second HARQ-ACK codebook including HARQ-ACK feedback information corresponding to the sidelink transmission, where the second HARQ-ACK codebook includes at least one of a second HARQ-ACK dynamic codebook and a second HARQ-ACK semi-static codebook.

The eighth processing module 803 is configured to transmit the second HARQ-ACK codebook to the fourth UE.

Optionally, the generating the second HARQ-ACK semi-static codebook includes:

determining a physical sidelink feedback channel (PSFCH) resource carrying sidelink HARQ-ACK feedback information;

determining a candidate sidelink reception occasion set according to the PSFCH resource;

generating a corresponding HARQ-ACK information bit for each candidate sidelink reception occasion in the candidate sidelink reception occasion set; and sorting the generated HARQ-ACK information bits in order to generate the second HARQ-ACK semi-static codebook.

Optionally, the determining the candidate sidelink reception occasion set according to the PSFCH resource includes:

determining, according to BWP and/or resource pool where the PSFCH resource is located, at least one of a time domain resource range, a frequency domain resource range, and a code domain resource range including the candidate sidelink reception occasion; and determining candidate sidelink reception occasion in each slot within the time domain resource range, the candidate sidelink reception occasion set being composed of candidate sidelink reception occasions in all slots in the time domain resource range.

Optionally, in the process of generating the second HARQ-ACK semi-static codebook, the slot timing set f associated with the BWP and/or the resource pool that represents the time domain resource range is configured by a higher layer, and the higher layer configuration includes direct configuration and indirect configuration. The indirect configuration includes determining f according to the PSFCH resource configuration, where f is a real number.

Optionally, the determining the candidate sidelink reception occasion in each slot includes:

determining the total size of a sidelink resource existing in one slot, according to at least one of a frequency domain resource range and a code domain resource range of the candidate sidelink reception occasion; and determining the number of sidelink resources that may be used for the sidelink transmission and the number of the candidate sidelink reception occasions in one slot, according to at least one of time domain granularity, frequency domain granularity and code domain granularity of resources used for sidelink transmission indicated in the configuration of resources used for the sidelink transmission, and the total size.

Optionally, the generating the second HARQ-ACK dynamic codebook including the HARQ-ACK feedback information corresponding to the sidelink transmission includes:

determining a PSFCH resource carrying the sidelink HARQ-ACK feedback information;

determining, according to the PSFCH resource, a count downlink allocation index (C-DAI) and/or a total downlink allocation index (T-DAI) corresponding to the sidelink HARQ-ACK feedback information;

generating a HARQ-ACK information bit corresponding to the sidelink HARQ-ACK feedback information; and generating the second HARQ-ACK dynamic codebook according to at least one of the C-DAI and T-DAI, and the HARQ-ACK information bit.

Optionally, a different second HARQ-ACK dynamic codebook is generated according to at least one of the following information:

identification of the UE indicating C-DAI and/or T-DAI, TB/CBG-level HARQ-ACK feedback, CBG configuration, unicast, groupcast, broadcast, and parameters characterizing service priority, wherein the identification of the UE includes at least one of UE ID, UE source ID, group ID of the group in which the UE is located, ID of the UE within the group, and ID index of the UE within the group, and the C-DAI and/or T-DAI are indicated by the second UE in the SCI.

Optionally, dynamically determining to enable or disable the second HARQ-ACK dynamic codebook for feedback on the sidelink channel and/or the uplink channel for sidelink groupcast service includes at least one of the following:

when frequency domain size of the channel carrying the feedback of the sidelink groupcast service is greater than a predetermined threshold, determining to enable the second HARQ-ACK dynamic codebook for the feedback; and when the frequency domain size of the channel carrying the feedback of the sidelink groupcast service is not greater than the predetermined threshold, determining to disable the second HARQ-ACK dynamic codebook for the feedback.

For the content not detailed in the third UE provided by the embodiment of the disclosure, reference may be made to the foregoing codebook-based feedback method. The beneficial effect that the third UE may achieve is the same as that of the foregoing codebook-based feedback method, and will not be repeated herein.

Applying of the embodiments of the disclosure has the following beneficial effects at least:

it may achieve the effect that the HARQ-ACK feedback information corresponding to the sidelink transmission is reported independently or reported with others.

Figure 9:
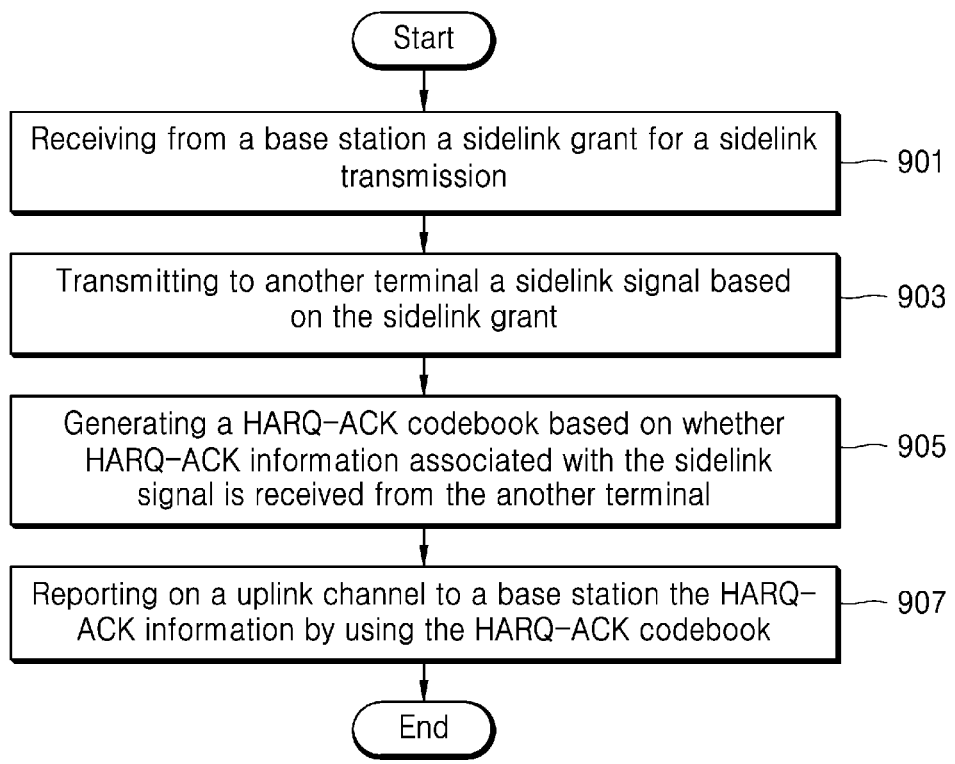
FIG. 9 illustrates a schematic flowchart diagram of a method for a user equipment (UE) in a wireless communication system according to an embodiment of the disclosure.

FIG. 9 illustrates a schematic flowchart diagram of a method for a user equipment (UE) in a wireless communication system according to an embodiment of the disclosure.

Referring to the FIG. 9, the method may include: a step 901 of receiving from a base station a sidelink grant for a sidelink transmission; a step 903 of transmitting to another terminal a sidelink signal based on the sidelink grant; a step 905 of generating a HARQ-ACK codebook based on whether HARQ-ACK information associated with the sidelink signal is received from the another terminal; and a step 907 of reporting on an uplink channel to a base station the HARQ-ACK information by using the HARQ-ACK codebook.

According to an embodiment of the disclosure, a method performed by a terminal in a wireless communication system is provided, the method includes: receiving, from a base station, a sidelink configured grant for a sidelink transmission; transmitting, to another terminal, a sidelink signal based on the sidelink configured grant; generating a second hybrid automatic repeat request (HARQ) acknowledgement (HARQ-ACK) information based on whether first HARQ-ACK information corresponding to the sidelink signal is received from the another terminal; and reporting on an uplink channel, to a base station, the second HARQ-ACK information.

According to the embodiment of the disclosure, the generating the second HARQ-ACK information may include: in case that the first HARQ-ACK information is received from the another terminal, generating a HARQ-ACK information bit associated with the sidelink configured grant, wherein the HARQ-ACK information bit indicates same value as a value of the received first HARQ-ACK information; and in case that the first HARQ-ACK information does not be received from the another terminal, generating a HARQ-ACK information bit associated with the sidelink configure grant, wherein the HARQ-ACK information bit indicates NACK.

According to the embodiment of the disclosure, the reporting on the uplink channel, to the base station, the second HARQ-ACK information by using the HARQ-ACK codebook may include reporting, to the base station, the HARQ-ACK information bit in a physical uplink control channel (PUCCH) transmission occasion.

According to the embodiment of the disclosure, the HARQ-ACK information bit associated with the sidelink configured grant is added to end of a dynamic codebook.

According to the embodiment of the disclosure, the reporting on the uplink channel, to the base station, the second HARQ-ACK information may include: in case that a transmission occasion of a sidelink signal scheduled by the sidelink configured grant is within a predetermined time period, reporting on a physical uplink control channel (PUCCH), to the base station, the second HARQ-ACK information in response to reception of the sidelink signal scheduled by the sidelink configured grant.

According to the embodiment of the disclosure, wherein a timing for reporting the second HARQ-ACK information on a physical uplink control channel (PUCCH) is determined based on an offset between a slot for receiving the first HARQ-ACK information and a slot for reporting the second HARQ-ACK information to the base station, and wherein the offset is indicated by downlink control information (DCI) or radio resource control (RRC) signaling.

According to the embodiment of the disclosure, wherein the second HARQ-ACK information comprises at least one of a dynamic HARQ-ACK codebook or a semi-static codebook.

According to the embodiment of the disclosure, wherein the uplink channel comprises at least one of a physical uplink control channel (PUCCH) or a physical uplink shared channel (PUSCH).

According to the embodiment of the disclosure, the reporting on the uplink channel, to the base station, the second HARQ-ACK information may include: in case that resources for transmitting HARQ-ACK information associated with downlink signal received from the base station and resources for reporting the second HARQ-ACK information is overlapped, reporting on the PUCCH or the PUSCH, to a base station, the second HARQ-ACK information.

According to the embodiment of the disclosure, wherein a codebook for transmitting the HARQ-ACK information associated with downlink signal and HARQ-ACK codebook for transmitting the second HARQ-ACK information are separately generated.

Figure 10:
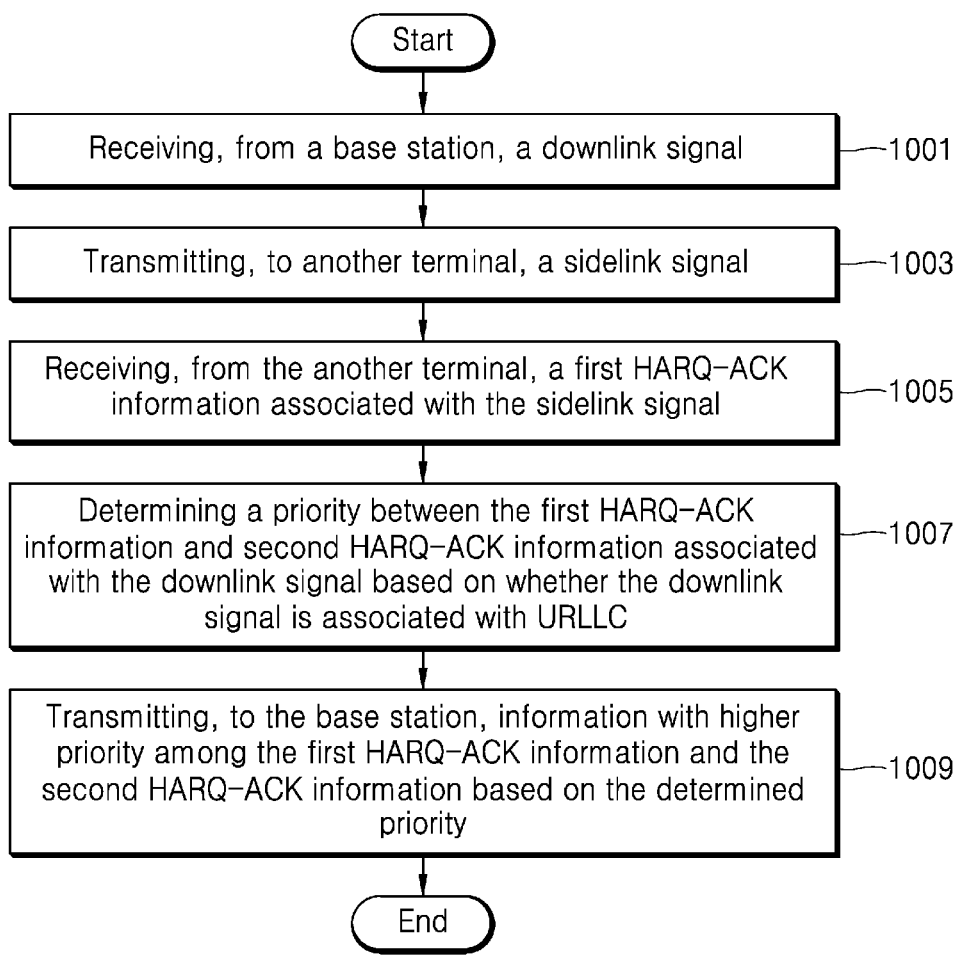
FIG. 10 illustrates a schematic flowchart diagram of a method for a user equipment (UE) in a wireless communication system according to another embodiment of the disclosure.

FIG. 10 illustrates a schematic flowchart diagram of a method for a user equipment (UE) in a wireless communication system according to another embodiment of the disclosure.

Referring to the FIG. 10, the method may include: a step 1001 of receiving, from a base station, a downlink signal; a step 1003 of transmitting, to another terminal, a sidelink signal; a step 1005 of receiving, from the another terminal, a first HARQ-ACK information associated with the sidelink signal; a step 1007 of determining a priority between the first HARQ-ACK information and second HARQ-ACK information associated with the downlink signal based on whether the downlink signal is associated with URLLC; and a step 1009 of transmitting, to the base station, information with higher priority among the first HARQ-ACK information and the second HARQ-ACK information based on the determined priority.

According to another embodiment of the disclosure, the determining the priority between the first HARQ-ACK information and the second HARQ-ACK information may include determining a higher priority to the second HARQ-ACK information than the first HARQ-ACK information in case that the downlink signal is associated with the URLLC.

According to another embodiment of the disclosure, the determining the priority between the first HARQ-ACK information and the second HARQ-ACK information may include: in case that the downlink signal is not associated with the URLLC, determining a higher priority to the first HARQ-ACK information than the second HARQ-ACK information based on a value associated with a priority of the first HARQ-ACK information being smaller than a threshold.

According to another embodiment of the disclosure, the determining the priority between the first HARQ-ACK information and the second HARQ-ACK information may include: in case that the downlink signal is not associated with the URLLC, determining a higher priority to the second HARQ-ACK information than the first HARQ-ACK information based on a value associated with a priority of the first HARQ-ACK information being equal or larger than a threshold.

According to another embodiment of the disclosure, the method may further include: in case that the terminal does not transmit sidelink data to the another terminal on resources indicated by a configured grant, generating an ACK for reporting to the base station.

According to another embodiment of the disclosure, the method may further include: in case that the total transmission power of the scheduled PSFCH transmissions exceeds the maximum transmission power of the PSFCH transmissions, reducing each transmission power of the schedule PSFCH transmissions until the total transmission power of the scheduled PSFCH transmissions does not exceed the maximum transmission power of the PSFCH transmissions.

Figure 11:
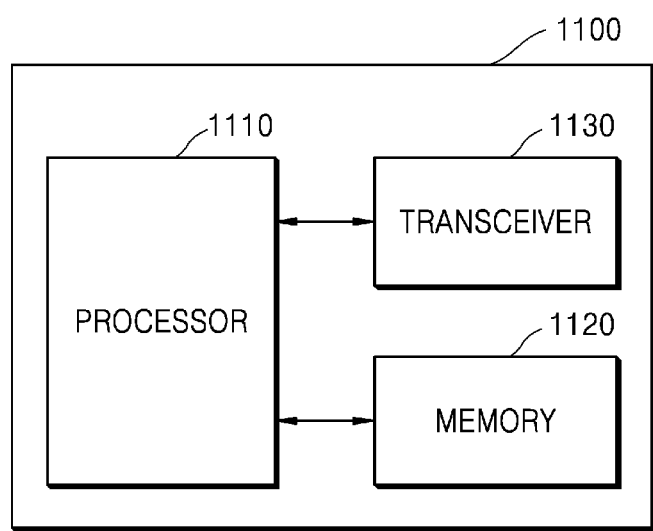
FIG. 11 is a block diagram of a UE according to an embodiment of the disclosure.

FIG. 11 is a block diagram of a UE 1100 according to an embodiment of the disclosure. As shown in FIG. 11, the UE 1100 may include a processor 1110, a transceiver 1130, and memory 1120. The memory 1120 stores instructions that, when executed by the processor 1110, cause the processor to perform the transmission method as described above with reference to FIGS. 1-10. However, components of the UE are not limited to the examples set forth above. For example, the UE may include more components or less components than the components set forth above. In addition, the processor 1110, the transceiver 1130, and the memory 1120 may be implemented in the form of one chip.

The processor 1110 may control a series of processes in which the UE may be operated according to the above-described embodiments of the disclosure. For example, the processor 1110 may control to transmit or receive a feedback signal in a wireless communication system. And, the processor 1110 may be at least one processor.

The transceiver 1130 may transmit a signal to and receive a signal from a gNB or another UE. The signal set forth above may include control information and data. For this purpose, the transceiver 1130 may include a radio frequency (RF) transmitter up-converting and amplifying a frequency of a transmitted signal, an RF receiver performing low-noise amplification and frequency down-conversion on a received signal, and the like. In addition, the transceiver 1130 may receive a signal through a radio channel and output the signal to the processor 1110, and may transmit, through the radio channel, a signal that is output from the processor 1110.

The memory 1120 may store at least one of information transmitted and received by the transceiver 1130 or information generated by the processor 1110. In addition, the memory 1120 may store control information or data included in an acquired signal. The memory 1120 may include a storage medium such as read-only memory (ROM), random access memory (RAM), a hard disk, compact disc ROM (CD-ROM), and a digital versatile disc (DVD), or a combination of storage media. Further, the memory 1120 may include a plurality of memories.

According to the embodiment of the disclosure, the UE 1100 may be a transmitter UE or a receiver UE.

According to the embodiment of the disclosure, the terminal may include: a transceiver, and at least one processor configured to: receive via the transceiver, from a base station, a sidelink configured grant for a sidelink transmission, transmit via the transceiver, to another terminal, a sidelink signal based on the sidelink configured grant, generate a second hybrid automatic repeat request (HARQ) acknowledgement (HARQ-ACK) information based on whether first HARQ-ACK information corresponding to the sidelink signal is received from the another terminal, and report via the transceiver on an uplink channel, to a base station, the second HARQ-ACK information.

According to the embodiment of the disclosure, the at least one processor is further configured to in case that the first HARQ-ACK information is received from the another terminal, generate a HARQ-ACK information bit associated with the sidelink configured grant, wherein the HARQ-ACK information bit indicates same value as a value of the received first HARQ-ACK information, and in case that the first HARQ-ACK information does not be received from the another terminal, generate a HARQ-ACK information bit associated with the sidelink configure grant, wherein the HARQ-ACK information bit indicates NACK.

According to the embodiment of the disclosure, the at least one processer is further configured to report via the transceiver, to the base station, the HARQ-ACK information bit in a physical uplink control channel (PUCCH) transmission occasion.

According to the embodiment of the disclosure, the HARQ-ACK information bit associated with the sidelink configured grant is added to end of a dynamic codebook.

According to the embodiment of the disclosure, the at least one processer is further configured to: in case that a transmission occasion of a sidelink signal scheduled by the sidelink configured grant is within a predetermined time period, report via the transceiver on a physical uplink control channel (PUCCH), to the base station, the second HARQ-ACK information in response to reception of the sidelink signal scheduled by the sidelink configured grant.

According to the embodiment of the disclosure, wherein a timing for reporting the second HARQ-ACK information on a physical uplink control channel (PUCCH) is determined based on an offset between a slot for receiving the first HARQ-ACK information and a slot for reporting the second HARQ-ACK information to the base station, and wherein the offset is indicated by downlink control information (DCI) or radio resource control (RRC) signaling.

According to the embodiment of the disclosure, wherein the second HARQ-ACK information comprises at least one of a dynamic HARQ-ACK codebook or a semi-static codebook.

According to the embodiment of the disclosure, wherein the uplink channel comprises at least one of a physical uplink control channel (PUCCH) or a physical uplink shared channel (PUSCH).

According to the embodiment of the disclosure, the at least one processor is further configured to: in case that resources for transmitting HARQ-ACK information associated with downlink signal received from the base station and resources for reporting the second HARQ-ACK information is overlapped, report via the transceiver on the PUCCH or the PUSCH, to a base station, the second HARQ-ACK information.

According to the embodiment of the disclosure, wherein a codebook for transmitting the HARQ-ACK information associated with downlink signal and HARQ-ACK codebook for transmitting the second HARQ-ACK information are separately generated.

According to another embodiment of the disclosure, the terminal may include a transceiver; and at least one processor configured to: receive via the transceiver, from a base station, a downlink signal, transmit via the transceiver, to another terminal, a sidelink signal, receive via the transceiver, from the another terminal, a first hybrid automatic repeat request (HARQ)-ACK information associated with the sidelink signal, determine a priority between the first HARQ-ACK information and second HARQ-ACK information associated with the downlink signal based on whether the downlink signal is associated with ultra-reliable and low latency communications (URLLC), and transmit via the transceiver, to the base station, information with higher priority among the first HARQ-ACK information and the second HARQ-ACK information based on the determined priority.

According to another embodiment of the disclosure, the at least one processor may further configured to determine a higher priority to the second HARQ-ACK information than the first HARQ-ACK information in case that the downlink signal is associated with the URLLC.

According to another embodiment of the disclosure, the at least one processor may further configured to: in case that the downlink signal is not associated with the URLLC, determine a higher priority to the first HARQ-ACK information than the second HARQ-ACK information based on a value associated with a priority of the first HARQ-ACK information being smaller than a threshold.

According to another embodiment of the disclosure, the at least one processor may further configured to: in case that the downlink signal is not associated with the URLLC, determine a higher priority to the second HARQ-ACK information than the first HARQ-ACK information based on a value associated with a priority of the first HARQ-ACK information being equal or larger than a threshold.

According to another embodiment of the disclosure, the at least one processor may further configured to: in case that the terminal does not transmit sidelink data to the another terminal on resources indicated by a configured grant, generate an ACK for reporting to the base station.

According to another embodiment of the disclosure, the at least one processor may further configured to identify whether a total transmission power of scheduled physical sidelink feedback channel (PSFCH) transmissions exceeds a maximum transmission power of PSFCH transmissions.

According to another embodiment of the disclosure, the at least one processor may further configured to: in case that the total transmission power of the scheduled PSFCH transmissions exceeds the maximum transmission power of the PSFCH transmissions, reduce each transmission power of the schedule PSFCH transmissions until the total transmission power of the scheduled PSFCH transmissions does not exceed the maximum transmission power of the PSFCH transmissions.

According to another embodiment of the disclosure, in case that N PSFCH transmissions with a highest priority among simultaneous PSFCH transmissions are determined, wherein the N is equal to a maximum number of the PSFCH transmissions.

Figure 12:
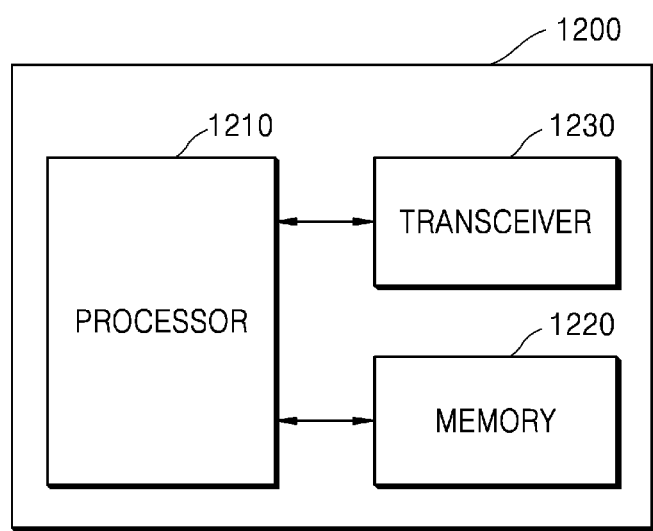
FIG. 12 is a block diagram of a base station according to an embodiment of the disclosure.

FIG. 12 is a block diagram of a base station according to an embodiment of the disclosure. As shown in FIG. 12, the base station of the disclosure may include a processor 1210, a transceiver 1230, and memory 1220. However, components of the base station are not limited to the examples set forth above. For example, the base station may include more components or less components than the components set forth above. In addition, the processor 1210, the transceiver 1230, and the memory 1220 may be implemented in the form of one chip.

According to the above-described communication method of the base station, the transceiver 1230 and the processor 1210 may be operated.

The transceiver 1230 may transmit a signal to and receive a signal from a UE. Here, the signal may include control information and data. For this purpose, the transceiver 1230 may include an RF transmitter up-converting and amplifying a frequency of a transmitted signal, an RF receiver performing low-noise amplification and frequency down-conversion on a received signal, and the like. However, this is merely an example of the transceiver 1230, and components of the transceiver 1230 are not limited to the RF transmitter and the RF receiver.

In addition, the transceiver 1230 may receive a signal through a radio channel and output the signal to the processor 1210, and may transmit, through the radio channel, a signal that is output from the processor 1210.

The processor 1210 may store a program and data required for operations of the base station. In addition, the processor 1210 may store control information or data included in a signal acquired by the base station. The processor 1210 may include memory including a storage medium, such as ROM, RAM, a hard disk, CD-ROM, and a DVD, or a combination of storage media.

The processor 1210 may control a series of processes to allow the base station to be operated according to the above-described embodiment of the disclosure. For example, the processor 1210 may control to transmit or receive a feedback signal in a wireless communication system. And, the processor 1210 may be at least one processor.

The memory 1220 may store at least one of information transmitted and received by the transceiver 1230 or information generated by the processor 1210. In addition, the memory 1220 may store control information or data included in an acquired signal. The memory 1220 may include a storage medium such as ROM, RAM, a hard disk, CD-ROM, and a DVD, or a combination of storage media. Further, the memory 1220 may include a plurality of memories.

The disclosure also provides a computer readable medium having stored thereon computer executable instructions that, when executed, may implement any of the methods described in the embodiments of the disclosure. For example, transmitting or receiving a feedback signal in a wireless communication system.

Herein, the UE may refer to any terminal having radio communication capabilities, including but not limited to a mobile phone, a cellular phone, a smart phone or a personal digital assistant (PDA), a portable computer, an image capturing device such as a digital camera, a gaming device, a music storage and playback device, as well as any portable unit or terminal having radio communication capabilities, or an Internet facility that allows wireless Internet access and browsing etc. The transceiver as used herein may be any type of transceiver being suitable for the technical context herein, and may also be implemented using any suitable data storage scheme, including but not limited to a semiconductor-based memory device, a magnetic memory device and system, an optical memory device and system, a fixed memory and a removable memory. The processor as used herein may be any type of processor being suitable for the technical context herein, and include but not limited to one or more of: a general-purpose computer, a dedicated computer, a microprocessor, a digital signal processor (DSP), and a processor based on an architecture of a multi-core processor.

The foregoing is merely illustrative of the preferred embodiments of the disclosure, and is not intended to limit the disclosure. Any modifications, equivalents, improvements, etc., which are made within the spirit and principle of the disclosure, should be included in the scope of the disclosure.

It is to be appreciated by those skilled in the art that any of the devices involving the performance of one or more of the operations described herein is included in the scope of the disclosure. These devices may be specially designed and manufactured for desired purposes, or may also include a known device(s) in a general purpose computer. These devices have computer programs stored therein that are selectively activated or reconfigured. Such computer programs may be stored in a device (e.g., computer) readable medium or in any type of medium suitable for storing electronic instructions and coupled to a bus, respectively. The computer readable medium may include but is not limited to any type of disk (including a floppy disk, a hard disk, an optical disk, a CD-ROM, and a magnetic optical disk), Read-Only Memory (ROM), Random Access Memory (RAM), Erasable Programmable Read-Only Memory (EPROM), Electrically Erasable Programmable Read-Only Memory (EEPROM), flash memory, magnetic card or optical card. That is to say, the readable medium may include any medium that stores or transmits information in a device (e.g., computer) readable manner.

It is to be appreciated by those skilled in the art that each of the blocks in the structure diagrams and/or block diagrams and/or flow diagrams and combinations of the blocks in the structure diagrams and/or block diagrams and/or flow diagrams may be implemented by the computer program instructions. It is to be appreciated by those skilled in the art that such computer program instructions may be provided to a general purpose computer, a dedicated computer, or other programmable processor that may execute data processing methods, such that the scheme specified by one or more blocks in the structure diagrams and/or block diagrams and/or flow diagrams disclosed in the disclosure may be executed by the computer or the other programmable processor that may execute data processing methods.

It is to be understood by those skilled in the art that the steps, means, and schemes in various operations, methods, and processes that have been discussed in the disclosure may be replaced, modified, combined, or deleted. Further, other steps, means, and schemes in various operations, methods, and processes that have been discussed in the disclosure may also be replaced, modified, rearranged, divided, combined, or deleted. Still further, the steps, means, and schemes in various operations, methods, and processes that have been discussed in the disclosure may also be replaced, modified, rearranged, divided, or combined with the steps, means, and schemes in the prior art.

The foregoing is merely a part of the implementations of the disclosure, and it should be noted that various improvements and polishing may be made by those skilled in the art without departing from the principles of the disclosure. And the improvements and polishing should be considered as being within the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station, a sidelink configured grant for a sidelink transmission;
   transmitting, to another terminal, a sidelink signal based on the sidelink configured grant;
   in case that a first hybrid automatic repeat request (HARQ)-acknowledgement (ACK) information associated with the sidelink signal is received from the another terminal, generating a HARQ-ACK information bit associated with a value of the first HARQ-ACK information;
   in case that the first HARQ-ACK information associated with the sidelink signal is not received from the another terminal, generating a HARQ-ACK information bit associated with a negative acknowledgement (NACK);
   generating second HARQ-ACK information based on the HARQ-ACK information bit associated with the value of the first HARQ-ACK information or the HARQ-ACK information bit associated with the NACK; and
   reporting on an uplink channel, to a base station, the second HARQ-ACK information.

2. The method of claim 1,
   wherein the HARQ-ACK information bit associated with the value of the first HARQ-ACK information or the HARQ-ACK information bit associated with the NACK is added to end of a dynamic codebook.

3. The method of claim 1, wherein the reporting on the uplink channel, to the base station, of the second HARQ-ACK information comprises:
   in case that the sidelink signal scheduled by the sidelink configured grant is transmitted within a predetermined time period; and
   reporting on a physical uplink control channel (PUCCH), to the base station, the second HARQ-ACK information in response to reception of the first HARQ-ACK information associated with the sidelink signal.

4. The method of claim 1,
   wherein a timing for reporting the second HARQ-ACK information on a physical uplink control channel (PUCCH) is determined based on an offset between a slot for receiving the first HARQ-ACK information and a slot for reporting the second HARQ-ACK information to the base station, and
   wherein the offset is indicated by at least one of downlink control information (DCI) or radio resource control (RRC) signaling.

5. The method of claim 1,
   wherein the second HARQ-ACK information comprises at least one of a dynamic HARQ-ACK codebook or a semi-static codebook.

6. The method of claim 1,
   wherein the uplink channel comprises at least one of a physical uplink control channel (PUCCH) or a physical uplink shared channel (PUSCH).

7. The method of claim 6, wherein the reporting on the uplink channel, to the base station, the second HARQ-ACK information comprises:
   in case that resources for transmitting HARQ-ACK information associated with downlink signal received from the base station and resources for reporting the second HARQ-ACK information is overlapped,
   reporting on at least one of the PUCCH or the PUSCH, to a base station, the second HARQ-ACK information.

8. The method of claim 7,
   wherein a codebook for transmitting the HARQ-ACK information associated with downlink signal and HARQ-ACK codebook associated with the second HARQ-ACK information are separately generated.

9. A terminal in a wireless communication system, the terminal comprising:
   a transceiver; and
   at least one processor configured to:
      receive via the transceiver, from a base station, a sidelink configured grant for a sidelink transmission,
      transmit via the transceiver, to another terminal, a sidelink signal based on the sidelink configured grant,
      in case that a first hybrid automatic repeat request (HARQ)-acknowledgement (ACK) information associated with the sidelink signal is received from the another terminal, generate a HARQ-ACK information bit associated with a value of the first HARQ-ACK information,
      in case that the first HARQ-ACK information associated with the sidelink signal is not received from the another terminal, generate a HARQ-ACK information bit associated with a negative acknowledgement (NACK),
      generate second HARQ-ACK information based on the HARQ-ACK information bit associated with the value of the first HARQ-ACK information or the HARQ-ACK information bit associated with the NACK, and
      report via the transceiver on an uplink channel, to a base station, the second HARQ-ACK information.

10. The terminal of claim 9,
    wherein the HARQ-ACK information bit associated with the value of the first HARQ-ACK information or the HARQ-ACK information bit associated with the NACK is added to end of a dynamic codebook.

11. The terminal of claim 9, wherein the at least one processor is further configured to:
    in case that the sidelink signal scheduled by the sidelink configured grant is transmitted within a predetermined time period,
    report via the transceiver on a physical uplink control channel (PUCCH), to the base station, the second HARQ-ACK information in response to reception of the first HARQ-ACK information associated with the sidelink signal.

12. The terminal of claim 9,
wherein a timing for reporting the second HARQ-ACK information on a physical uplink control channel (PUCCH) is determined based on an offset between a slot for receiving the first HARQ-ACK information and a slot for reporting the second HARQ-ACK information to the base station, and
wherein the offset is indicated by at least one of downlink control information (DCI) or radio resource control (RRC) signaling.

13. The terminal of claim 9,
wherein the second HARQ-ACK information comprises at least one of a dynamic HARQ-ACK codebook or a semi-static codebook.

14. The terminal of claim 9,
wherein the uplink channel comprises at least one of a physical uplink control channel (PUCCH) or a physical uplink shared channel (PUSCH).

15. The terminal of claim 14, wherein the at least one processor is further configured to:
in case that resources for transmitting HARQ-ACK information associated with downlink signal received from the base station and resources for reporting the second HARQ-ACK information is overlapped,
report via the transceiver on at least one of the PUCCH or the PUSCH, to a base station, the second HARQ-ACK information.

16. The terminal of claim 15,
wherein a codebook for transmitting the HARQ-ACK information associated with downlink signal and HARQ-ACK codebook associated with the second HARQ-ACK information are separately generated.

\* \* \* \* \*